(12) United States Patent
Watano et al.

(10) Patent No.: US 9,829,615 B2
(45) Date of Patent: Nov. 28, 2017

(54) LUMINANCE-ENHANCING FILM, OPTICAL SHEET MEMBER, AND LIQUID CRYSTAL DISPLAY DEVICE

(71) Applicant: FUJIFILM Corporation, Tokyo (JP)

(72) Inventors: Akiko Watano, Kanagawa (JP); Yukito Saitoh, Kanagawa (JP); Katsufumi Ohmuro, Kanagawa (JP); Mitsuyoshi Ichihashi, Kanagawa (JP); Hiroyuki Ishikawa, Kanagawa (JP); Kotaro Yasuda, Kanagawa (JP); Hideyuki Nishikawa, Kanagawa (JP); Yuki Matsuda, Kanagawa (JP); Wataru Hoshino, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 15/052,312

(22) Filed: Feb. 24, 2016

(65) Prior Publication Data

US 2016/0170114 A1    Jun. 16, 2016

Related U.S. Application Data

(63) Continuation of application No. PCT/JP2014/072209, filed on Aug. 26, 2014.

(30) Foreign Application Priority Data

Aug. 26, 2013  (JP) .................................. 2013-174971
Feb. 14, 2014  (JP) .................................. 2014-026581
Mar. 20, 2014  (JP) .................................. 2014-057848

(51) Int. Cl.
 *G02B 5/30*  (2006.01)
 *G02B 5/26*  (2006.01)
(Continued)

(52) U.S. Cl.
 CPC ............. *G02B 5/3041* (2013.01); *G02B 5/26* (2013.01); *G02B 5/3016* (2013.01);
(Continued)

(58) Field of Classification Search
 CPC ........................ G02B 5/3041; G02F 1/133621
 See application file for complete search history.

(56) References Cited

U.S. PATENT DOCUMENTS 5,828,488 A * 10/1998 Ouderkirk ............. B29C 55/023
                                                      349/62
6,061,108 A    5/2000 Anderson et al.
(Continued)

FOREIGN PATENT DOCUMENTS

JP   H01-133003 A   5/1989
JP   09-054556 A    2/1997
(Continued)

OTHER PUBLICATIONS

International Search Report issued in connection with International Patent Application No. PCT/JP2014/072209 dated Dec. 9, 2014.
(Continued)

*Primary Examiner* — Sang V Nguyen
(74) *Attorney, Agent, or Firm* — Edwards Neils LLC; Jean C. Edwards, Esq.

(57) ABSTRACT

The present invention provides a luminance-enhancing film including a λ/4 plate, and a reflection polarizer, including a first light reflection layer, a second light reflection layer, and a third light reflection layer from the λ/4 plate side sequentially, the light reflection layers being light reflection layers formed by fixing a cholesteric liquid crystalline phase, and including blue, green and red light reflection layers, and Rth(550) of the first light reflection layer and Rth(550) of the second light reflection layer having inverse signs; and a luminance-enhancing film including a λ/4 plate and a reflec-
(Continued)

tion polarizer including at least a light reflection layer formed of a rod-like cholesteric liquid crystal material and a light reflection layer formed of a disk-like cholesteric liquid crystal material. The luminance-enhancing film has high luminance and is able to suppress an oblique change in the color.

22 Claims, 8 Drawing Sheets

(51) Int. Cl.
    *G02F 1/1335* (2006.01)
    *G02F 1/13363* (2006.01)

(52) U.S. Cl.
    CPC .... *G02F 1/13363* (2013.01); *G02F 1/133536* (2013.01); *G02F 1/133603* (2013.01); *G02F 1/133621* (2013.01); *G02F 1/133634* (2013.01); *G02F 2001/133543* (2013.01); *G02F 2001/133614* (2013.01); *G02F 2001/133638* (2013.01)

(56) References Cited

U.S. PATENT DOCUMENTS

| | | | |
|---|---|---|---|
| 6,084,708 | A | 7/2000 | Schuster |
| 6,175,400 | B1 | 1/2001 | Duncan et al. |
| 6,519,017 | B1 | 2/2003 | Ichihashi et al. |
| 6,825,903 | B2 | 11/2004 | Ohtake et al. |
| 6,839,103 | B2 | 1/2005 | Kelly et al. |
| 9,110,203 | B2 | 8/2015 | Seo et al. |
| 2002/0021392 | A1* | 2/2002 | Ohtake ............. G02F 1/133553 349/115 |
| 2003/0164920 | A1 | 9/2003 | Kelly et al. |
| 2007/0064168 | A1 | 3/2007 | Shiraogawa et al. |
| 2009/0101192 | A1* | 4/2009 | Kothari ................. G02B 5/285 136/246 |
| 2010/0007823 | A1* | 1/2010 | Haraguchi ........... G02B 3/0006 349/98 |
| 2010/0165466 | A1* | 7/2010 | Endo .......................... B32B 7/14 359/599 |
| 2012/0188469 | A1* | 7/2012 | Fukui ................. G03B 21/2013 349/5 |
| 2012/0206935 | A1 | 8/2012 | Seo et al. |
| 2012/0230024 | A1* | 9/2012 | Moore ................... A61B 1/063 362/231 |
| 2012/0242948 | A1* | 9/2012 | Taguchi ................... G02B 5/26 349/191 |
| 2013/0010229 | A1* | 1/2013 | Shin ................. G02F 1/133617 349/62 |
| 2013/0027634 | A1 | 1/2013 | Saneto et al. |
| 2014/0218668 | A1* | 8/2014 | Sakai .................. G02F 1/13363 349/102 |
| 2014/0347613 | A1* | 11/2014 | Kim ..................... G02B 5/3016 349/117 |
| 2016/0170114 | A1 | 6/2016 | Watano et al. |

FOREIGN PATENT DOCUMENTS

| | | |
|---|---|---|
| JP | 2001-004843 A | 1/2001 |
| JP | 2001-081465 A | 3/2001 |
| JP | 2001-183643 A | 7/2001 |
| JP | 2001-290022 A | 10/2001 |
| JP | 2001-305520 A | 10/2001 |
| JP | 2003-270443 A | 9/2003 |
| JP | 3448626 B2 | 9/2003 |
| JP | 3518660 B | 2/2004 |
| JP | 2005-128219 A | 5/2005 |
| JP | 2011-221376 A | 11/2011 |
| JP | 2012-169271 A | 9/2012 |
| JP | 2013-047794 A | 3/2013 |
| WO | 95/17699 A1 | 6/1995 |
| WO | 2008/016056 A | 2/2008 |

OTHER PUBLICATIONS

Written Opinion issued in connection with International Patent Application No. PCT/JP2014/072209 dated Dec. 9, 2014.
Jian Chen et al.; A High-Efficiency Wide-Color-Gamut Solid-State Backlight System for LCDs Using Quantum Dot Enhancement Film; SID 2012 Digest; Jun. 2012; pp. 895-896; vol. 43, Issue 1; Society for Information Display; U.S.
International Preliminary Report on Patentability issued by WIPO dated Aug. 25, 2016, in connection with International Patent Application No. PCT/JP2015/053904.
Notification of Reasons for Refusal issued by the Japanese Patent Office (JPO) dated Jul. 26, 2016 in connection with corresponding Japanese Patent Application No. 2014-171096.
International Search Report issued in connection with International Patent Application No. PCT/JP2015/053904 dated May 12, 2015.
Written Opinion issued in connection with International Patent Application No. PCT/JP2015/053904 dated May 12, 2015.
Notification of Reasons for Refusal issued by the Japanese Patent Office (JPO) dated May 9, 2017 in connection with related Japanese Patent Application No. 2014-171096.
International Preliminary Report on Patentability issued by WIPO dated Mar. 10, 2016, in connection with International Patent Application No. PCT/JP2014/072209.
Notification of Reasons for Refusal issued by the Japanese Patent Office (JPO) dated Aug. 29, 2017 in connection with related Japanese Patent Application No. 2015-562869.
Non-Final Office Action issued by the U.S. Patent and Trademark Office (USPTO) dated Jul. 3, 2017 in connection with related U.S. Appl. No. 15/231,057.

* cited by examiner

LUMINANCE-ENHANCING FILM, OPTICAL SHEET MEMBER, AND LIQUID CRYSTAL DISPLAY DEVICE

CROSS-REFERENCE TO RELATED APPLICATIONS

This application is a continuation of PCT International Application No. PCT/JP2014/072209 filed on Aug. 26, 2014, which was published under PCT Article 21(2) in Japanese, and claims priorities under 35 U.S.C §119 (a) to Japanese Patent Applications Nos. 2013-174971, 2014-026581 and 2014-057848 filed on Aug. 26, 2013, Feb. 14, 2014, and Mar. 20, 2014, respectively, the entire contents of all of which are incorporated herein by reference in their entirety.

BACKGROUND OF THE INVENTION

1. Field of the Invention

The present invention relates to a luminance-enhancing film, an optical sheet member, and a liquid crystal display device. More specifically, the present invention relates to a luminance-enhancing film which has high luminance and is able to suppress an oblique color change at the time of being incorporated in a liquid crystal display device, an optical sheet member using the luminance-enhancing film, and a liquid crystal display device using the luminance-enhancing film.

2. Description of the Related Art

A flat panel display such as a liquid crystal display device (hereinafter, also referred to as LCD) has been annually variously used as a space saving image display device having low power consumption. The liquid crystal display device, for example, is configured by disposing backlight (hereinafter, also referred to as BL), a backlight side polarizing plate, a liquid crystal cell, a visible side polarizing plate, and the like in this order.

In the recent flat panel display market, power saving, high definition, and enhancement in color reproducibility have progressed as enhancement in LCD performance. In particular, the progress of the enhancement in LCD performance is remarkable in a small-size liquid crystal display device of a tablet PC, a smart phone, or the like.

On the other hand, a next-generation hi-vision (4K2K, an EBU ratio of greater than or equal to 100%) of the current TV standard (FHD, a national television system committee (NTSC)) ratio of 72%≅an European broadcasting union (EBU) ratio of 100%) has been developed in a large-size liquid crystal display device used for TV, and development for power saving, high definition, and enhancement in color reproducibility has progressed as performance enhancement such as a reduction in size. For this reason, in the liquid crystal display device, power saving, high definition, and enhancement in color reproducibility have been increasingly required.

It has been proposed that a reflection polarizer is disposed between the backlight and the backlight side polarizing plate according to power saving of the backlight. The reflection polarizer is an optical element in which among incident light rays while vibrating in all directions, only light rays vibrating in a specific polarization direction are transmitted, and light rays vibrating in the other polarization direction are reflected. Accordingly, it is possible to recycle the light rays which are reflected without being transmitted through the reflection polarizer, and it is possible to enhance light utilization efficiency in the LCD.

In response, a technology has been known in which an optical sheet member (a dual brightness enhancement film (DBEF: Registered Trademark) or the like) is combined between the backlight and the backlight side polarizing plate, and thus a light utilization rate of the BL is improved, and the luminance is improved while saving power of the backlight (refer to JP3448626B).

In JP1989-133003A (JP-H01-133003A), a technology is disclosed in which a reflection wavelength region is broadened by a reflection polarizing plate configured by laminating a λ/4 plate and a layer formed by fixing a cholesteric liquid crystalline phase and three or more layers formed by fixing cholesteric liquid crystalline phases having different pitches, and thus a light utilization rate of the BL is enhanced.

Here, when the reflection polarizing plate configured by laminating the λ/4 plate and the layer formed by fixing the cholesteric liquid crystalline phase is incorporated in the liquid crystal display device, it has been known that a change in the shade when viewed from an oblique direction which is caused by optical properties of the cholesteric liquid crystalline phase and the λ/4 plate easily occurs. In response, in JP3518660B, a method in which the pitch of the cholesteric liquid crystalline phase is shortened at an incidence side of the light, and disposing a compensation layer having a refractive index in a vertical direction which is greater than an in-plane refractive index are proposed. In addition, in WO2008/016056A, a method is proposed in which retardation of the λ/4 plate in a thickness direction is set to be less than 0.

Furthermore, when the layer is formed by fixing the cholesteric liquid crystalline phase, in general, a rod-like liquid crystal compound is used as a cholesteric liquid crystal material, and the same reflection function as that of the cholesteric liquid crystalline phase using the rod-like liquid crystal compound is able to be obtained by aligning a discotic liquid crystal in the shape of a spiral. The discotic liquid crystal having a spiral structure, for example, is disclosed in JP2001-81465A.

In addition, a method is proposed in which a plurality of layers having different pitches are disposed or the pitch is gradually changed as a polarizing plate using a layer formed by fixing the other cholesteric liquid crystalline phase in order to broaden the reflection range.

On the other hand, a method has been also known in which a light emitting spectrum of the backlight becomes sharp from a viewpoint of high definition and enhancement in color reproducibility in the liquid crystal display device. For example, in JP2012-169271A, a method is disclosed in which white light is embodied by using a quantum dot emitting red light and green light between a blue LED and a light guide plate as a fluorescent body, and thus high luminance and enhancement in color reproducibility are realized. In SID'12 DIGEST p. 895, a method of combining a light conversion sheet (QDEF, also referred to as a quantum dot sheet) using a quantum dot for enhancing color reproducibility of the LCD is proposed.

SUMMARY OF THE INVENTION

In the technology disclosed in JP3448626B and JP1989-133003A (JP-H01-133003A), a light utilization rate is enhanced in broadband with respect to the white light, and thus a problem occurs in which manufacturing costs increase on complicated design in consideration of a multilayer configuration and wavelength dispersion properties of the member.

In addition, in the fluorescent (PL) application technology disclosed in JP2012-169271A and SID'12 DIGEST p. 895, enhancement in color reproducibility is realized by using the quantum dot as a light source, compared to the white light, and in order to obtain practical luminance, for example, it is considered that light utilization efficiency is further enhanced by combining the fluorescent (PL) application technology with the technologies disclosed in JP3448626B and JP1989-133003A (JP-H01-133003A), but the problem in which the manufacturing costs increase on the complicated design is not solved.

On the other hand, the liquid crystal display device using the polarizing plate in which the layer formed by fixing the cholesteric liquid crystalline phase and the λ/4 plate disclosed in JP3518660B and WO2008/016056A are combined contributes to enhancement in light utilization efficiency of BL light, but enhancement in the change in the shade when viewed from the oblique direction is insufficient.

Thus, a member which is able to make luminance enhancement according to enhancement in a BL light utilization rate necessary for power saving and suppression in the oblique color change compatible is not known in the related art.

An object of the present invention is to provide a luminance-enhancing film which has high luminance and is able to suppress an oblique color change at the time of being incorporated in a liquid crystal display device.

As a result of intensive studies of the present inventors for attaining the object described above, it has been found that in a reflection polarizer of a λ/4 plate and a light reflection layer (a three-layer configuration) formed by fixing a cholesteric liquid crystalline phase which reflects light of RGB, when three light reflection layers formed by fixing a cholesteric liquid crystalline phase are set to a first light reflection layer, a second light reflection layer, and a third light reflection layer in the sequence close to the λ/4 plate, the first light reflection layer and the second light reflection layer considerably affect the oblique color change. Therefore, as a result of further studies of the present inventors, it has been found that luminance increases and the oblique color change is able to be suppressed by setting Rth of the first light reflection layer and Rth of the second light reflection layer to have inverse signs, and thus the object described above is able to be attained.

That is, the object described above is attained by the present invention having the following configurations.

[1] A luminance-enhancing film including a λ/4 plate; and a reflection polarizer, in which the reflection polarizer sequentially includes a first light reflection layer, a second light reflection layer, and a third light reflection layer from the λ/4 plate side, all of the first light reflection layer, the second light reflection layer, and the third light reflection layer are light reflection layers formed by fixing a cholesteric liquid crystalline phase, any one of the first light reflection layer, the second light reflection layer, and the third light reflection layer is a blue light reflection layer which has a reflection center wavelength of 380 nm to 499 nm and a reflectivity peak having a half band width of less than or equal to 100 nm, any one of the first light reflection layer, the second light reflection layer, and the third light reflection layer is a green light reflection layer which has a reflection center wavelength of 500 nm to 599 nm and a reflectivity peak having a half band width of less than or equal to 200 nm, and any one of the first light reflection layer, the second light reflection layer, and the third light reflection layer is a red light reflection layer which has a reflection center wavelength of 600 nm to 750 nm and a reflectivity peak having a half band width of less than or equal to 150 nm, and Rth(550) of the first light reflection layer and Rth(550) of the second light reflection layer have inverse signs (here, Rth(550) represents retardation of each of the layers in a film thickness direction at a wavelength of 550 nm (unit: nm)).

[2] In the luminance-enhancing film according to [1], it is preferable that the green light reflection layer has a reflection center wavelength of 500 nm to 599 nm and a reflectivity peak having a half band width of less than or equal to 125 nm.

[3] In luminance-enhancing film according to [1] or [2], it is preferable that a cholesteric liquid crystal material of one of the first light reflection layer and the second light reflection layer is a rod-like liquid crystal compound, and a cholesteric liquid crystal material of the other one is a disk-like liquid crystal compound.

[4] In the luminance-enhancing film according to any one of [1] to [3], it is preferable that the luminance-enhancing film further includes a layer changing a polarization state of light on a side of the reflection polarizer opposite to the λ/4 plate layer side, and the layer changing the polarization state of the light satisfies conditions described below.

$$0 < |\text{Average Refractive Index of Layer Changing Polarization State of Light} - \text{Average Refractive Index of Third Light Reflection Layer}| < 0.8$$

[5] A luminance-enhancing film including a λ/4 plate; and a reflection polarizer, in which the reflection polarizer includes at least two light reflection layers, both of the at least two light reflection layers are light reflection layers formed by fixing a cholesteric liquid crystalline phase, and among the at least two light reflection layers, a cholesteric liquid crystal material of at least one light reflection layer is a rod-like liquid crystal compound, and a cholesteric liquid crystal material of at least the other light reflection layer is a disk-like liquid crystal compound.

[6] An optical sheet member including the luminance-enhancing film according to any one of [1] to [5], and a polarizing plate including a polarizer, in which an angle between a slow axis of the λ/4 plate and an absorption axis of the polarizer is 30° to 60°, and the polarizing plate, the λ/4 plate, and the reflection polarizer are sequentially laminated directly in contact with each other or are sequentially laminated through an adhesive layer.

[7] A liquid crystal display device sequentially including a liquid crystal cell; the luminance-enhancing film according to any one of [1] to [5] or the optical sheet member according to [6], and a backlight unit, in which the backlight unit includes a light source emitting blue light which has an emission center wavelength in a wavelength range of 430 nm to 480 nm, green light which has an emission center wavelength in a wavelength range of 500 nm to 600 nm, and red light which has at least a part of an emission intensity peak in a wavelength range of 600 nm to 700 nm, and the backlight unit includes a reflection member performing conversion of a polarization state of light which is emitted from the light source and is reflected on the luminance-enhancing film or the optical sheet member and reflection of the light in rear of the light source.

[8] In the liquid crystal display device according to [7], it is preferable that all of half band widths of the blue light, the green light, and the red light are less than or equal to 100 nm.

[9] In the liquid crystal display device according to [7] or [8], it is preferable that the light source is a light source including a blue light emitting diode which emits the blue light, and a fluorescent material which emits the green light and the red light when the blue light of the blue light emitting diode is incident thereon or a light source including a UV light emitting diode which emits UV light having an emission center wavelength in a wavelength range of greater than or equal to 300 nm and less than 430 nm, and a fluorescent material which emits the blue light, the green light, and the red light when the UV light of the UV light emitting diode is incident thereon.

[10] In the liquid crystal display device according to [9], it is preferable that the fluorescent material is a quantum dot member.

[11] In the liquid crystal display device according to any one of [7] to [10], it is preferable that the emission center wavelength of the red light of the backlight unit and a reflection center wavelength of a red light reflection layer satisfy Expression (A) described below.

$$10 \text{ nm} < \text{Absolute Value of (Emission Center Wavelength of Red Light of Backlight Unit−Reflection Center Wavelength of Red Light Reflection Layer)} < 50 \text{ nm} \quad \text{Expression (A):}$$

[12] In the liquid crystal display device according to any one of [7] to [11], it is preferable that the backlight unit includes two prism sheets, and prism directions of the two prism sheets are parallel to each other.

[13] In the liquid crystal display device according to [7], it is preferable that the light source is a white LED.

According to the present invention, it is possible to provide a luminance-enhancing film which has high luminance and is able to suppress an oblique color change at the time of being incorporated in a liquid crystal display device.

DESCRIPTION OF THE PREFERRED EMBODIMENTS

Figure 1:
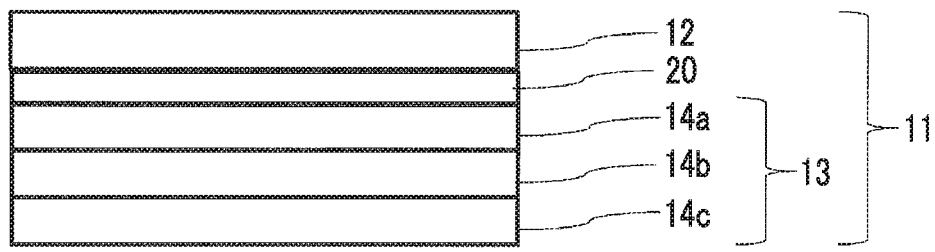
FIG. 1 is a schematic view illustrating a sectional surface of an example of a luminance-enhancing film of the present invention, and is an aspect in which a $\lambda/4$ plate and a reflection polarizer including a first light reflection layer, a second light reflection layer, and a third light reflection layer are laminated through an adhesive layer.

Hereinafter, the present invention will be described in detail.

The following description of configuration requirement is based on a representative embodiment of the present invention, but the present invention is not limited to such an embodiment.

Herein, a numerical range denoted by using "to" indicates a range including numerical values described before and after "to" as the lower limit value and the upper limit value.

Herein, a "half value width" of a peak indicates the width of a peak at a height of ½ of a peak height.

A reflection center wavelength and a half band width of a light reflection layer are able to be obtained as follows.

When a transmission spectrum of a light reflection layer is measured by using a spectrophotometer UV3150 (manufactured by Shimadzu Corporation), a decreasing peak of transmittance in a selective reflection region is observed. Among two wavelengths at which the transmittance becomes transmittance at a height of ½ of the maximum peak height, when the value of the wavelength on a short wave side is $\lambda 1$ (nm) and the value of the wavelength on a long wave side is $\lambda 2$ (nm), the reflection center wavelength and the half band width are able to be denoted by the following expressions.

Reflection Center Wavelength=$(\lambda 1+\lambda 2)/2$

Half Band Width=$(\lambda 2-\lambda 1)$

Herein, Re(λ) and Rth(λ) each represent in-plane retardation and retardation in a thickness direction at a wavelength of λ. The unit of both of Re(λ) and Rth(λ) is nm. Re(λ) measured by allowing light having a wavelength λ nm to be incident in a film normal direction using KOBRA 21ADH or WR (manufactured by Oji Scientific Instruments). The measurement is able to be performed by manually replacing a wavelength selective filter or by converting a measured value with a program or the like at the time of selecting a measurement wavelength of λ nm. When a film to be measured is denoted by a monoaxial index ellipsoid or a biaxial index ellipsoid, Rth(λ) is calculated by the following method. Furthermore, a part of the measurement method is used in measurement of an average tilt angle of discotic liquid crystal molecules on an alignment layer side in an optical anisotropic layer described below and an average tilt angle on a side opposite to the alignment layer side.

In Rth(λ), Re(λ) described above is measured at total 6 points by allowing the light having a wavelength of λ nm to be incident from directions respectively inclined in 10° step from a normal direction to 50° on one side with respect to the film normal direction in which an in-plane slow axis (determined by KOBRA 21ADH or WR) is used as an inclination axis (a rotational axis) (when there is no slow axis, an arbitrary direction of a film plane is used as the rotational axis), and Rth(λ) is calculated by KOBRA 21ADH or WR on the basis of the measured retardation value, an assumed value of the average refractive index, and the input film thickness value. In the above description, in a case of a film having a direction in which a retardation value at a certain inclination angle is zero by using the in-plane slow axis as the rotational axis from the normal direction, a retardation value at an inclination angle greater than the inclination angle described above is changed to have a negative sign, and then Rth(λ) is calculated by KOBRA 21ADH or WR. Furthermore, a retardation value is measured from two arbitrarily oblique directions by using the slow axis as the inclination axis (the rotational axis) (when there is no slow axis, an arbitrary direction of the film plane is used as the rotational axis), and Rth is able to be calculated by Expression (A) described below and Expression (B) described below on the basis of the retardation value, an assumed value of the average refractive index, and the input film thickness value.

$$Re(\theta) = \left[ nx - \frac{ny \times nz}{\sqrt{\left(ny \sin\left(\sin^{-1}\left(\frac{\sin(-\theta)}{nx}\right)\right)\right)^2 + \left(nz \cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$

Expression (A)

Furthermore, Re(θ) described above indicates a retardation value in a direction inclined by an angle of θ from the normal direction. In addition, in Expression (A), nx represents a refractive index in a slow axis direction in the plane, ny represents a refractive index in a direction orthogonal to nx in the plane, and nz represents a refractive index in a direction orthogonal to nx and ny. d represents a film thickness.

$$Rth = ((nx+ny)/2 - nz) \times d$$

Expression (B)

When the film to be measured is a so-called film not having an optic axis which is not able to be denoted by a monoaxial index ellipsoid or a biaxial index ellipsoid, Rth(λ) is calculated by the following method. In Rth(λ), Re(λ) described above is measured at 11 points by allowing the light having a wavelength of λ nm to be incident from directions respectively inclined in 10° step from −50° to +50° with respect to the film normal direction in which the in-plane slow axis (determined by KOBRA 21ADH or WR) is used as the inclination axis (the rotational axis), and Rth(λ) is calculated by KOBRA 21ADH or WR on the basis of the measured retardation value, an assumed value of the average refractive index, and the input film thickness value.

In addition, in the measurement described above, a catalog value of various optical films in a polymer handbook (JOHN WILEY&SONS, INC) is able to be used as the assumed value of the average refractive index. When the value of the average refractive index is not known in advance, the value of the average refractive index is able to be measured by using an Abbe's refractometer. The value of the average refractive index of a main optical film will be exemplified as follows: cellulose acylate (1.48), a cycloolefin polymer (1.52), polycarbonate (1.59), polymethyl methacrylate (1.49), and polystyrene (1.59). The assumed values of the average refractive index and the film thickness are input, and thus nx, ny, and nz are calculated by KOBRA 21ADH or WR. Nz=(nx−nz)/(nx−ny) is further calculated by the calculated nx, ny, and nz.

In a light reflection layer formed by fixing a cholesteric liquid crystalline phase, when an ordinary light refractive index no and an extraordinary light refractive index ne of the original liquid crystal are used, the average value of in-plane refractive indices is denoted by (nx+ny)/2=(no+ne)/2.

In addition, the refractive index in the film thickness direction is no, and thus Rth of the light reflection layer formed by fixing the cholesteric liquid crystalline phase is denoted by the following expression. In a luminance-enhancing film of the present invention, a value calculated by using the following expression is adopted as Rth of a first light reflection layer, a second light reflection layer, and a third light reflection layer, and Rth of the first light reflection layer, the second light reflection layer, and the third light reflection layer at a wavelength of λ nm is described as Rth(λ).

$$Rth = \{(no+ne)/2 - no\} \times d = \{(ne-no)/2\} \times d$$

Furthermore, ne and no are able to be measured by an Abbe's refractometer.

In addition, a method using polarization ellipsometry is able to be applied as a method of obtaining Rth of the layer formed by fixing the cholesteric liquid crystalline phase.

For example, as described in M. Kimura et al. Jpn. J. Appl. Phys. 48 (2009) 03B021, when an ellipsometry measurement method is used, the thickness, the pitch, the twisted angle, and the like of the layer formed by fixing the cholesteric liquid crystalline phase are able to be obtained, and the value of Rth is able to be obtained therefrom.

Furthermore, herein, "visible light" indicates light in a range of 380 nm to 780 nm. In addition, herein, when a measurement wavelength is not particularly described, the measurement wavelength is 550 nm.

In addition, herein, an angle (for example, an angle of "90°" or the like), and a relationship thereof (for example "orthogonal", "parallel", "intersect at 45°", and the like) include an error range which is allowable in the technical field belonging to the present invention. For example, the angle indicates a range of less than an exact angle ±10°, and an error with respect to the exact angle is preferably in a range of less than or equal to 5°, and is more preferably in a range of less than or equal to 3°.

Herein, an "absorption axis" of a polarizer or a polarizing plate indicates a direction in which absorbance is maximized. A "transmission axis" indicates a direction in which an angle with respect to the "absorption axis" is 90°.

Herein, a "slow axis" of a retardation film or the like indicates a direction in which a refractive index is maximized.

Furthermore, herein, the "polarizer" and the "reflection polarizer" are separately used.

In addition, herein, numerical values, numerical ranges, and qualitative expressions (for example, "equivalent", "equal", and the like) indicating optical properties of each member such as a phase difference region, a retardation film, and a liquid crystal layer are interpreted as indicating numerical values, numerical ranges, and properties including error which is generally allowable in a liquid crystal display device and the members used therein.

In addition, herein, "front" indicates a normal direction with respect to a display surface, "front contrast (CR)" indicates contrast calculated from white luminance and black luminance measured in the normal direction of the display surface.

[Luminance-Enhancing Film]

A luminance-enhancing film of the present invention includes a λ/4 plate, and a reflection polarizer, the reflection polarizer includes a first light reflection layer, a second light reflection layer, and a third light reflection layer from the λ/4 plate side, all of the first light reflection layer, the second light reflection layer, and the third light reflection layer are light reflection layers formed by fixing a cholesteric liquid crystalline phase, any one of the first light reflection layer, the second light reflection layer, and the third light reflection layer is a blue light reflection layer which has a reflection center wavelength of 380 nm to 499 nm and a reflectivity peak having a half band width of less than or equal to 100 nm, any one of the first light reflection layer, the second light reflection layer, and the third light reflection layer is a green light reflection layer which has a reflection center wavelength of 500 nm to 599 nm and a reflectivity peak having a half band width of less than or equal to 200 nm, and any one of the first light reflection layer, the second light reflection layer, and the third light reflection layer is a red light reflection layer which has a reflection center wavelength of 600 nm to 750 nm and a reflectivity peak having a half band width of less than or equal to 150 nm, and Rth(550) of the first light reflection layer and Rth(550) of the second light reflection layer have inverse signs.

According to such a configuration, the luminance-enhancing film of the present invention has high luminance and is able to suppress an oblique color change at the time of being incorporated in a liquid crystal display device.

Hereinafter, a mechanism in which luminance increases when the luminance-enhancing film of the present invention is incorporated in the liquid crystal display device will be described.

The luminance-enhancing film of the present invention includes the reflection polarizer, and the light reflection layer formed by fixing the cholesteric liquid crystalline phase which is included in the reflection polarizer is able to reflect at least one of right circular polarization and left circular polarization in a wavelength range in the vicinity of the reflection center wavelength. In the luminance-enhancing film of the present invention, any one of the first light reflection layer, the second light reflection layer, and the third light reflection layer included in the reflection polarizer is the blue light reflection layer, any one of the first light reflection layer, the second light reflection layer, and the third light reflection layer included in the reflection polarizer is the green light reflection layer, and any one of the first light reflection layer, the second light reflection layer, and the third light reflection layer included in the reflection polarizer is the red light reflection layer, and thus the reflection polarizer is able to reflect at least one of the right circular polarization and the left circular polarization of each of the blue light, the green light, and the red light. In addition, the λ/4 plate is able to convert light having a wavelength of λ nm from circular polarization to linear polarization. According to such a configuration, circular polarization in a first polarization state (for example, the right circular polarization) is substantially reflected by the reflection polarizer, and circular polarization in a second polarization state (for example, the left circular polarization) is substantially transmitted through the reflection polarizer described above, and the light in the second polarization state (for example, the left circular polarization) transmitted through the reflection polarizer described above is converted into linear polarization by the λ/4 plate. After that, it is preferable that the light is substantially transmitted through a polarizer (a linear polarizer) of the polarizing plate described above. Further, the direction and the polarization state of the light in the first polarization state which is substantially reflected by the reflection polarizer are randomized and recirculated by a reflection member described below (also referred to as a light guide device and an optical resonator), and a part of the light is reflected again by the reflection polarizer as the circular polarization in the first polarization state and a part of the remaining light is transmitted as the circular polarization in the second polarization state, and thus a light utilization rate on backlight side increases and brightness of the liquid crystal display device is able to be enhanced.

The polarization state of the light exiting from the reflection polarizer, that is, the polarization state of transmitted light and reflected light of the reflection polarizer, for example, is able to be measured by performing polarization measurement using Axoscan manufactured by Axometrics Inc.

Hereinafter, a mechanism in which the oblique color change is able to be suppressed when the luminance-enhancing film of the present invention is incorporated in the liquid crystal display device will be described. Here, in the luminance-enhancing film of the present invention, deciding whether to arrange a blue light reflection layer, a green light reflection layer, and a red light reflection layer on which one of the first third light reflection layer, the second third light reflection layer, and the third light reflection layer, that is, a lamination sequence of the blue light reflection layer, the green light reflection layer, and the red light reflection layer, is not limited. Even when deciding whether to arrange the blue light reflection layer, the green light reflection layer, and the red light reflection layer on which one of the first light reflection layer, the second light reflection layer, and the third light reflection layer, that is, the lamination sequence of the blue light reflection layer, the green light reflection layer, and the red light reflection layer, is arbitrary, the luminance is able to be enhanced, and the oblique color change is able to be suppressed.

When a luminance-enhancing film of the related art is incorporated in a liquid crystal display device, coloring (the oblique color change) occurs in an oblique azimuth due to an influence of a first light reflection layer, a second light reflection layer, and a third light reflection layer. This is because of the following two reasons. One of the reasons is that a reflectivity peak wavelength of the light reflection layer formed by fixing a cholesteric liquid crystalline phase is shifted to a short wave side with respect to a front peak wavelength in the oblique azimuth. For example, in the light reflection layer having a reflection center wavelength in a wavelength range of 500 nm to 599 nm, the center wavelength is shifted to a wavelength range of 400 nm to 499 nm in the oblique azimuth. The other reason is that the light reflection layer functions as a negative C plate (in Rth, a positive phase difference plate) in a wavelength region in which reflection does not occur, and thus coloring occurs due to an influence of retardation in the oblique azimuth.

In the present invention, it has been found that the size of the influence with respect to the oblique color change is in the order of the first light reflection layer and the second light reflection layer, and it is possible to enhance the oblique color change at the time of being incorporated in the liquid crystal display device by setting Rth(550) of the first light reflection layer and Rth(550) of the second light reflection layer to have inverse signs.

It is preferable that a cholesteric liquid crystal material of one of the first light reflection layer and the second light reflection layer described above is a rod-like liquid crystal compound, and a cholesteric liquid crystal material of the other one is a disk-like liquid crystal compound. Hereinafter, the reason that the oblique color change is enhanced will be described by using optical sheet members of Comparative Example 5 and Example 12 as a representative example, and by using a light reflection layer of which the cholesteric liquid crystal material is a rod-like liquid crystal compound and a light reflection layer of which the cholesteric liquid crystal material is a disk-like liquid crystal compound.

Figure 7:
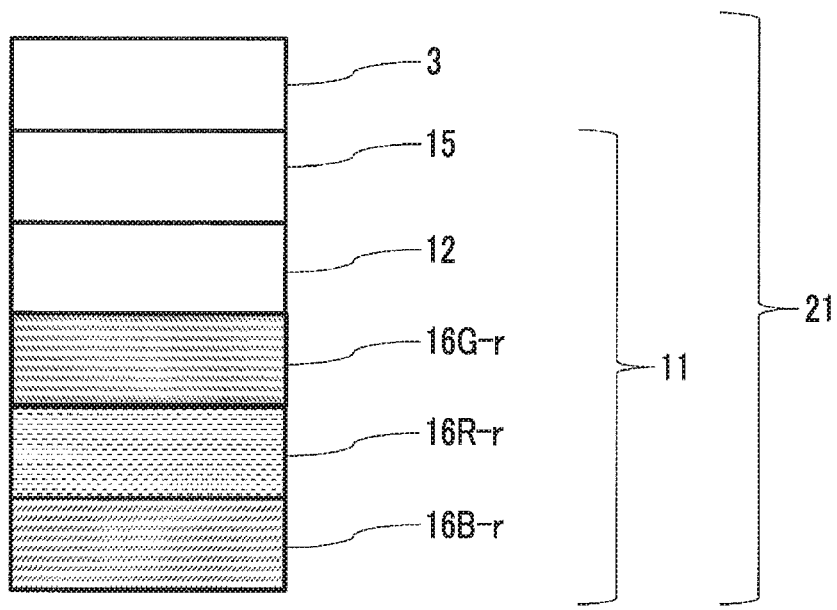
FIG. 7 is a schematic view illustrating a sectional surface of an optical sheet member of Comparative Example 5.
Figure 8:
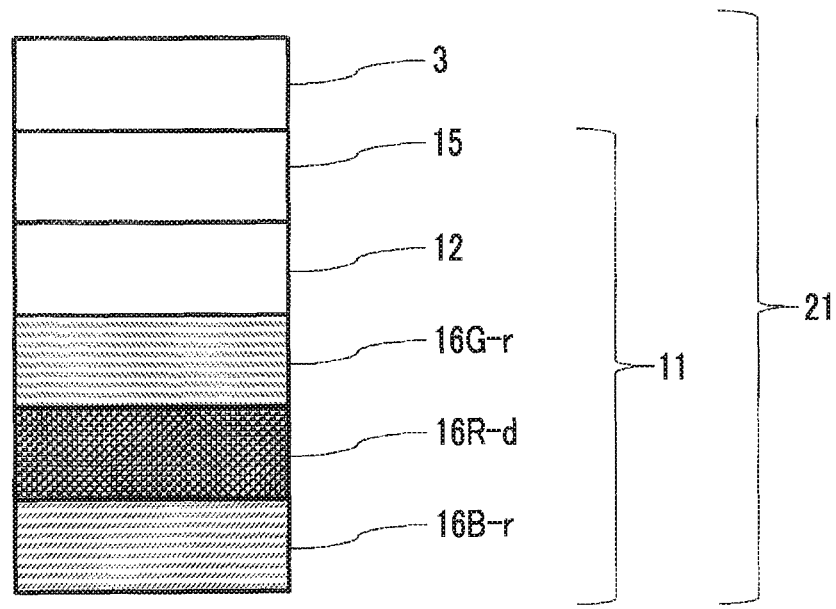
FIG. 8 is a schematic view illustrating a sectional surface of an optical sheet member of Example 12.

FIG. 7 is the configuration of the optical sheet member of Comparative Example 5, and FIG. 8 is the configuration of the optical sheet member of Example 12 which is an optical sheet member of the present invention.

In FIG. 7 relevant to the optical sheet member of Comparative Example 5, a blue light (B) reflection layer of which the cholesteric liquid crystal material is a rod-like liquid crystal compound, a red light (R) reflection layer of which the cholesteric liquid crystal material is a rod-like liquid crystal compound, a green light (G) reflection layer of which the cholesteric liquid crystal material is a rod-like liquid crystal compound, a λ/4 plate (a vertical alignment layer of a disk-like liquid crystal compound), a support, and a polarizer are laminated in this order from the light source side. A transmission axis of the polarizer is in a 0° direction, and a slow axis of the λ/4 plate is in a 45° direction.

In contrast, in FIG. 8 relevant to the optical sheet member of Example 12 which is the optical sheet member of the present invention, the red light (R) reflection layer of which the cholesteric liquid crystal material is the rod-like liquid crystal compound in FIG. 7 is replaced by a red light reflection layer of which the cholesteric liquid crystal material is a disk-like liquid crystal compound.

Figure 10A:
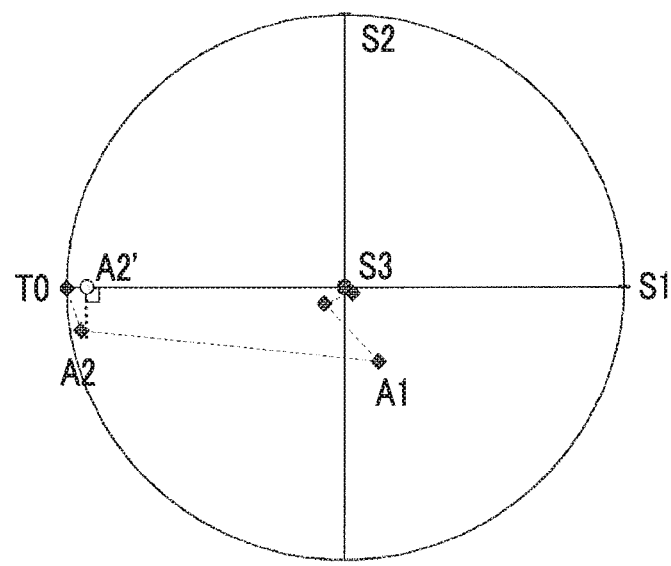
FIG. 10A is a schematic view when transition of a polarization state of blue light (wavelength=465 nm) incident at a polar angle of 60° in a slow axis direction of a polarizer with respect to an optical sheet member of Comparative Example 5 is plotted on a Poincare sphere.
Figure 10B:
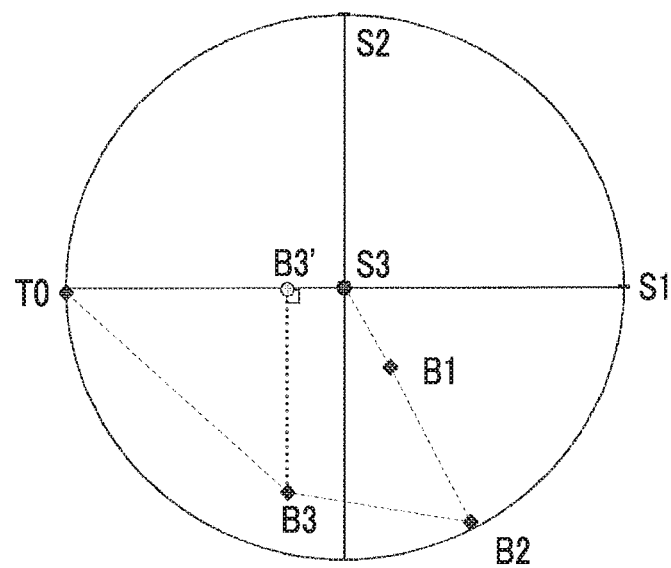
FIG. 10B is a schematic view when transition of a polarization state of green light (wavelength=535 nm) incident at a polar angle of 60° in the slow axis direction of the polarizer with respect to the optical sheet member of Comparative Example 5 is plotted on a Poincare sphere.

First, in the optical sheet member of Comparative Example 5 illustrated in FIG. 7, the occurrence of oblique shade will be described by using a Poincare sphere illustrated in FIGS. 10A and 10B. FIGS. 10A and 10B are diagrams when the Poincare sphere is seen from an S3 axis direction.

First, in FIG. 10A, transition of a polarization state of blue light (wavelength=465 nm) which is incident at a polar angle of 60° in a slow axis direction of the polarizer will be described. Hereinafter, the light incident on each of the members at a polar angle of 60° in the slow axis direction of the polarizer will be also referred to as oblique light.

The oblique light of the blue light exiting from the light source is in a non-polarization state, and is still in the non-polarization even after being transmitted through a blue light (B) reflection layer 16B-r of which the cholesteric liquid crystal material is a rod-like liquid crystal compound. The reason is as follows. In the blue light (B) reflection layer of which the cholesteric liquid crystal material is the rod-like liquid crystal compound, a reflection center wavelength and a selective reflection region (in a reflection spectrum of the light reflection layer, a peak having a reflection center wavelength as a vertex) are short wave-shifted to a region of ultraviolet light with respect to the oblique light, and the blue light (B) reflection layer functions, not as the light reflection layer but as a retardation layer having positive Rth with respect to the oblique light of the blue light, but an incidence ray is in the non-polarization state, and thus an exit ray is also in the non-polarization state.

Next, in a red light (R) reflection layer 16R-r of which the cholesteric liquid crystal material is a rod-like liquid crystal compound, a selective reflection region is short wave-shifted to a region of green light with respect to the oblique light, and thus the red light (R) reflection layer functions, not as the light reflection layer but as the retardation layer having positive Rth with respect to the oblique light of the blue light, but also similarly, the incidence ray is in the non-polarization state, and thus the exit ray is also in the non-polarization state.

Next, in a green light (G) reflection layer 16G-r of which the cholesteric liquid crystal material is a rod-like liquid crystal compound, a selective reflection region is short wave-shifted to a region of blue light with respect to the oblique light, and thus the green light (G) reflection layer functions as the light reflection layer with respect to the oblique light of the blue light, and light which is transmitted without light reflection affected by retardation having positive Rth. For this reason, the transmitted light of the oblique light of the blue light is in the non-polarization state affected by positive Rth from the left circular polarization, and is in the polarization state of a point A1 in FIG. 10A.

Next, in the vertical alignment layer of the disk-like compound of the λ/4 plate, the polarization state of the point A1 is affected by the retardation of the λ/4 plate, is rotated around an axis in the vicinity of S2 by approximately 90° in a right direction, and thus is in a state of A2.

Next, in the support, when a film having no anisotropy in an in-plane direction and a film thickness direction is used, the polarization state of the point A1 is not moved from A2.

Next, in the polarizer, the transmission axis of the polarizer becomes a point T0. Polarizer transmittance increases as a distance between A2' which is obtained by reflecting A2 on an S1 axis and T0 becomes shorter, A2' is in a position close to T0, and thus the oblique light of the blue light is able to maintain transmittance of greater than or equal to 90% compared to a case where conversion to complete linear polarization is performed.

On the other hand, in FIG. 10B, transition of a polarization state of green light (wavelength=535 nm) incident at a polar angle of 60° in the slow axis direction of the polarizer will be described. In the oblique light of the green light in the non-polarization state which exits from the light source, as with the oblique light of the blue light illustrated in FIG. 10A, the oblique light of the green light in the non-polarization state which exits from the light source is transmitted through the blue light (B) reflection layer 16B-r of which the cholesteric liquid crystal material is the rod-like liquid crystal compound, and then is in the non-polarization state.

Next, in the red light (R) reflection layer 16R-r of which the cholesteric liquid crystal material is the rod-like liquid crystal compound, the selective reflection region is short wave-shifted to the region of the green light with respect to the oblique light, and thus the red light (R) reflection layer functions as the light reflection layer with respect to the oblique light of the green light, and light which is transmitted without light reflection is affected by the retardation having positive Rth. For this reason, the transmitted light of the oblique light of the green light in the non-polarization state is affected by positive Rth from the left circular polarization, and is in the polarization state of a point B1 in FIG. 10B.

Next, in the green light (G) reflection layer 16G-r of which the cholesteric liquid crystal material is the rod-like liquid crystal compound, the selective reflection region is short wave-shifted to the region of the blue light with respect to the oblique light, and thus the green light (G) reflection layer functions as the retardation layer having positive Rth with respect to the oblique light of the green light. For this reason, the point B1 is affected by positive Rth, and is in the polarization state of a point B2.

Next, in the vertical alignment layer of the disk-like compound of the λ/4 plate, the polarization state of the point B2 is affected by the retardation of the λ/4 plate, is rotated around an axis in the vicinity of S2 by approximately 90° in a right direction, and thus is in a state of B3.

Next, in the support, when a film having no anisotropy in the in-plane direction and the film thickness direction is used, the polarization state of the point B2 is not moved from B3.

Next, in the polarizer, B3' which is obtained by reflecting B3 on the S1 axis is in a position separated from T0, and thus the oblique light of the green light has reduced transmittance of less than or equal to 70% compared to a case where conversion to complete linear polarization is performed.

Finally, transition of a polarization state of red light (wavelength=635 nm) incident at a polar angle of 60° in the slow axis direction of the polarizer will be described without reference to the drawings. The oblique light of the red light in the non-polarization state which exits from the light source is not reflected by the blue light (B) reflection layer 16B-r of which the cholesteric liquid crystal material is the rod-like liquid crystal compound and the selective reflection region is short wave-shifted to a region of ultraviolet light with respect to the oblique light, and the transmitted light is also in the non-polarization state.

Next, in the red light (R) reflection layer 16R-r of which the cholesteric liquid crystal material is the rod-like liquid crystal compound and the selective reflection region is short wave-shifted to the region of the green light with respect to the oblique light, the oblique light of the red light which is transmitted without light reflection is in the non-polarization state.

Next, in the green light (G) reflection layer 16G-r, the red light is not reflected, and the transmitted light is also in the non-polarization state.

Therefore, the oblique light of the red light is transmitted through the third light reflection layer, the second light reflection layer, the first light reflection layer, the λ/4 plate, and the support in the non-polarization state, and then is transmitted through the polarizer. For this reason, the oblique light of the red light is in an approximately complete linear polarization state, and thus the transmittance does not decrease.

From the above description, when the oblique light is incident on the optical sheet member of Comparative Example 5 illustrated in FIG. 7, a transmittance balance between the blue light, the green light, and the red light deteriorates, and thus causes oblique coloring.

Figure 11A:
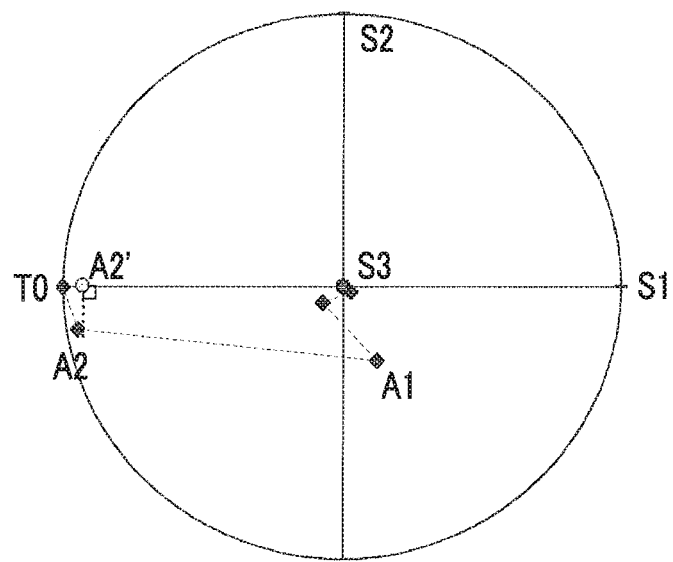
FIG. 11A is a schematic view when transition of a polarization state of blue light (wavelength=465 nm) incident at a polar angle of 60° in a slow axis direction of a polarizer with respect to an optical sheet of Example 12 is plotted on a Poincare sphere.
Figure 11B:
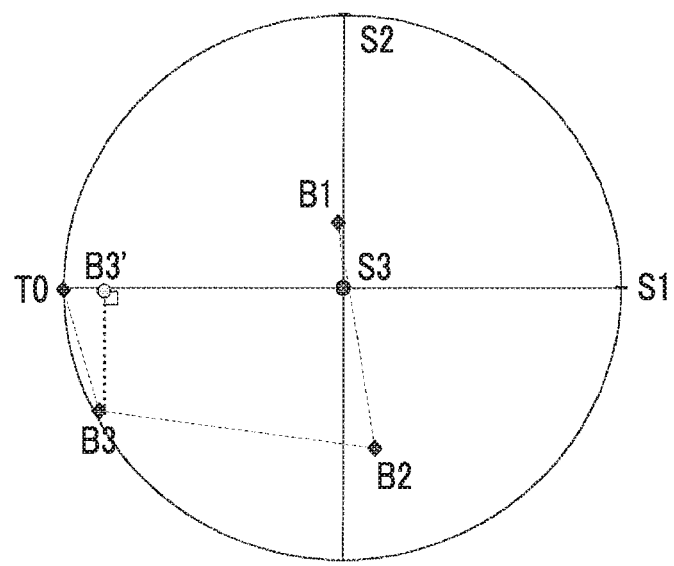
FIG. 11B is a schematic view when transition of a polarization state of green light (wavelength=535 nm) incident at a polar angle of 60° in a slow axis direction of a polarizer with respect to an optical sheet member of Example 11 is plotted on a Poincare sphere.

In contrast, the occurrence of the oblique shade in the optical sheet member of Example 12 illustrated in FIG. 8 will be described by using a Poincare sphere illustrated in FIGS. 11A and 11B. FIGS. 11A and 11B are diagrams when the Poincare sphere is seen from the S3 axis direction.

First, in FIG. 11A, transition of a polarization state of blue light (wavelength=465 nm) incident at a polar angle of 60° in the slow axis direction of the polarizer will be described.

The red light (R) reflection layer 16R-r of which the cholesteric liquid crystal material is the rod-like liquid crystal compound is replaced by a layer 16R-d of which the cholesteric liquid crystal material is a disk-like liquid crystal compound with respect to the optical sheet member of Comparative Example 5, but the blue light is transmitted through the layer 16R-d in the non-polarization state, and thus the oblique light of the blue light transmitted through the optical sheet member of Example 12 is transitioned to be completely identical to the oblique light of the blue light which is transmitted through the optical sheet member of Comparative Example 5, and thus the transmittance of the oblique light of the blue light is identical to that of the optical sheet member of Comparative Example 5 described above.

On the other hand, in FIG. 11B, transition of a polarization state of green light (wavelength=535 nm) incident at a polar angle of 60° in the slow axis direction of the polarizer will be described.

In the oblique light of the green light in the non-polarization state which exits from the light source, as with the oblique light of the blue light illustrated in FIG. 11A, the oblique light of the green light in the non-polarization state which exits from the light source is transmitted through the blue light (B) reflection layer 16B-r of which the cholesteric liquid crystal material is the rod-like liquid crystal compound, and then is in the non-polarization state.

Next, in the red light (R) reflection layer 16R-d of which the cholesteric liquid crystal material is the disk-like liquid crystal compound, the selective reflection region is short wave-shifted to the region of the green light with respect to the oblique light, and thus the red light (R) reflection layer functions as the light reflection layer with respect to the oblique light of the green light, and light which is transmitted without light reflection is affected by retardation having negative Rth. Accordingly, the transmitted light of the oblique light of the green light in the non-polarization state is affected by the negative Rth from the left circular polarization, and is in the polarization state of a point B1 in FIG. 11B. The cholesteric liquid crystal material of the red light (R) reflection layer is replaced by the disk-like liquid crystal compound with respect to the optical sheet member of Comparative Example 5, and thus the sign of Rth of the red light reflection layer is changed from a positive sign to a negative sign, and the position of B1 in FIG. 11B at the time of using the optical sheet member of Example 12 is in a direction opposite to the position of B1 in FIG. 10B at the time of using the optical sheet member of Comparative Example 5.

Next, in the green light (G) reflection layer 16G-r of which the cholesteric liquid crystal material is the rod-like liquid crystal compound, the selective reflection region is short wave-shifted to the region of the blue light with respect to the oblique light, and thus the green light (G) reflection layer functions as the retardation layer having positive Rth with respect to the oblique light of the green light. For this reason, the point B1 is affected by positive Rth, and is in the polarization state of a point B2. The position of B2 in FIG. 11B at the time of using the optical sheet member of Example 12 is different from the position of B2 in FIG. 10B at the time of using the optical sheet member of Comparative Example 5, and is close to the left circular polarization.

Next, in the vertical alignment layer of the disk-like compound of the λ/4 plate, the polarization state of the point B2 is affected by the retardation of the λ/4 plate, is rotated around an axis in the vicinity of S2 by approximately 90° in a right direction, and thus is in a state of B3.

Next, in the support, when a film having no anisotropy in the in-plane direction and the film thickness direction is used, the polarization state of the point B2 is not moved from B3.

Next, in the polarizer, B3' which is obtained by projecting B3 on the S1 axis is in a position separated from T0, and thus the oblique light of the green light is able to maintain the transmittance of greater than or equal to 80% compared to a case where conversion to complete linear polarization is performed.

The description of red light incident at a polar angle of 60° in the slow axis direction of the polarizer is identical to the description of the oblique light of the red light in the optical sheet member of Comparative Example 5. That is, the oblique light of the red light is transmitted through the third light reflection layer, the second light reflection layer, the first light reflection layer, the λ/4 plate, and the support in the non-polarization state, and then is transmitted through the polarizer. For this reason, the oblique light of the red light is in an approximately complete linear polarization state, and thus the transmittance does not decrease.

From the above description, it is found that when the oblique light is incident on the optical sheet member of Example 12 in which the cholesteric liquid crystal material of any one of the first light reflection layer and the second light reflection layer described above is the rod-like liquid crystal compound, and the cholesteric liquid crystal material of the other one is the disk-like liquid crystal compound, a transmittance balance between the blue light, the green light, and the red light becomes excellent and the oblique coloring is solved, compared to a case where the oblique light is incident on the optical sheet member of Comparative Example 5 in which all of the cholesteric liquid crystal materials of the first light reflection layer and the second light reflection layer described above are the rod-like liquid crystal compound.

Even when a combination of the arrangement of the cholesteric blue light reflection layer, the cholesteric green light reflection layer, and the cholesteric red light reflection layer (as with 6) and the arrangement of the rod-like liquid crystal compound and the disk-like liquid crystal compound (as with 8) is changed, as with the example of the optical sheet members of Example 12 and Comparative Example 5 described above, it is possible to decide the superiority of the oblique coloring by considering the transition state of the light incident from an inclination on the Poincare sphere.

It is preferable that the cholesteric liquid crystal material of any one of the first light reflection layer and the second light reflection layer is the rod-like compound, and the cholesteric liquid crystal material of the other one is the disk-like liquid crystal compound from a viewpoint of enhancing the oblique coloring, it is more preferable that the cholesteric liquid crystal material of the first light reflection layer, the second light reflection layer, and the third light reflection layer has the same configuration as that in Examples 11 to 16, and 24 described below, and it is particularly preferable that the cholesteric liquid crystal material of the first light reflection layer, the second light reflection layer, and the third light reflection layer has the same configuration as that in Examples 11 to 12, and 24 described below which is shown in Table 1 described below.

TABLE 1

| First Light Reflection Layer | Reflection Color | R | G | B |
|---|---|---|---|---|
| | Cholesteric Liquid Crystal Compound | Disk-Like | Rod-Like | Disk-Like |
| Second Light Reflection Layer | Reflection Color | B | R | G |
| | Cholesteric Liquid Crystal Compound | Rod-Like | Disk-Like | Rod-Like |
| Third Light Reflection Layer | Reflection Color | G | B | R |
| | Cholesteric Liquid Crystal Compound | Rod-Like | Rod-Like | Rod-Like |

Figure 12A:
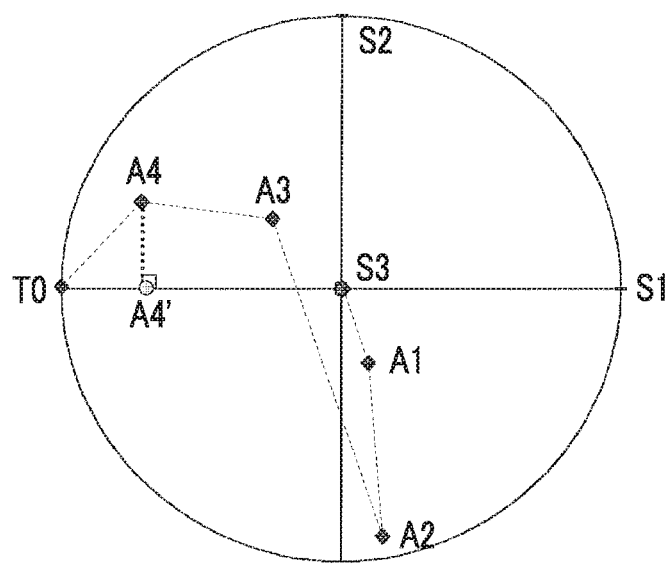
FIG. 12A is a schematic view when transition of a polarization state of blue light (wavelength=465 nm) incident at a polar angle of 60° in the slow axis direction of the polarizer with respect to the optical sheet of Example 11 is plotted on a Poincare sphere.
Figure 12B:
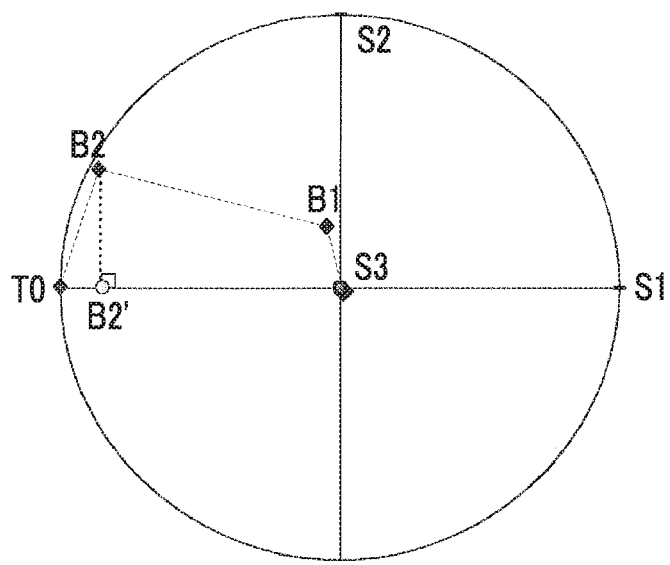
FIG. 12B is a schematic view when transition of a polarization state of green light (wavelength=535 nm) incident at a polar angle of 60° in the slow axis direction of the polarizer with respect to the optical sheet member of Example 12 is plotted on a Poincare sphere.

In an optical sheet member having the same configuration as that in Example 11 which is shown in the second column from the left side of Table 1, each transition of the polarization state of the blue light and the green light incident at a polar angle of 60° in the slow axis direction of the polarizer is illustrated in FIG. 12A and FIG. 12B. FIGS. 12A and 12B are diagrams when the Poincare sphere is seen from the S3 axis direction.

Furthermore, the transmittance balance between the blue light, the green light, and the red light is able to be changed not only by properties of the liquid crystal material of the first light reflection layer and the second light reflection layer but also by changing Re and Rth of the λ/4 plate and the support.

<Configuration>

The configuration of the luminance-enhancing film of the present invention will be described with reference to the drawings.

Figure 2:
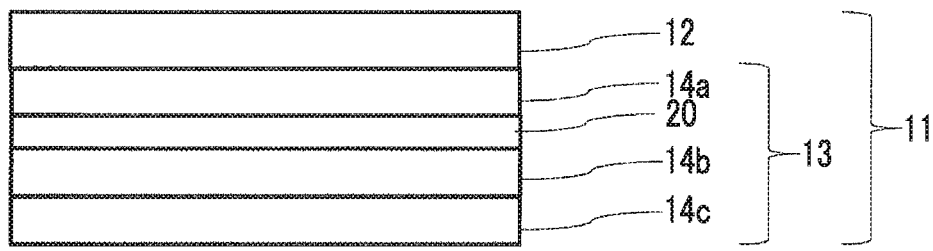
FIG. 2 is a schematic view illustrating a sectional surface of another example of the luminance-enhancing film of the present invention, and is an aspect in which the $\lambda/4$ plate and the reflection polarizer including the first light reflection layer, the second light reflection layer, and the third light reflection layer are laminated by being directly in contact with each other.

In FIG. 1, an aspect is illustrated in which a reflection polarizer 13 formed of three layers of a first light reflection layer 14a, a second light reflection layer 14b, and a third light reflection layer 14c is laminated on a λ/4 plate 12 through an adhesive layer 20 as an example of a luminance-enhancing film 11 of the present invention. The luminance-enhancing film 11 of the present invention is not limited to the aspect of FIG. 1, and as illustrated in FIG. 2, the reflection polarizer 13 including three layers of the first light reflection layer 14a, the second light reflection layer 14b, and the third light reflection layer 14c described above may be directly in contact with the λ/4 plate 12. Furthermore, the reflection polarizer 13 described above may include layers other than the first light reflection layer 14a, the second light reflection layer 14b, and the third light reflection layer 14c described above. For example, an aspect illustrated in FIG. 2 is an aspect in which the second light reflection layer 14b is laminated on the first light reflection layer 14a through the adhesive layer 20.

The λ/4 plate 12 illustrated in FIG. 1 and FIG. 2 may be a single layer or a laminated body of two or more layers, and it is preferable that the λ/4 plate 12 is the laminated body of two or more layers.

The film thickness of the luminance-enhancing film of the present invention is preferably 3 μm to 120 μm, is more preferably 5 μm to 100 μm, and is particularly preferably 6 μm to 90 μm.

<Reflection Polarizer>

The reflection polarizer described above includes the first light reflection layer, the second light reflection layer, and the third light reflection layer in this order from the λ/4 plate side, and all of the first light reflection layer, the second light reflection layer, and the third light reflection layer are light reflection layers formed by fixing a cholesteric liquid crystalline phase.

It is preferable that the reflection polarizer described above includes only the first light reflection layer, the second light reflection layer, and the third light reflection layer described above as the light reflection layer formed by fixing the cholesteric liquid crystalline phase, that is, it is preferable that the reflection polarizer described above does not include other light reflection layers formed by fixing a cholesteric liquid crystalline phases, from a viewpoint of thinning the luminance-enhancing film described above.

Any one of the first light reflection layer, the second light reflection layer, and the third light reflection layer is a blue light reflection layer which has a reflection center wavelength of 380 nm to 499 nm and a reflectivity peak having a half band width of less than or equal to 100 nm, any one of the first light reflection layer, the second light reflection layer, and the third light reflection layer is a green light reflection layer which has a reflection center wavelength of 500 nm to 599 nm and a reflectivity peak having a half band width of less than or equal to 200 nm, and any one of the first light reflection layer, the second light reflection layer, and the third light reflection layer is a red light reflection layer which has a reflection center wavelength of 600 nm to 750 nm and a reflectivity peak having a half band width of less than or equal to 150 nm.

The blue light reflection layer has a reflection center wavelength in a wavelength range of 380 nm to 499 nm, and a reflectivity peak having a half band width of less than or equal to 100 nm.

The reflection center wavelength f the blue light reflection layer is preferably in a wavelength range of 430 nm to 480 nm, and is more preferably in a wavelength range of 430 nm to 470 nm.

The half band width of the reflectivity peak of the blue light reflection layer is preferably less than or equal to 100 nm, is more preferably less than or equal to 90 nm, and is particularly preferably less than or equal to 80 nm.

It is preferable that the blue light reflection layer does not have a reflectivity peak in a wavelength range of 500 nm to 750 nm. In addition, it is preferable that in the blue light reflection layer, the average reflectivity of 500 nm to 750 nm is less than or equal to 5%.

In the blue light reflection layer, the absolute value of Rth(550) is preferably 50 nm to 300 nm, and is more preferably 80 nm to 270 nm.

In the blue light reflection layer, a film thickness d is preferably 0.5 μm to 3.0 μm, and is more preferably 1.0 μm to 2.6 μm.

The green light reflection layer has a reflection center wavelength in a wavelength range of 500 nm to 599 nm, and a reflectivity peak having a half band width of less than or equal to 200 nm.

The reflection center wavelength of the green light reflection layer is preferably in a wavelength range of 520 nm to 590 nm, and is more preferably in a wavelength range of 520 nm to 580 nm.

The half band width of the reflectivity peak of the green light reflection layer is preferably less than or equal to 160 nm, is more preferably less than or equal to 125 nm, is even more preferably less than or equal to 100 nm, and is particularly preferably less than or equal to 95 nm.

It is preferable that the green light reflection layer does not have a reflectivity peak in a wavelength range of 380 nm to 499 nm and 600 nm to 750 nm. In addition, it is preferable that in the green light reflection layer, the average reflectivity of 380 nm to 499 nm and 600 nm to 750 nm is less than or equal to 5%.

In the green light reflection layer, the absolute value of Rth(550) is preferably 70 nm to 350 nm, and is more preferably 100 nm to 330 nm.

In the green light reflection layer, a film thickness d is preferably 0.8 μm to 3.6 μm, and is more preferably greater than or equal to 1.5 μm and less than 3.3 μm.

The red light reflection layer has a reflection center wavelength in a wavelength range of 600 nm to 750 nm, and a reflectivity peak having a half band width of less than or equal to 150 nm.

The reflection center wavelength of the red light reflection layer is preferably in a wavelength range of 610 nm to 690 nm, and is more preferably in a wavelength range of 610 nm to 660 nm.

The half band width of the reflectivity peak of the red light reflection layer is more preferably less than or equal to 130 nm, is more preferably less than or equal 110 nm, and is even more preferably less than or equal 100 nm.

It is preferable that the red light reflection layer does not have a reflectivity peak in a wavelength range of 380 nm to 499 nm and 500 nm to 599 nm. In addition, it is preferable that in the red light reflection layer, the average reflectivity of 380 nm to 499 nm and 500 nm to 599 nm is less than or equal to 5%.

In the red light reflection layer, the absolute value of Rth(550) is preferably 80 nm to 400 nm, and is more preferably 120 nm to 350 nm.

In the red light reflection layer, a film thickness d is preferably 1.0 μm to 4.0 μm, and is more preferably 1.5 μm to 3.5 μm.

In the present invention, it is possible to widen the reflection range of each of the blue light reflection layer, the green light reflection layer, and the red light reflection layer. The reflection range is able to be widened by gradually changing a spiral pitch of the cholesteric liquid crystalline phase using a pitch gradient method which is able to realize a wide half band width. The pitch gradient method is able to be realized by a method disclosed in Nature 378, 467-469 (1995), JP1994-281814A (JP-H06-281814A), or JP4990426B.

(Light Reflection Layer Formed by Fixing Cholesteric Liquid Crystalline Phase)

All of the first light reflection layer, the second light reflection layer, and the third light reflection layer are light reflection layers formed by fixing a cholesteric liquid crystalline phase.

A wavelength applying a reflectivity peak (that is, a reflection center wavelength) is able to be adjusted by changing the pitch of a spiral structure or a refractive index in the cholesteric liquid crystalline phase of the light reflection layer formed by fixing the cholesteric liquid crystalline phase, and the pitch is able to be easily changed by changing an added amount of a chiral agent. Specifically, the details are described in Fuji Film Research & Development No. 50 (2005) pp. 60-63.

In the first light reflection layer, the second light reflection layer, and the third light reflection layer, spiral directions of the spiral structures of each of the cholesteric liquid crystalline phases is not particularly limited, but it is preferable that the spiral directions of the spiral structures of each of the cholesteric liquid crystalline phases of the first light reflection layer, the second light reflection layer, and the third light reflection layer are coincident with each other. For example, it is preferable that in the first light reflection layer, the second light reflection layer, and the third light reflection layer, all of the respective cholesteric liquid crystalline phases have a right spiral structure, and all of the first light reflection layer, the second light reflection layer, and the third light reflection layer reflect right circular polarization in a reflection center wavelength. Naturally, it is preferable that in the first light reflection layer, the second light reflection layer, and the third light reflection layer, all of the respective cholesteric liquid crystalline phases have a left spiral structure, and all of the first light reflection layer, the second light reflection layer, and the third light reflection layer reflect left circular polarization in a reflection center wavelength.

Thus, a method of setting an aspect in which the cholesteric liquid crystal material of any one of the first light reflection layer and the second light reflection layer is the rod-like cholesteric liquid crystal, and the cholesteric liquid crystal material of the other one is the disk-like cholesteric liquid crystal is preferable as means for realizing optical properties in which Rth(550) of the first light reflection layer described above and Rth(550) of the second light reflection layer described above have inverse signs. That is, it is preferable that in the luminance-enhancing film of the present invention, the cholesteric liquid crystal material of any one of the first light reflection layer and the second light reflection layer is the rod-like liquid crystal compound, and the cholesteric liquid crystal material of the other one is the disk-like liquid crystal compound (hereinafter, also referred to as a discotic liquid crystal compound). A light reflection layer using a rod-like liquid crystal compound as the cholesteric liquid crystal material has positive Rth, and a light reflection layer using a disk-like liquid crystal compound as the cholesteric liquid crystal material has negative Rth, and thus the luminance-enhancing film of the present invention is easily obtained by having such a configuration.

The light reflection layer formed by fixing the cholesteric liquid crystalline phase using the rod-like cholesteric liquid crystal material as the cholesteric liquid crystal material substantially functions as a negative C plate (when among three main refractive indices of an index ellipsoid, two main refractive indices in a plane are defined as Nx and Ny, and one main refractive index in a normal direction is defined as Nz, a condition of Nx=Ny>Nz is satisfied) with respect to light having a wavelength other than the selective reflection wavelength (identical to the reflection center wavelength), and thus in order to compensate the light reflection layer, it is necessary to have a function of a positive C plate (a condition of Nz>Nx=Ny is satisfied). So far, in order to compensate the light reflection layer formed by fixing the cholesteric liquid crystalline phase using the rod-like cholesteric liquid crystal material as the cholesteric liquid crystal material, a method of newly disposing a positive C plate using a material other than the cholesteric liquid crystal material or a method of imparting a function of a positive C plate to the λ/4 plate by setting the λ/4 plate to have negative Rth has been proposed, but it has not been proposed that the positive C plate is disposed as a part of the layer formed by fixing the cholesteric liquid crystalline phase which is used in a reflection polarizer. In addition, a method has not been proposed yet in which a part of the layer formed by fixing the cholesteric liquid crystalline phase which is used in the reflection polarizer contributing to circular polarization reflection is set to be the light reflection layer using the discotic liquid crystal compound as the cholesteric liquid crystal material.

Furthermore, the cholesteric liquid crystal material of the third light reflection layer may be a rod-like liquid crystal compound or a disk-like liquid crystal compound.

In addition, as described above, in the luminance-enhancing film in which the reflection polarizer used in the luminance-enhancing film includes two or more light reflection layers, at least one light reflection layer using a rod-like liquid crystal compound as the cholesteric liquid crystal material and at least one light reflection layer using a discotic liquid crystal compound as the cholesteric liquid crystal material are included in the reflection polarizer, and thus the light reflection layers formed by fixing the cholesteric liquid crystalline phase are able to compensate each other in the reflection polarizer. For example, in a case where the reflection polarizer includes two or more light reflection layers, even when one of the light reflection layers is a light reflection layer using a rod-like liquid crystal compound as the cholesteric liquid crystal material, and the other one is a light reflection layer using a discotic liquid crystal compound as the cholesteric liquid crystal material, the compensation effect described above is able to be obtained.

A manufacturing method of the light reflection layer formed by fixing the cholesteric liquid crystalline phase is not particularly limited, and for example, methods disclosed in JP1989-133003A (JP-H01-133003A), JP3416302B, JP3363565B, and JP1996-271731A (JP-H08-271731A) are able to be used.

Hereinafter, a method disclosed in JP1996-271731A (JP-H08-271731A) will be described.

When the light reflection layers formed by fixing the cholesteric liquid crystalline phase described above are superposed, it is preferable that the light reflection layers are used in a combination reflecting circular polarization in the same direction. Accordingly, it is possible to prevent all phase states of the circular polarization reflected on each of the layers from being in different polarization states in each wavelength range, and it is possible to increase utilization efficiency of light.

A suitable material may be used as the cholesteric liquid crystal material, and the cholesteric liquid crystal material is not particularly limited, but it is preferable that the rod-like liquid crystal compound and the disk-like liquid crystal compound described below are used.

Rod-Like Liquid Crystal Compound

Azomethines, azoxys, cyanobiphenyls, cyanophenyl esters, benzoic acid esters, phenyl cyclohexane carboxylic acid esters, cyanophenyl cyclohexanes, cyano-substituted phenyl pyrimidines, alkoxy-substituted phenyl pyrimidines, phenyl dioxanes, trans, and alkenyl cyclohexyl benzonitriles are preferably used as the rod-like liquid crystal compound. It is possible to use not only low molecular liquid crystalline molecules described above but also high molecular liquid crystalline molecules.

It is more preferable that alignment is fixed by polymerizing the rod-like liquid crystal compound, and compound disclosed in Makromol. Chem., Vol. 190, p. 2255 (1989), Advanced Materials, Vol. 5, p. 107 (1993), U.S. Pat. No. 4,683,327A, U.S. Pat. No. 5,622,648A, U.S. Pat. No. 5,770,107A, WO95/22586A, WO95/24455A, WO97/00600A, WO98/23580A, WO98/52905A, JP1989-272551A (JP-H01-272551A), 1994-16616A (JP-H06-16616A), 1995-110469A (JP-H07-110469A), JP1999-80081A (JP-H11-80081A), JP2001-64627, and the like are able to be used as a polymerizable rod-like liquid crystal compound. Further, for example, a rod-like liquid crystal compound disclosed in JP1999-513019A (JP-H11-513019A) or JP2007-279688A is able to be preferably used as the rod-like liquid crystal compound.

Disk-Like Liquid Crystal Compound Hereinafter, the light reflection layer formed by fixing the cholesteric liquid crystalline phase using the disk-like liquid crystal compound as the cholesteric liquid crystal material will be described.

For example, a disk-like liquid crystal compound disclosed in JP2007-108732A or JP2010-244038A is able to be preferably used as the disk-like liquid crystal compound, but the disk-like liquid crystal compound is not limited thereto.

Hereinafter, a preferred example of the disk-like liquid crystal compound will be described, but the present invention is not limited thereto.

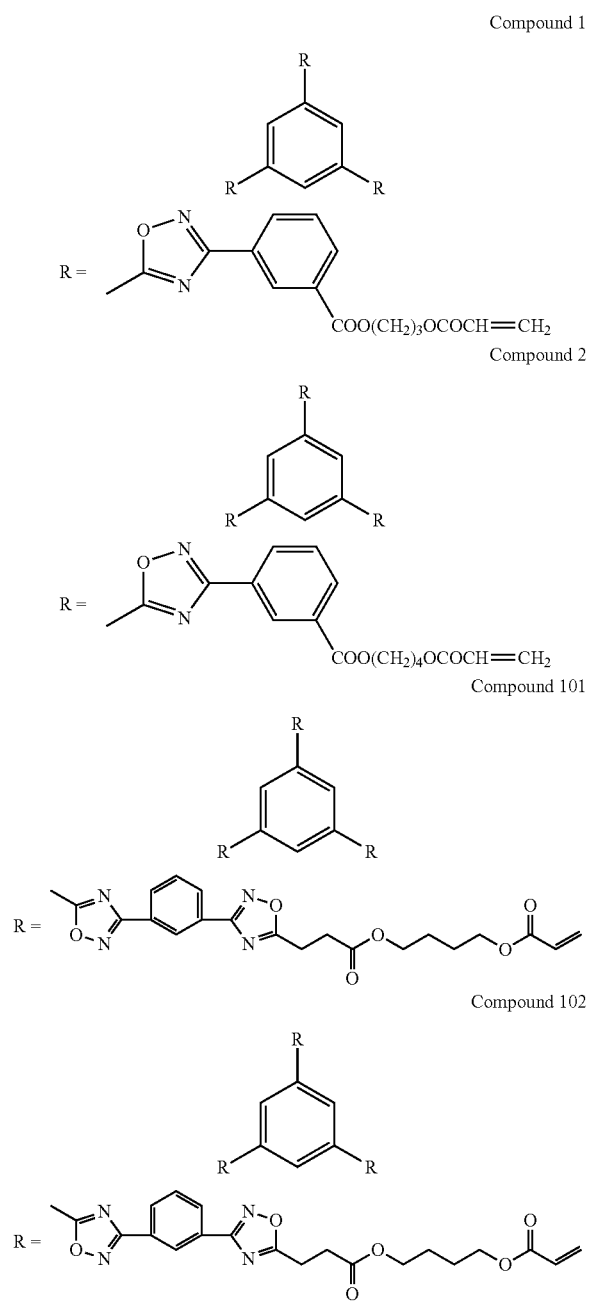

—Other Components—

A composition used for forming the light reflection layer formed by fixing the cholesteric liquid crystalline phase may contain other components such as a chiral agent, an alignment control agent, a polymerization initiator, and an alignment aid in addition to the cholesteric liquid crystal material.

The chiral agent described above is able to be selected from various known chiral agents (for example, a chiral agent disclosed in Liquid Crystal Device Handbook, Chapter 3, pp. 4-3, a chiral agent for TN and STN, and a chiral agent disclosed in p. 199, Japan Society for the Promotion of Science edited by the 142nd committee in 1989). In general, the chiral agent includes an asymmetric carbon atom, but an axial asymmetric compound or a planar asymmetric compound which does not include the asymmetric carbon atom is also able to be used as the chiral agent. In an example of the axial asymmetric compound or the planar asymmetric compound, binaphthyl, helicene, paracyclophane, and a derivative thereof are included. The chiral agent may have a polymerizable group. When the chiral agent has a polymerizable group and the rod-like liquid crystal compound used together also has a polymerizable group, a repeating unit derived from the rod-like liquid crystal compound and a polymer having a repeating unit derived from the chiral agent are able to be formed by a polymerization reaction between the chiral agent having a polymerizable group and a polymerizable rod-like liquid crystal compound. In this aspect, it is preferable that the polymerizable group of the chiral agent having a polymerizable group is identical to the polymerizable group of the polymerizable rod-like liquid crystal compound. Accordingly, the polymerizable group of the chiral agent is preferably an unsaturated polymerizable group, an epoxy group, or an aziridinyl group, is more preferably an unsaturated polymerizable group, and is particularly preferably an ethylenically unsaturated polymerizable group.

In addition, the chiral agent described above may be a liquid crystal compound.

Examples of the chiral agent exhibiting a strong twisting force include chiral agents disclosed JP2010-181852A, JP2003-287623A, JP2002-80851A, JP2002-80478A, and JP2002-302487A, and the chiral agents are able to be preferably used in the present invention. Further, isomannide compounds having a corresponding structure are able to be used as isosorbide compounds disclosed in the publications, and isosorbide compounds having a corresponding structure are able to be used as isomannide compounds disclosed in the publications.

In an example of the alignment control agent described above, a compound exemplified in "0092" and "0093" of JP2005-99248A, a compound exemplified in "0076" to "0078" and "0082" to "0085" JP2002-129162A, a compound exemplified in "0094" and "0095" of JP2005-99248A, and a compound exemplified in "0096" of JP2005-99248A are included.

A compound denoted by General Formula (I) described below is preferable as a fluorine-based alignment control agent.

$$(Hb^{11}\text{-}Sp^{11}\text{-}L^{11}\text{-}Sp^{12}\text{-}L^{12})_{m11}\text{-}A^{11}\text{-}L^{13}\text{-}T^{11}\text{-}L^{14}\text{-}A^{12}\text{-}(L^{15}\text{-}Sp^{13}\text{-}L^{16}\text{-}Sp^{14}\text{-}Hb^{11})_{n11}$$ General Formula (I)

In General Formula (I), $L^{11}$, $L^{12}$, $L^{13}$, $L^{14}$, $L^{15}$ and $L^{16}$ each independently represent a single bond, —O—, —S—, —CO—, —COO—, —OCO—, —COS—, —SCO—, —NRCO—, and —CONR— (in General Formula (I), R represents a hydrogen atom or an alkyl group having 1 to 6 carbon atoms), but —NRCO— and —CONR— have an effect of decreasing solubility and tend to increase a haze value at the time of forming a film, and thus —O—, —S—, —CO—, —COO—, —OCO—, —COS—, and —SCO— are more preferable, and —O—, —CO—, —COO—, and —OCO— are even more preferable from a viewpoint of stability of the compound. The alkyl group of R described above may be a straight-chain alkyl group or a branched alkyl group. It is more preferable that the alkyl group has 1 to 3 carbon atoms, and a methyl group, an ethyl group, and an n-propyl group are able to be exemplified as the alkyl group.

$Sp^{11}$, $Sp^{12}$, $Sp^{13}$, and $Sp^{14}$ each independently represent a single bond or an alkylene group having 1 to 10 carbon atoms, more preferably represent a single bond or an alkylene group having 1 to 7 carbon atoms, and even more preferably represent a single bond or an alkylene group having 1 to 4 carbon atoms. Here, the hydrogen atom of the alkylene group may be substituted with a fluorine atom. The alkylene group may have or may not have a branch, and it is preferable that the alkylene group is a straight-chain alkylene group not having a branch. It is preferable that $Sp^{11}$ and $Sp^{14}$ are identical to each other and $Sp^{12}$ and $Sp^{13}$ are identical to each other from a viewpoint of synthesis.

$A^{11}$ and $A^{12}$ represent a trivalent or tetravalent aromatic hydrocarbon. The number of carbon atoms of the trivalent or tetravalent aromatic hydrocarbon group is preferably 6 to 22, is more preferably 6 to 14, is even more preferably 6 to 10, and is still more preferably 6. The trivalent or tetravalent aromatic hydrocarbon group represented by $A^{11}$ and $A^{12}$ may have a substituent group. Examples of such a substituent group are able to include an alkyl group having 1 to 8 carbon atoms, an alkoxy group, a halogen atom, a cyano group, or an ester group. The description and the preferred range of the groups are able to refer to the description corresponding to T described below. Examples of the substituent group with respect to the trivalent or tetravalent aromatic hydrocarbon group represented by $A^{11}$ and $A^{12}$ are able to include a methyl group, an ethyl group, a methoxy group, an ethoxy group, a bromine atom, a chlorine atom, a cyano group, and the like. Molecules having a large amount of perfluoroalkyl portion in the molecules are able to align liquid crystals in a small added amount and cause a decrease in haze, and thus it is preferable that $A^{11}$ and $A^{12}$ represent the tetravalent aromatic hydrocarbon group such that a large amount of perfluoroalkyl group is included in the molecules. It is preferable that $A^{11}$ and $A^{12}$ are identical to each other from a viewpoint of synthesis.

It is preferable that $T^{11}$ represents a bivalent group or a bivalent aromatic heterocyclic group (X included in $T^{11}$ described above represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms) denoted by

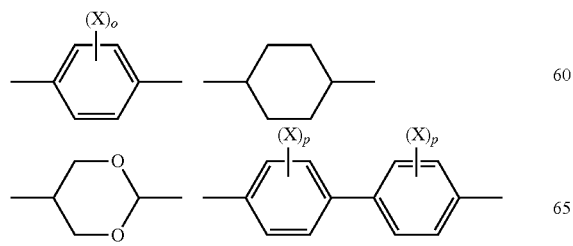

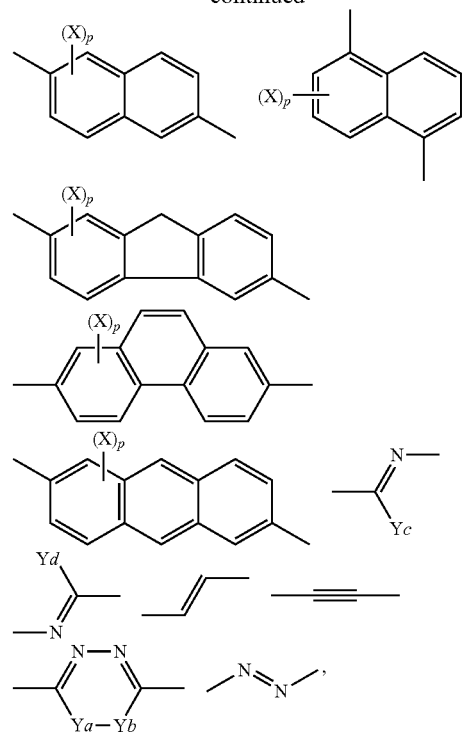

it is more preferable that $T^{11}$ represents

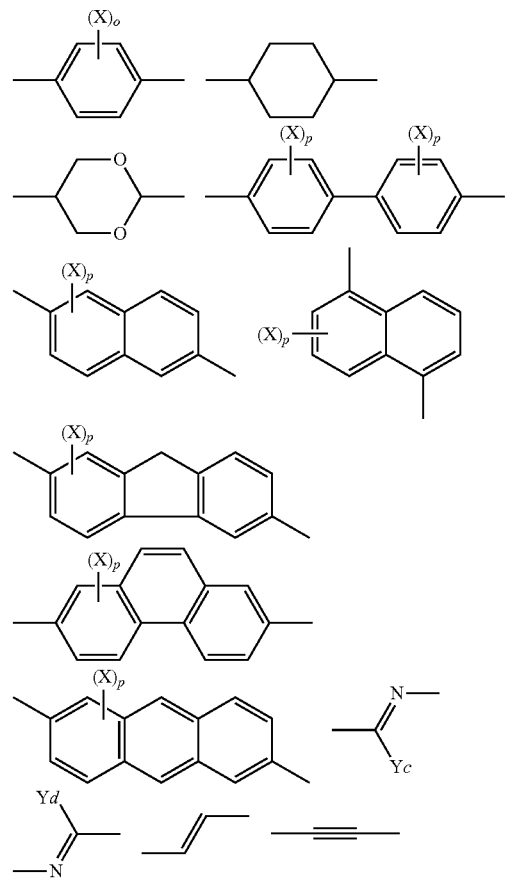

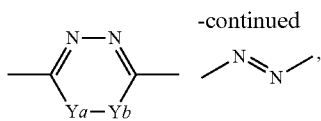

it is even more preferable that $T^{11}$ represents

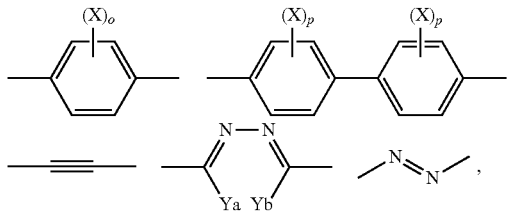

and it is still more preferable that $T^{11}$ represents

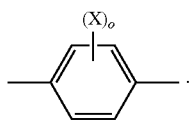

The number of carbon atoms of the alkyl group of X included in $T^{11}$ described above is 1 to 8, is preferably 1 to 5, and is more preferably 1 to 3. The alkyl group may be any one of a straight-chain alkyl group, a branched alkyl group, and a cyclic alkyl group, and the straight-chain alkyl group or the branched alkyl group is preferable. A methyl group, an ethyl group, an n-propyl group, an isopropyl group, and the like are able to be exemplified as a preferred alkyl group, and among them, the methyl group is preferable. An alkyl portion of the alkoxy group of X included in $T^{11}$ described above is able to refer to the description and the preferred range of the alkyl group of X included in $T^{11}$ described above. Examples of the halogen atom of X included in $T^{11}$ described above are able to include a fluorine atom, a chlorine atom, a bromine atom, and an iodine atom, and the chlorine atom and the bromine atom are preferable. A group denoted by R'COO— is able to be exemplified as the ester group of X included in $T^{11}$ described above. Examples of R' are able to include an alkyl group having 1 to 8 carbon atoms. The description and the preferred range of the alkyl group of R' are able to refer to the description and the preferred range of the alkyl group of X included in $T^{11}$ described above. Specific examples of ester are able to include $CH_3COO$— and $C_2H_5COO$—. The alkyl group having 1 to 4 carbon atoms of Ya, Yb, Yc, and Yd may be a straight-chain alkyl group or a branched alkyl group. For example, a methyl group, an ethyl group, an n-propyl group, an isopropyl group, and the like are able to be exemplified as the alkyl group.

It is preferable that the bivalent aromatic heterocyclic group has a 5-membered hetero ring, a 6-membered hetero ring, or a 7-membered hetero ring. The 5-membered ring or the 6-membered ring is more preferable, and the 6-membered ring is most preferable. A nitrogen atom, an oxygen atom, and a sulfur atom are preferable as a hetero atom configuring the hetero ring. It is preferable that the hetero ring is an aromatic hetero ring. In general, the aromatic hetero ring is an unsaturated hetero ring. It is more preferable that the unsaturated hetero ring is an unsaturated hetero ring having the maximum number of double bonds. Examples of the hetero ring include a furan ring, a thiophene ring, a pyrrole ring, a pyrroline ring, a pyrrolidine ring, an oxazole ring, an isooxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thin ring, a pyridine ring, a piperidine ring, an oxazine ring, a morpholine ring, a thiazine ring, a pyridazine ring, a pyrimidine ring, a pyrazine ring, a piperazine ring, and a triazine ring. The bivalent heterocyclic group may have a substituent group. The description and the preferred range of such examples of the substituent group are able to refer to the description and the disclosure of the substituent group of the trivalent aromatic hydrocarbon or the tetravalent aromatic hydrocarbon of $A^{11}$ and $A^{12}$ described above.

$Hb^{11}$ represents a perfluoroalkyl group having 2 to 30 carbon atoms, more preferable represents a perfluoroalkyl group having 3 to 20 carbon atoms, and even more preferable represents a perfluoroalkyl group having 3 to 10 carbon atoms. The perfluoroalkyl group may be any one of a straight-chain perfluoroalkyl group, a branched perfluoroalkyl group, and a cyclic perfluoroalkyl group, the straight-chain perfluoroalkyl group or the branched perfluoroalkyl group is preferable, and the straight-chain perfluoroalkyl group is more preferable.

m11 and n11 each independently represent integer of 0 to 3, and m11+n11≥1. At this time, a plurality of structures within the parenthesis may be identical to each other or different from each other, it is preferable that the plurality of structures are identical to each other. In General Formula (I), m11 and n11 are determined according to the valence of $A^{11}$ and $A^{12}$, and the preferred range thereof is also determined according to the preferred range of the valence of $A^{11}$ and $A^{12}$.

o and p included in $T^{11}$ each independently represent an integer of greater than or equal to 0, and when o and p are greater than or equal to 2, a plurality of Xs may be identical to each other or different from each other. It is preferable that o included in $T^{11}$ is 1 or 2. It is preferable that p included in $T^{11}$ is an integer of any one of 1 to 4, and it is more preferable that p is 1 or 2.

In the compound denoted by General Formula (I), a molecular structure may have symmetry or may not have symmetry. Furthermore, here, symmetry indicates symmetry which corresponds to any one of point symmetry, line symmetry, and rotational symmetry, and asymmetry indicates symmetry which does not correspond to any one of the point symmetry, the line symmetry, and the rotational symmetry.

The compound denoted by General Formula (I) is a compound in which the perfluoroalkyl group ($Hb^{11}$) described above, linking groups of -(-$Sp^{11}$-$L^{11}$-$Sp^{12}$-$L^{12}$-$)_{m11}$-$A^{11}$-$L^{13}$- and -$L^{14}$-$A^{12}$-($L^{15}$-$Sp^{13}$-$L^{16}$-$Sp^{14}$-$)_{n11}$-, and preferably a compound combined with T which is a bivalent group having an excluded volume effect. It is preferable that two perfluoroalkyl groups ($Hb^{11}$) in the molecules are identical to each other, and the linking groups of -(-$Sp^{11}$-$L^{11}$-$Sp^{12}$-$L^{12}$-$)_{m11}$-$A^{11}$-$L^{13}$- and -$L^{14}$-$A^{12}$-($L^{15}$-$Sp^{13}$-$L^{16}$-$Sp^{14}$-$)_{n11}$- in the molecules are also identical to each other. It is preferable that $Hb^{11}$-$Sp^{11}$-$L^{11}$-$Sp^{12}$- and -$Sp^{13}$-$L^{16}$-$Sp^{14}$-$Hb^{11}$ on a terminal are groups denoted by any one of the following general formulas.

$(C_aF_{2a+1})—(C_bH_{2b})—$ $(C_aF_{2a+1})—(C_bH_{2b})—O—(C_rH_{2r})—$ $(C_aF_{2a+1})\text{—}(C_bH_{2b})\text{—}COO\text{—}(C_rH_{2r})\text{—}$ $(C_aF_{2a+1})\text{—}(C_bH_{2b})\text{—}OCO\text{—}(C_rH_{2r})\text{—}$ In the above description, a preferably represents 2 to 30, more preferably represents 3 to 20, and even more preferably represents 3 to 10. b preferably represents 0 to 20, more preferably represents 0 to 10, and even more preferably represents 0 to 5. a+b represents 3 to 30. r preferably represents 1 to 10, and more preferably represents 1 to 4.

In addition, it is preferable that $Hb^{11}\text{-}Sp^{11}\text{-}L^{11}\text{-}Sp^{12}\text{-}L^{12}\text{-}$ and $\text{-}L^{14}\text{-}Sp^{13}\text{-}L^{16}\text{-}Sp^{14}\text{-}Hb^{11}$ on the terminal of General Formula (I) are groups denoted by any one of the following general formulas.

$(C_aF_{2a+1})\text{—}(C_bH_{2b})\text{—}O\text{—}$ $(C_aF_{2a+1})\text{—}(C_bH_{2b})\text{—}COO\text{—}$ $(C_aF_{2a+1})\text{—}(C_bH_{2b})\text{—}O\text{—}(C_rH_{2r})\text{—}O\text{—}$ $(C_aF_{2a+1})\text{—}(C_bH_{2b})\text{—}COO\text{—}(C_rH_{2r})\text{—}COO\text{—}$ $(C_aF_{2a+1})\text{—}(C_bH_{2b})\text{—}OCO\text{—}(C_rH_{2r})\text{—}COO\text{—}$ In the above description, the definition of a, b, and r is identical to the definition described above.

Examples of a photopolymerization initiator include an α-carbonyl compound (disclosed in each of the specifications of U.S. Pat. No. 2,367,661A and U.S. Pat. No. 2,367,670A), acyloin ether (disclosed in the specification of U.S. Pat. No. 2,448,828A), α-hydrocarbon-substituted aromatic acyloin compounds (disclosed in the specification of U.S. Pat. No. 2,722,512A), a polynuclear quinone compound (disclosed in each of the specifications of U.S. Pat. No. 3,046,127A and U.S. Pat. No. 2,951,758A), a combination of a triarylimidazole dimer and p-amino phenyl ketone (disclosed in the specification of U.S. Pat. No. 3,549,367A), an acridine compound and a phenazine compound (disclosed in JP1985-105667A (JP-S60-105667A) and in the specification of U.S. Pat. No. 4,239,850A) and an oxadiazole compound (disclosed in the specification of U.S. Pat. No. 4,212,970A), an acyl phosphine oxide compound (disclosed in JP1988-40799B (JP-S63-40799B), JP1993-29234B (JP-H05-29234B), JP1998-95788A (JP-H10-95788A), and JP1998-29997A (JP-H10-29997A)), and the like.

Solvent:

An organic solvent is preferably used as a solvent of a composition for forming each of the light reflection layers. Examples of the organic solvent include amide (for example, N,N-dimethyl formamide), sulfoxide (for example, dimethyl sulfoxide), a hetero ring compound (for example, pyridine), hydrocarbon (for example, benzene and hexane), alkyl halide (for example, chloroform and dichloromethane), ester (for example, methyl acetate and butyl acetate), ketone (for example, acetone, methyl ethyl ketone, and cyclohexanone), and ether (for example, tetrahydrofuran and 1,2-dimethoxyethane). The alkyl halide and the ketone are preferable. Two or more types of organic solvents may be used together.

The luminance-enhancing film of the present invention includes the first light reflection layer, the second light reflection layer, and the third light reflection layer which are liquid crystal films formed by fixing a cholesteric liquid crystalline phase formed by polymerizing a mixture of a liquid crystal compound and the like which are cholesteric liquid crystal materials.

It is also preferable that the luminance-enhancing film of the present invention includes the support, and may include the liquid crystal film formed by fixing the cholesteric liquid crystalline phase formed by polymerizing the mixture of the liquid crystal compound and the like which are the liquid crystal materials on the support. However, in the present invention, the liquid crystal film formed by fixing the cholesteric liquid crystalline phase may be formed by using the λ/4 plate itself included in the luminance-enhancing film of the present invention as the support, and the liquid crystal film formed by fixing the cholesteric liquid crystalline phase may be formed by using the entire λ/4 plate formed on the support as the support.

On the other hand, the luminance-enhancing film of the present invention may not include the support at the time of forming the first light reflection layer, the second light reflection layer, and the third light reflection layer, and for example, the first light reflection layer, the second light reflection layer, and the third light reflection layer are formed by using glass or a transparent film as the support at the time of forming the first light reflection layer, the second light reflection layer, and the third light reflection layer, and then only the first light reflection layer, the second light reflection layer, and the third light reflection layer are peeled off from the support at the time of film formation and are used in the luminance-enhancing film of the present invention. Furthermore, when only the first light reflection layer, the second light reflection layer, and the third light reflection layer are peeled off from the support at the time of film formation after the first light reflection layer, the second light reflection layer, and the third light reflection layer are formed, it is preferable that the first light reflection layer, the second light reflection layer, and the third light reflection layer which have been peeled off are bonded to the adhesive layer by using a film in which the λ/4 plate and the adhesive layer (and/or an adhesive material) are laminated, and thus the luminance-enhancing film of the present invention is formed.

In addition, it is preferable that a film in which the λ/4 plate and the first light reflection layer are formed on the support in this order and a film in which the third light reflection layer and the second light reflection layer are formed on the support in this order are bonded to each other by disposing the adhesive layer (and/or the adhesive material) between the first light reflection layer and the second light reflection layer, and thus luminance-enhancing film of the present invention is formed. At this time, the support may be peeled off after the adhesion.

The first light reflection layer, the second light reflection layer, and the third light reflection layer which are used in the luminance-enhancing film by being formed using a method of applying a mixture of liquid crystal compound and the like are able to be formed. The mixture of the liquid crystal compound and the like is applied onto the alignment layer, and the liquid crystal layer is formed, and thus an optical anisotropy element is able to be prepared.

The light reflection layer formed by fixing the cholesteric liquid crystalline phase is formed by a suitable method such as a method of directly applying the mixture onto the λ/4 plate or other light reflection layers, as necessary, through a suitable alignment layer such as an oblique vapor deposition layer of polyimide or polyvinyl alcohol, and SiO, and a method of applying the mixture onto the support which is not modified at an alignment temperature of a liquid crystal and is formed of a transparent film or the like, as necessary, through the alignment layer. In addition, a method of superposing the cholesteric liquid crystal layer through the alignment layer, and the like are able to be adopted.

Furthermore, the mixture of the liquid crystal compound and the like is able to be applied by a suitable method such as a method of spreading a liquid material such as solution of a solvent or a melting liquid solvent due to heating using a roll coating method or a gravure printing method, a spin coating method, and the like. The liquid crystalline molecules are fixed by maintaining the alignment state. It is preferable that the fixing is performed by a polymerization reaction of a polymerizable group which is introduced into the liquid crystalline molecules.

In the polymerization reaction, a thermal polymerization reaction using a thermal polymerization initiator and a photopolymerization reaction using a photopolymerization initiator are included. The photopolymerization reaction is preferable. It is preferable that an ultraviolet ray is used in light irradiation for polymerizing the liquid crystalline molecules. The irradiation energy is preferably 20 mJ/cm$^2$ to 50 J/cm$^2$, and is more preferably 100 mJ/cm$^2$ to 800 mJ/cm$^2$. In order to accelerate the photopolymerization reaction, the light irradiation may be performed under heating conditions. The thickness of the light reflection layer to be formed, which is formed by fixing the cholesteric liquid crystalline phase is preferably 0.1 μm to 100 μm, is more preferably 0.5 μm to 50 μm, is even more preferably 1 μm to 30 μm, and is most preferably 2 μm to 20 μm, from a viewpoint of preventing selective reflection properties, alignment disorder, a decrease in transmittance, and the like.

When each of the light reflection layers of the luminance-enhancing film of the present invention is formed by coating, it is preferable that the coating liquid described above is applied, and then is dried by a known method and is solidified, and thus each of the light reflection layers is formed. Drying due to heating is preferable as the drying method.

An example of the manufacturing method of each of the light reflection layers is a manufacturing method including at least (1) applying a polymerizable liquid crystal composition onto the surface of the substrate or the like to be in a state of a cholesteric liquid crystalline phase, and (2) irradiating the polymerizable liquid crystal composition described above with an ultraviolet ray to be subjected to a curing reaction, and forming each of the light reflection layers by fixing the cholesteric liquid crystalline phase.

Steps of (1) and (2) are repeated two times on one surface of the substrate, and thus a laminated body of the light reflection layer formed by fixing the cholesteric liquid crystalline phase is able to be prepared in which the number of laminations increases.

Furthermore, a turning direction of the cholesteric liquid crystalline phase is able to be adjusted according to the type of liquid crystal to be used or the type of chiral agent to be added, a spiral pitch (that is, a selective reflection wavelength) is able to be adjusted by the concentration of the material. In addition, it is known that a wavelength in a specific region which is reflected on each of the light reflection layer is able to be shifted according to various factors of the manufacturing method, and is able to be shifted according to conditions and the like such as a temperature, irradiance, and an irradiation time at the time of fixing the cholesteric liquid crystalline phase in addition to the concentration of the chiral agent or the like to be added.

It is preferable that an undercoat layer is formed on the surface of the support such as a transparent plastic resin film by coating. At this time, a coating method is not particularly limited, and a known method is able to be used as the coating method.

The alignment layer is able to be disposed by means such as a rubbing treatment of an organic compound (preferably a polymer), an oblique vapor deposition of an inorganic compound, and formation of a layer having microgrooves. Further, an alignment layer which has an alignment function by applying an electric field, by applying a magnetic field, or by light irradiation is known. It is preferable that the alignment layer is formed by performing a rubbing treatment with respect to the surface of the film of the polymer. It is preferable that the alignment layer is peeled off along with the support.

Even when the alignment layer is not be disposed, the support is directly subjected to an alignment treatment (for example, a rubbing treatment) according to the type of polymer used in the support, and thus the support is able to function as the alignment layer. Examples of such a support are able to include polyethylene terephthalate (PET).

In addition, when a direct liquid crystal layer is laminated on the liquid crystal layer, the liquid crystal layer on the lower layer may align the liquid crystal on the upper layer which functions as the alignment layer. In this case, even when the alignment layer is not disposed and even when a special alignment treatment (for example, a rubbing treatment) is not performed, the liquid crystal on the upper layer is able to be aligned.

—Rubbing Treatment—

It is preferable that the surface of the alignment layer or the support is subjected to a rubbing treatment. In addition, the surface of the optical anisotropic layer, as necessary, is able to be subjected to a rubbing treatment. In general, the rubbing treatment is able to be performed by rubbing the surface of a film containing a polymer as a main component with paper or cloth in a constant direction. A general method of the rubbing treatment, for example, is disclosed in "Liquid Crystal Handbook" (published by Maruzen Company, Limited, Oct. 30, 2000).

A method disclosed in "Liquid Crystal Handbook" (published by Maruzen Company, Limited) is able to be used as a method of changing a rubbing density. A rubbing density (L) is able to be quantified by Expression (A) described below.

$$L=Nl(1+2\pi rn/60v) \quad \text{Expression (A)}$$

In Expression (A), N represents the number of rubbing treatments, l represents a contact length of a rubbing roller, r represents the radius of the roller, n represents the number of rotations of the roller (rpm), and v represents stage shifting speed (per second).

In order to increase the rubbing density, the number of rubbing treatments may increase, the contact length of the rubbing roller may increase, the radius of the roller may increase, the number of rotations of the roller may increase, and the stage shifting speed may decrease, and in order to decrease the rubbing density, these factors are adjusted vice versa. In addition, conditions at the time of performing the rubbing treatment are able to refer to conditions disclosed in JP4052558B.

In the step of (1) described above, first, the polymerizable liquid crystal composition described above is applied onto the surface of the support, the substrate, or the like, or the light reflection layer on the lower layer. It is preferable that the polymerizable liquid crystal composition described above is prepared as a coating liquid in which a material is dissolved and/or dispersed in a solvent. The coating liquid described above is applied by various methods such as a wire bar coating method, an extrusion coating method, a direct gravure coating method, a reverse gravure coating method, and a die coating method. In addition, the liquid crystal composition is ejected from a nozzle by using an ink jet device, and thus a coated film is able to be formed.

Next, the polymerizable liquid crystal composition which is applied onto the surface, and thus becomes the coated film is in a state of a cholesteric liquid crystalline phase. In an aspect where the polymerizable liquid crystal composition described above is prepared as a coating liquid including a solvent, the solvent is removed by drying the coated film, and thus the polymerizable liquid crystal composition may be in the state of the cholesteric liquid crystalline phase. In addition, in order to set a transition temperature with respect to the cholesteric liquid crystalline phase, as desired, the coated film described above may be heated. For example, first, the coated film is heated to the temperature of an isotropic phase, and then, is cooled to a cholesteric liquid crystalline phase transition temperature, and thus it is possible to stably set the polymerizable liquid crystal composition in the state of the cholesteric liquid crystalline phase. The liquid crystalline phase transition temperature of the polymerizable liquid crystal composition described above is preferably in a range of 10° C. to 250° C., and is more preferably in a range of 10° C. to 150° C., from a viewpoint of manufacturing suitability or the like. When the liquid crystalline phase transition temperature is lower than 10° C., a cooling step is necessary in order to decrease the temperature to a temperature range at which a liquid crystalline phase is exhibited. In addition, when the liquid crystalline phase transition temperature is higher than 200° C., first, a high temperature is required in order to set the polymerizable liquid crystal composition in an isotropic liquid state of which the temperature is higher than the temperature range at which the crystalline phase is exhibited, and thus setting the liquid crystalline phase transition temperature to be higher than 200° C. is disadvantageous from a viewpoint of waste of thermal energy, deformation of a substrate, modification, and the like.

Next, in the step of (2), the coated film which is in the state of the cholesteric liquid crystalline phase is irradiated with an ultraviolet ray, and thus is subjected to a curing reaction. In ultraviolet irradiation, a light source such as an ultraviolet lamp is used. In this step, polymerizable liquid crystal composition described above is subjected to the curing reaction by being irradiated with the ultraviolet ray, and the cholesteric liquid crystalline phase is fixed, and thus the light reflection layer is formed.

The amount of irradiation energy of the ultraviolet ray is not particularly limited, but in general, it is preferable that the amount of irradiation energy is approximately 100 mJ/cm$^2$ to 800 mJ/cm$^2$. In addition, a time for irradiating the coated film described above with the ultraviolet ray is not particularly limited, and will be determined from a viewpoint of both of sufficient strength and productivity of a cured film.

In order to accelerate the curing reaction, the ultraviolet irradiation may be performed under heating conditions. In addition, it is preferable that temperature at the time of performing the ultraviolet irradiation is maintained to be in a temperature range at which the cholesteric liquid crystalline phase is exhibited such that the cholesteric liquid crystalline phase is not disordered. In addition, an oxygen concentration in the atmosphere relates to the degree of polymerization, and thus a desired degree of polymerization is not obtained in the air, and when the strength of the film is insufficient, it is preferable that the oxygen concentration in the atmosphere decreases by a method such as nitrogen substitution. The oxygen concentration is preferably less than or equal to 10%, is more preferably less than or equal to 7%, and is most preferably less than or equal to 3%. A reaction rate of the curing reaction (for example, a polymerization reaction) performed by the ultraviolet irradiation is preferably greater than or equal to 70%, is more preferably greater than or equal to 80%, and is even more preferably greater than or equal to 90%, from a viewpoint of maintaining mechanical strength of the layer or preventing an unreacted substance from being eluted from the layer. In order to enhance the reaction rate, a method of increasing the irradiation dose of the ultraviolet ray to be emitted or polymerization under a nitrogen atmosphere or under heating conditions is effective. In addition, a method in which first, the polymerization is performed, and then the temperature is maintained in a high temperature state which is higher than the polymerization temperature, and thus the reaction is further performed by a thermal polymerization reaction or a method in which the ultraviolet irradiation is performed again (here, the ultraviolet irradiation is performed in conditions satisfying the conditions of the present invention) is able to be used. The reaction rate is able to be measured by comparing absorption intensities of infrared vibration spectrums of a reactive group (for example, a polymerizable group) before and after the reaction.

In the step described above, the cholesteric liquid crystalline phase is fixed, and thus each of the light reflection layers is formed. Here, a state where the alignment of the liquid crystal compound in the cholesteric liquid crystalline phase is maintained is the most typical and preferred aspect as the state where the liquid crystalline phase is "fixed". The state is not limited thereto, and specifically indicates a state where the shape of alignment is able to be stably and continuously maintained in a temperature range of generally 0° C. to 50° C., and in a temperature range of −30° C. to 70° C. under more rigorous conditions without fluidity in the layer or without a change in the shape of the alignment due to an external field or an external force. In the present invention, it is preferable that the alignment state of the cholesteric liquid crystalline phase is fixed by the curing reaction which is performed by the ultraviolet irradiation.

Furthermore, in the present invention, it is sufficient, insofar as optical properties of the cholesteric liquid crystalline phase are maintained in the layer, and finally, it is not necessary that the liquid crystal composition of each of the light reflection layers exhibits liquid crystallinity any more. For example, the liquid crystal composition has a high molecular weight due to the curing reaction, and thus the liquid crystallinity may not be exhibited any more.

<λ/4 Plate>

The luminance-enhancing film of the present invention includes the λ/4 plate.

The λ/4 plate is a layer for converting circular polarization transmitted through the reflection polarizer into linear polarization.

Concurrently, the retardation (Rth) in the thickness direction is adjusted, and thus it is possible to cancel the retardation of the light reflection layer in the thickness direction which occurs at the time of being seen from the oblique azimuth.

In the luminance-enhancing film of the present invention, Rth(550) of the λ/4 plate is preferably −120 nm to 120 nm, is more preferably −80 nm to 80 nm, and is particularly preferably −70 nm to 70 nm.

In the luminance-enhancing film of the present invention, the λ/4 plate described above preferably satisfies at least one of Expressions (A) to (C) described below, and more preferably satisfy all of Expressions (A) to (C) described below.

450 nm/4−35 nm<Re(450)<450 nm/4+35 nm    Expression (A)

550 nm/4−35 nm<Re(550)<550 nm/4+35 nm    Expression (B)

630 nm/4−35 nm<Re(630)<630 nm/4+35 nm    Expression (C)

The material used in the λ/4 plate included in the luminance-enhancing film of the present invention is not particularly limited. Various polymer films, for example, a polyester-based polymer such as cellulose acylate, polycarbonate-based polymer, polyethylene terephthalate, or polyethylene naphthalate, an acrylic polymer such as polymethyl methacrylate, a styrene-based polymer such as polystyrene or an acrylonitrile-styrene copolymer (an AS resin), and the like are able to be used. In addition, a polymer film is prepared by using one type or two or more types of polymers are selected from polyolefin such as polyethylene and polypropylene, a polyolefin-based polymer such as an ethylene-propylene copolymer, an amide-based polymer such as a vinyl chloride-based polymer, nylon, or aromatic polyamide, an imide-based polymer, a sulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an acrylate-based polymer, a polyoxymethylene-based polymer, an epoxy-based polymer, or a polymer in which the polymers described above are mixed as a main component, and the polymers are used for preparing an optical film in a combination of satisfying the properties described above.

The λ/4 plate may be an optical anisotropy support having a desired λ/4 function in the support itself, or may be a plate including an optical anisotropic layer or the like on the support formed of a polymer film.

When the λ/4 plate is the optical anisotropy support having a desired λ/4 function in the support itself, for example, the optical anisotropy support is able to be obtained by a method in which a polymer film is subject to a monoaxial stretching treatment or a biaxial stretching treatment, or the like. The type of polymer is not particularly limited, but a polymer having excellent transparency is preferably used. Examples of the polymer include the materials used in the λ/4 plate, a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester resin-based film such as polyethylene terephthalate and polyethylene naphthalate, a polyacrylic resin film such as a polyether sulfone film and a polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, a polymer having an alicyclic structure (a norbornene-based resin (Arton: Product Name, manufactured by JSR Corporation), amorphous polyolefin (Zeonex: Product Name, manufactured by Zeon Corporation)), and the like. Among them, the triacetyl cellulose, the polyethylene terephthalate, and the polymer having an alicyclic structure are preferable, and the triacetyl cellulose is particularly preferable.

As described below, an angle between a slow axis direction of the λ/4 plate and an absorption axis direction of the polarizing plate is 30° to 60°, is preferably 35° to 55°, is more preferably 40° to 50°, and is particularly preferably 45°. When the polarizing plate is prepared in a roll-to-roll manner, in general, a longitudinal direction (a transport direction) is an absorption axis direction, and thus it is preferable that an angle between the slow axis direction of the λ/4 plate and the longitudinal direction is 30° to 60°. A manufacturing method of the λ/4 plate in which the angle between the slow axis direction and the longitudinal direction is 30° to 60° is not particularly limited insofar as an alignment axis of a polymer is inclined at a desired angle by being continuously stretched in a direction at 30° to 60° with respect to the longitudinal direction, and a known method is able to be adopted as the manufacturing method. In addition, a stretching machine used in oblique stretching is not particularly limited, but a known tenter stretching machine of the related art is able to be used in which a feeding force or pulling force, or a taking off force having speeds different in right and left is able to be applied in a horizontal direction or a vertical direction. In addition, examples of a tenter type stretching machine include a horizontally monoaxially stretching machine, a simultaneously biaxially stretching machine, and the like, but the tenter type stretching machine is not particularly limited insofar as a long film is able to be continuously subjected to an oblique stretching treatment, and various types of stretching machines are able to be used.

For example, methods disclosed in JP1975-83482A (JP-S50-83482A), JP1990-113920A (JP-H02-113920A), JP1991-182701A (JP-H03-182701A), JP2000-9912A, JP2002-86554A, JP2002-22944A, and WO2007/111313A are able to be used as a method of the oblique stretching.

When the λ/4 plate include the optical anisotropic layer or the like on the support formed of the polymer film, other layers are laminated on the support, and thus a desired 214 function is obtained. The configuration material of the optical anisotropic layer is not particularly limited, but the optical anisotropic layer may be a layer which is formed of a composition containing a liquid crystal compound and exhibits optical anisotropy expressed by aligning molecules of the liquid crystal compound or a layer which has optical anisotropy expressed by stretching a polymer film and by aligning the polymer in the film, or may be both of the layers. That is, the optical anisotropic layer is able to be configured of one or two or more biaxial films, and is also able to be configured of a combination of two or more monoaxial films such as a combination of a C plate and an A plate. Naturally, the optical anisotropic layer is able to be configured of a combination of one or more biaxial films and one or more monoaxial films.

It is preferable that the λ/4 plate includes at least one layer formed of the composition containing the liquid crystal compound. That is, it is preferable that the λ/4 plate is a laminated body of the polymer film (the support) and the optical anisotropic layer formed of the composition containing the liquid crystal compound.

A polymer film having small optical anisotropy may be used in the support, or a polymer film in which optical anisotropy is expressed by a stretching treatment may be used. It is preferable that the support has light transmittance of greater than or equal to 80%.

In addition, the type of liquid crystal compound used for forming the optical anisotropic layer is not particularly limited. For example, an optical anisotropic layer which is obtained by forming a low molecular liquid crystal compound in nematic alignment in a liquid crystal state, and then by fixing the alignment by photocross-linking or thermal cross-linking or an optical anisotropic layer which is obtained by forming a high molecular liquid crystal compound in nematic alignment in a liquid crystal state, and then by fixing the alignment by cooling is able to be used. Furthermore, in the present invention, even when the liquid crystal compound is used in the optical anisotropic layer, the optical anisotropic layer is a layer formed by fixing the liquid crystal compound by polymerization or the like, and it is not necessary to exhibit liquid crystallinity any more after the layer is formed. A polymerizable liquid crystal compound may be a multifunctional polymerizable liquid crystal compound or a monofunctional polymerizable liquid crystal compound. In addition, the liquid crystal compound may be a discotic liquid crystal compound or a rod-like liquid crystal compound. In the present invention, the discotic liquid crystal compound is more preferable.

For example, a rod-like liquid crystal compound disclosed in JP1999-513019A (JP-H11-513019A) or JP2007-279688A is able to be preferably used as the rod-like liquid crystal compound, and for example, a discotic liquid crystal compound disclosed in JP2007-108732A or JP2010-244038A is able to be preferably used as the discotic liquid crystal compound, but the liquid crystal compounds are not limited thereto.

In the optical anisotropic layer described above, it is preferable that the molecules of the liquid crystal compound are fixed in any one alignment state of a vertical alignment, a horizontal alignment, a hybrid alignment, and an oblique alignment. In order to prepare a phase difference plate having symmetric view angle dependency, it is preferable that a disk surface of the discotic liquid crystal compound is substantially vertical to a film surface (the surface of the optical anisotropic layer), or a long axis of the rod-like liquid crystal compound is substantially horizontal to the film surface (the surface of the optical anisotropic layer). The discotic liquid crystal compound being substantially vertical to the film surface indicates that the average value of an angle between the film surface (the surface of the optical anisotropic layer) and the disk surface of the discotic liquid crystal compound is in a range of 70° to 90°. The average value of the angle is more preferably 80° to 90°, and is even more preferably 85° to 90°. The rod-like liquid crystal compound being substantially horizontal to the film surface indicates that an angle between the film surface (the surface of the optical anisotropic layer) and a director of the rod-like liquid crystal compound is in a range of 0° to 20°. The angle is more preferably 0° to 10°, and is even more preferably 0° to 5°.

The optical anisotropic layer described above is able to be formed by applying a coating liquid containing the liquid crystal compound such as the rod-like liquid crystal compound or the discotic liquid crystal compound, and as desired, a polymerization initiator or an alignment control agent described below, or other additives onto the support. It is preferable that the optical anisotropic layer is formed by forming the alignment layer on the support, and by coating the surface of the alignment layer with the coating liquid described above.

In the present invention, it is preferable that the molecules of the liquid crystal compound are aligned by coating the surface of the alignment layer with the composition described above. The alignment layer has a function of defining the alignment direction of the liquid crystal compound, and thus it is preferable that the alignment layer is used for realizing a preferred aspect of the present invention. However, when the liquid crystal compound is aligned, and then the alignment state is fixed, the alignment layer has the function, and thus it is not necessary that the alignment layer is essential as a constituent of the present invention. That is, it is possible to prepare the polarizing plate of the present invention by transferring only the optical anisotropic layer on the alignment layer in which the alignment state is fixed onto a polarizing layer or the support.

It is preferable that the alignment layer is formed by a rubbing treatment of a polymer.

Examples of the polymer used in the alignment layer include a methacrylic copolymer, a styrene-based copolymer, polyolefin, polyvinyl alcohol and modified polyvinyl alcohol, poly(N-methylol acrylamide), polyester, polyimide, a vinyl acetate copolymer, carboxy methyl cellulose, polycarbonate, and the like disclosed in paragraph "0022" of the specification of JP1996-338913A (JP-H08-338913A). A silane coupling agent is able to be used as the polymer. A water-soluble polymer (for example, poly(N-methylol acrylamide), carboxy methyl cellulose, gelatin, polyvinyl alcohol, and modified polyvinyl alcohol) is preferable, the gelatin, the polyvinyl alcohol, and the modified polyvinyl alcohol are more preferable, and the polyvinyl alcohol and the modified polyvinyl alcohol are most preferable.

A rubbing treatment surface of the alignment layer is coated with the composition described above, and thus the molecules of the liquid crystal compound are aligned. After that, as necessary, the polymer of the alignment layer reacts with a multifunctional monomer included in the optical anisotropic layer or the polymer of the alignment layer is cross-linked by using a cross-linking agent, and thus the optical anisotropic layer described above is able to be formed.

It is preferable that the film thickness of the alignment layer is in a range of 0.1 μm to 10 μm.

In-plane retardation (Re) of the support (the polymer film) supporting the optical anisotropic layer is preferably 0 nm to 50 nm, is more preferably 0 nm to 30 nm, and is even more preferably 0 nm to 10 nm. When the in-plane retardation (Re) of the support is set to be in the range described above, it is preferable that light leakage of the reflected light is able to be reduced to the extent of being invisible.

In addition, it is preferable that retardation (Rth) of the support in the thickness direction is selected according to a combination with the optical anisotropic layer disposed on or under the support. Accordingly, the light leakage of the reflected light and coloring at the time of being observed from the oblique direction are able to be reduced.

Example of the material of the polymer film used as the support include the materials used in the λ/4 plate described above, a cellulose acylate film (for example, a cellulose triacetate film (a refractive index of 1.48), a cellulose diacetate film, a cellulose acetate butyrate film, a cellulose acetate propionate film), polyolefin such as polyethylene and polypropylene, a polyester-based resin film such as polyethylene terephthalate or polyethylene naphthalate, a polyacrylic resin film such as a polyether sulfone film and polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, and polymer having an alicyclic structure (a norbornene-based resin (Arton: Product Name, manufactured by JSR Corporation), amorphous polyolefin (Zeonex: Product Name, manufactured by Zeon Corporation)), and the like. Among them, the triacetyl cellulose, the polyethylene terephthalate, and the polymer having an alicyclic structure are preferable, and the triacetyl cellulose is particularly preferable.

A transparent support having a thickness of approximately 5 μm to 150 μm is able to be used, and the thickness of the transparent support is preferably 5 μm to 80 μm, and is more preferably 20 μm to 60 μm. In addition, the transparent support may be formed by laminating a plurality of layers. In order to suppress external light reflection, it is preferable as the thickness of the transparent support becomes thinner, but when the thickness is less than 5 µm, the strength of the film becomes weaker, and thus setting the thickness to be less than 5 µm does not tend to be preferable. In order to enhance adhesion between the transparent support and a layer disposed on the transparent support (the adhesive layer, the vertical alignment layer, or a retardation layer), the transparent support may be subjected to a surface treatment (for example, a glow discharge treatment, a corona discharge treatment, an ultraviolet ray (UV) treatment, and a flame treatment). The adhesive layer (the undercoat layer) may be disposed on the transparent support. In addition, it is preferable that a transparent support to which slidability is applied in a transporting step or a transparent support which is formed by applying a polymer layer in which inorganic particles having an average particle diameter of approximately 10 nm to 100 nm are mixed at a mass ratio of solid contents of 5% to 40% onto one surface of the support or by cocasting with the support in order to prevent a back surface from being bonded to the surface after being wound is used in the transparent support or a long transparent support.

In the luminance-enhancing film of the present invention, it is preferable that the λ/4 plate described above satisfies Expressions (1) to (3) described below.

$450 \text{ nm}/4 - 25 \text{ nm} < Re(450) < 450 \text{ nm}/4 + 25 \text{ nm}$   Expression (1)

$550 \text{ nm}/4 - 25 \text{ nm} < Re(550) < 550 \text{ nm}/4 + 25 \text{ nm}$   Expression (2)

$630 \text{ nm}/4 - 25 \text{ nm} < Re(630) < 630 \text{ nm}/4 + 25 \text{ nm}$   Expression (3)

It is more preferable that the λ/4 plate described above satisfies Expressions (1') to (3') described below.

$450 \text{ nm}/4 - 15 \text{ nm} < Re(450) < 450 \text{ nm}/4 + 15 \text{ nm}$   Expression (1')

$550 \text{ nm}/4 - 15 \text{ nm} < Re(550) < 550 \text{ nm}/4 + 15 \text{ nm}$   Expression (2')

$630 \text{ nm}/4 - 15 \text{ nm} < Re(630) < 630 \text{ nm}/4 + 15 \text{ nm}$   Expression (3')

It is particularly preferable that the λ/4 plate described above satisfies Expressions (1") to (3") described below.

$450 \text{ nm}/4 - 5 \text{ nm} < Re(450) < 450 \text{ nm}/4 + 5 \text{ nm}$   Expression (1")

$550 \text{ nm}/4 - 5 \text{ nm} < Re(550) < 550 \text{ nm}/4 + 5 \text{ nm}$   Expression (2")

$630 \text{ nm}/4 - 5 \text{ nm} < Re(630) < 630 \text{ nm}/4 + 5 \text{ nm}$   Expression (3")

In addition, in the luminance-enhancing film of the present invention, it is preferable that the λ/4 plate described above satisfies Expressions (4) to (4") described below.

$Re(450) < Re(550) < Re(630)$   Expression (4)

$Re(450) < Re(550) < Re(630)$   Expression (4')

$Re(450) < Re(550) < Re(630)$   Expression (4")

For example, a method disclosed in JP1996-271731A (JP-H08-271731A) is able to be used as a manufacturing method of the λ/4 plate satisfying Expressions (1) to (4"), and the contents of the publication are incorporated in the present invention.

Hereinafter, the method disclosed in JP1996-271731A (JP-H08-271731A) will be described.

Examples of a ¼ wavelength plate formed of a superposed body of a retardation film include a ¼ wavelength plate in which a plurality of retardation films of a combination of a retardation film applying a phase difference of a ½ wavelength to monochromatic light and a retardation film applying a phase difference of a ¼ wavelength to monochromatic light are laminated such that the optical axes thereof intersect with each other.

In this case, the plurality of retardation films applying a phase difference of a ½ wavelength or a ¼ wavelength to the monochromatic light are laminated such that the optical axes thereof are intersect with each other, and thus the wavelength dispersion of retardation defined by a product (Δnd) of a refractive index difference (Δn) of birefringence light and a thickness (d) is able to increase or decrease or is able to be superposed, and is able to be arbitrarily controlled, the wavelength dispersion is suppressed while controlling the entire phase difference such that the entire phase difference is a ¼ wavelength, and a wavelength plate exhibiting a phase difference of a ¼ wavelength over a wide wavelength range is able to be obtained.

In the case described above, the number of laminations of the retardation film is arbitrary. In general, the number of laminations of the retardation film is 2 to 5 from a viewpoint of transmittance of light or the like. In addition, an arrangement position of the retardation film applying a phase difference of a ½ wavelength and the retardation film applying a phase difference of a ¼ wavelength is also arbitrary.

In addition, in the ¼ wavelength plate formed of the superposed body of the retardation film, when retardation of light having a wavelength of 450 nm is set to $R_{450}$ and retardation of light having a wavelength of 550 nm is set to $R_{550}$, a ¼ wavelength plate is able to be obtained by laminating a retardation film having large retardation at $R_{450}/R_{550}$ of 1.00 to 1.05 and a retardation film having small retardation at $R_{450}/R_{550}$ of 1.05 to 1.20 such that the optical axes thereof intersect with each other.

In this case, the optical axes of the retardation films having different retardations intersect with each other, in particular, the retardation films are laminated such that the optical axes thereof are orthogonal to each other, and thus the wavelength dispersion of the retardation in each of the retardation films is able to be superposed or is able to increase or decrease, and is able to be controlled, and in particular, it is possible to set the retardation to be small as being closer to a short wavelength side.

In addition, specific examples of the ¼ wavelength plate described above include a retardation film formed by performing a stretching treatment with respect to a polyvinyl alcohol film (Retardation of Light Having Wavelength of 550 nm: 700 nm), a plate in which retardation films formed by performing a stretching treatment with respect to a polycarbonate film (Retardation of Light Having Wavelength of 550 nm: 560 nm) are laminated such that the optical axes thereof are orthogonal to each other, and the like. Such a laminated product approximately functions as the ¼ wavelength plate over a wavelength of 450 nm to 750 nm.

As described above, the retardation film is able to be obtained by a method of performing a stretching treatment such as monoaxial stretching or biaxial stretching, for example, with respect to a polymer film. The type of polymer is not particularly limited, but a polymer having excellent transparency is preferably used. Examples of the polymer include a polycarbonate-based polymer, a polyester-based polymer, a polysulfone-based polymer, a polyether sulfone-based polymer, a polystyrene-based polymer, a polyolefin-based polymer, a polyvinyl alcohol-based polymer, a cellulose acetate-based polymer, a polyvinyl chloride-based polymer, a polymethyl methacrylate-based polymer, and the like.

In particular, the retardation film having $R_{450}/R_{550}$ of 1.00 to 1.05, for example, is able to be formed of a polymer of which an absorption end is in the vicinity of a wavelength of 200 nm, such as a polyolefin-based polymer, a polyvinyl alcohol-based polymer, a cellulose acetate-based polymer, a polyvinyl chloride-based polymer, and a polymethyl methacrylate-based polymer.

In addition, the retardation film having $R_{450}/R_{550}$ of 1.05 to 1.20, for example, is able to be formed of a polymer of which an absorption end is on a wavelength side longer than 200 nm, such as a polycarbonate-based polymer, a polyester-based polymer, a polysulfone-based polymer, a polyether sulfone-based polymer, and a polystyrene-based polymer.

On the other hand, a plate prepared as a laminated body of a $\lambda/2$ plate and a $\lambda/4$ plate is also able to be used as the $\lambda/4$ plate satisfying Expressions (1) to (4).

The optical anisotropic layer used as the $\lambda/2$ plate and the $\lambda/4$ plate described above will be described. The phase difference of the present invention may include the optical anisotropic layer, the optical anisotropic layer is able to be formed of one type of curable composition having a liquid crystal compound as a main component or a plurality of types thereof, and among the liquid crystal compound, a liquid crystal compound having a polymerizable group is preferable, and a liquid crystal compound formed of one type of curable composition described above is preferable.

A $\lambda/4$ plate used in the $\lambda/4$ plate satisfying Expressions (1) to (4) may be an optical anisotropy support which itself has a desired $\lambda/4$ function, or may include an optical anisotropic layer or the like on a support formed of a polymer film. That is, in the latter case, a desired $\lambda/4$ function is obtained by laminating other layers on the support. The configuration material of the optical anisotropic layer is not particularly limited, but the optical anisotropic layer is formed of a composition containing a liquid crystal compound, and the optical anisotropic layer may be a layer exhibiting optical anisotropy expressed by aligning the molecules of the liquid crystal compound, may be a layer having optical anisotropy expressed by stretching the polymer film and by aligning the polymer in the film, or may include both of the layers. That is, the optical anisotropic layer is able to be configured of one or two or more biaxial films, and is able to be configured of a combination of two or more monoaxial films, such as a combination of a C plate and an A plate. Naturally, the optical anisotropic layer is able to be configured of a combination of one or more biaxial films and one or more monoaxial films.

Here, the "$\lambda/4$ plate" used in the $\lambda/4$ plate satisfying Expressions (1) to (4) indicates an optical anisotropic layer of which the in-plane retardation $Re(\lambda)$ at a specific wavelength of $\lambda$ nm satisfies $Re(\lambda)=\lambda/4$. The expression described above may be attained at any one wavelength (for example, 550 nm) in a visible range, and the in-plane retardation Re(550) at a wavelength of 550 nm is preferably 115 nm≤Re(550)≤155 nm, and is more preferably 120 nm to 145 nm. When the in-plane retardation Re(550) at a wavelength of 550 nm is in this range, it is preferable since the light leakage of the reflected light is able to be reduced to the extent of being invisible at the time of being combined with the 212 plate described below.

The $\lambda/2$ plate used in the $\lambda/4$ plate satisfying Expressions (1) to (4) may be an optical anisotropy support which itself has a desired $\lambda/2$ function support, or may include an optical anisotropic layer and the like on a support formed of a polymer film. That is, in the latter case, a desired $\lambda/2$ function is obtained by laminating other layers on the support. The configuration material of the optical anisotropic layer is not particularly limited, but the optical anisotropic layer is able to be configured of the same configuration material as that of the $\lambda/4$ plate described above.

Here, the "$\lambda/2$ plate" used in the $\lambda/4$ plate satisfying Expressions (1) to (4) indicates an optical anisotropic layer of which the in-plane retardation $Re(\lambda)$ at a specific wavelength of $\lambda$ nm satisfies $Re(\lambda)=\lambda/2$. The expression described above may be attained at any one wavelength (for example, 550 nm) in a visible range. Further, in the present invention, in-plane retardation Re1 of the $\lambda/2$ plate is set to be substantially 2 times in-plane retardation Re2 of the $\lambda/4$ plate.

Here, the "retardation is substantially 2 times" indicates that Re1=2×Re2±50 nm Here, Re1=2×Re2±20 nm is more preferable, and Re1=2×Re2±10 nm is even more preferable. The expression described above may be attained at any one wavelength in a visible range, and it is preferable that the expression described above is attained at a wavelength of 550 nm According to the range described above, it is preferable since the light leakage of the reflected light is able to be reduced to the extent of being invisible at the time of being combined with the $\lambda/4$ plate for forming the $\lambda/4$ plate used in the luminance-enhancing film by being laminated with the $\lambda/2$ plate described above.

A direction of linear polarization transmitted through the $\lambda/4$ plate used in the luminance-enhancing film is laminated to be parallel to a transmission axis direction of a backlight side polarizing plate.

When the $\lambda/4$ plate used in the luminance-enhancing film is a single layer, an angle between the slow axis direction of the $\lambda/4$ plate and the absorption axis direction of the polarizing plate is 30° to 60°, is preferably 35° to 55°, is more preferably 40° to 50°, and particularly preferably 45°.

The spiral structure of the cholesteric liquid crystal and the polarization state of the light are various defined, and in the present invention, when the light is sequentially transmitted through the cholesteric liquid crystal layer, the $\lambda/4$ plate, and the polarizing plate, arrangement in which luminance is maximized is preferable. Accordingly, the direction of the linear polarization transmitted through the $\lambda/4$ plate may be coincident with the transmission axis direction of the backlight side polarizing plate.

Figure 13:
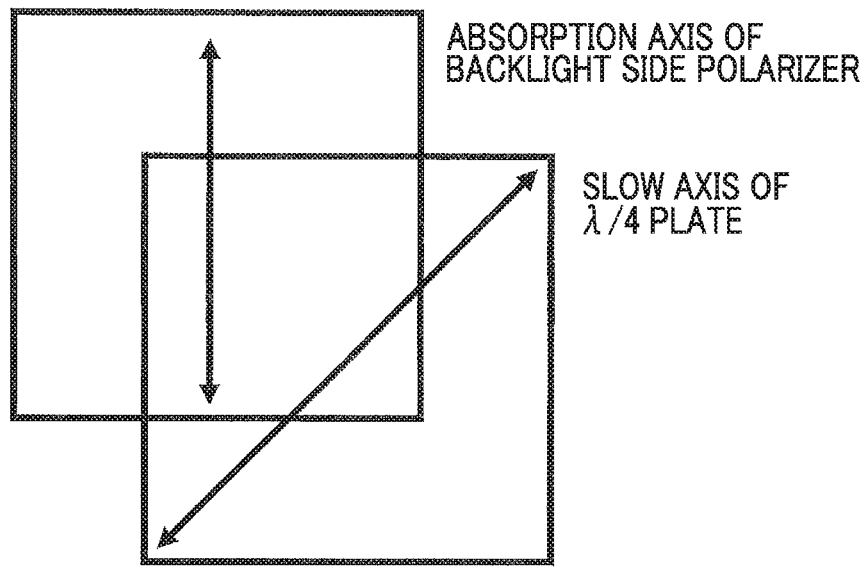
FIG. 13 is a diagram illustrating a relationship between a slow axis direction of a $\lambda/4$ plate and an absorption axis direction of a polarizer when a direction of a spiral structure of a light reflection layer is a right spiral direction.

For this reason, when the direction of the spiral structure of the light reflection layer formed by fixing the cholesteric liquid crystal layer is a right spiral (when a right chiral material of the present invention is used), as illustrated in FIG. 13, it is necessary that the slow axis direction of the $\lambda/4$ plate has the angle described above in a clockwise direction from the absorption axis direction of the polarizer when seen from the backlight side. In contrast, when the direction of the spiral structure of the light reflection layer formed by fixing the cholesteric liquid crystal layer if a left spiral, as illustrated in FIG. 14, it is necessary that the slow axis direction of the $\lambda/4$ plate has the angle described above in a counterclockwise direction from the absorption axis direction of the polarizer when seen from the backlight side.

When the $\lambda/4$ plate used in the luminance-enhancing film (the $\lambda/4$ plate satisfying Expressions (1) to (4) described above) is the laminated body of the $\lambda/4$ plate and the $\lambda/2$ plate, an angle between the slow axis direction of the entire $\lambda/4$ plate as the laminated body and the absorption axis direction of the polarizing plate is 30° to 60°, is preferably 35° to 55°, is more preferably 40° to 50°, is particularly preferably, 42° to 48°, and is more particularly preferably 45°.

Figure 14:
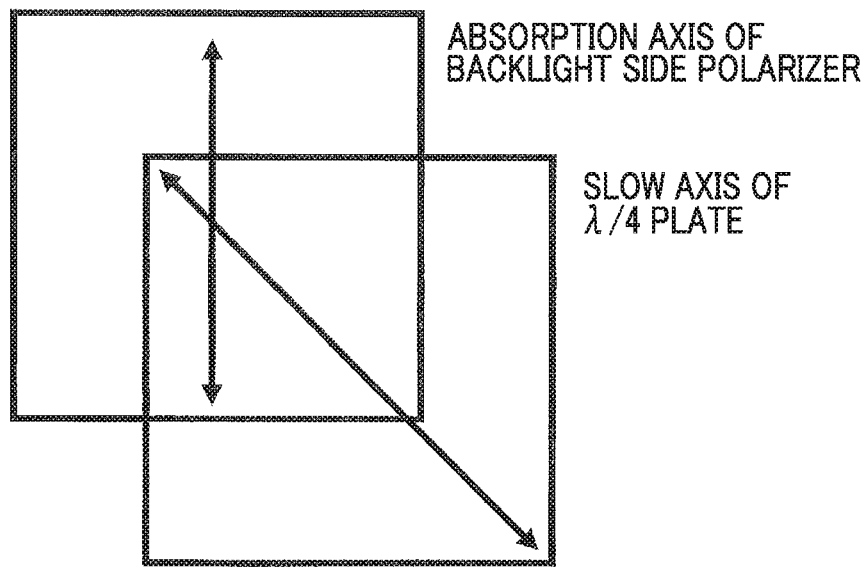
FIG. 14 is a diagram illustrating a relationship between the slow axis direction of the $\lambda/4$ plate and the absorption axis direction of the polarizer when the direction of the spiral structure of the light reflection layer is a left spiral direction.

Furthermore, when the direction of the spiral structure of the light reflection layer formed by fixing the cholesteric liquid crystal layer is the right spiral, as illustrated in FIG. 13, it is necessary that the slow axis direction of the entire $\lambda/4$ plate as the laminated body has the angle described above in the clockwise direction from the absorption axis direction of the polarizer when seen from the backlight side, and when the direction of the spiral structure of the light reflection layer formed by fixing the cholesteric liquid crystal layer is the left spiral, as illustrated in FIG. 14, it is necessary that the slow axis direction of the entire λ/4 plate as the laminated body has the angle described above in the counter-clockwise direction from the absorption axis direction of the polarizer when seen from the backlight side.

Here, the angles between the slow axis directions of each of the λ/4 plate and the λ/2 plate used in the laminated body and the absorption axis direction of the polarizing plate have the following positional relationship.

When Rth of the λ/2 plate described above at a wavelength of 550 nm is negative, an angle between the slow axis direction of the 212 plate and the absorption axis direction of the polarizer described above is preferably in a range of 75°±8°, is more preferably in a range of 75°±6°, and is even more preferably in a range of 75°±3°. Further, at this time, the angle between the absorption axis direction of the polarizer layer described above and the slow axis direction of the λ/4 plate described above for forming the λ/4 plate used in the luminance-enhancing film by being laminated with the λ/2 plate described above is preferably in a range of 15°±8°, is more preferably in a range of 15°±6°, and is even more preferably in a range of 15°±3°. According to the range described above, it is preferable since the light leakage of the reflected light is able to be reduced to the extent of being invisible.

In addition, when Rth of the λ/2 plate described above at a wavelength of 550 nm is positive, the angle between the slow axis direction of the λ/2 plate and the absorption axis direction of the polarizer layer described above is preferably in a range of 15°±8°, is more preferably in a range of 15°±6°, and is even more preferably in a range of 15°±3°. Further, at this time, the angle between the slow axis direction of the λ/4 plate described above for forming the λ/4 plate used in the luminance-enhancing film by being laminated with the λ/2 plate described above and the absorption axis direction of the polarizer layer described above is preferably in a range of 75°±8°, is more preferably in a range of 75°±6°, and is even more preferably in a range of 75°±3°. According to the range described above, it is preferable since the light leakage of the reflected light is able to be reduced to the extent of being invisible.

Furthermore, in the above description, the λ/2 plate or the λ/4 plate having a laminated body structure in which the optical anisotropic layer is disposed on the support is described, but the present invention is not limited to the aspect, the λ/2 plate and the λ/4 plate may be laminated on one surface of one transparent support, or the λ/2 plate may be laminated on one surface of one transparent support and the λ/4 plate may be laminated on the other surface of one transparent support. Further, the λ/2 plate or the λ/4 plate may be independently formed of a stretched polymer film (an optical anisotropy support), or may be formed only of a liquid crystal film which is formed of a composition containing a liquid crystal compound. The preferred examples of the liquid crystal film are identical to the preferred examples of the optical anisotropic layer described above.

<Layer Changing Polarization State of Light>

The luminance-enhancing film may include a layer which changes a polarization state of light on a side of the reflection polarizer opposite to the λ/4 plate layer side. The layer changing the polarization state of the light will be described below.

<Adhesive Layer (Adhesive Layer)>

In the luminance-enhancing film of the present invention, it is preferable that the λ/4 plate and the reflection polarizer included in the reflection polarizer are laminated by being directly in contact with each other, or are laminated through the adhesive layer. In addition, the first light reflection layer, the second light reflection layer, and the third light reflection layer described above which form the reflection polarizer are able to be laminated by being directly in contact with each other or are able to be laminated through the adhesive layer.

In the luminance-enhancing film the present invention and the optical sheet member of the present invention described below, it is preferable that the polarizing plate and the reflection polarizer are laminated by being directly in contact with each other or are laminated through the adhesive layer.

In the optical sheet member of the present invention, it is preferable that the polarizing plate, the λ/4 plate, and the reflection polarizer are sequentially laminated by being directly in contact with each other or are laminated through the adhesive layer.

Examples of a method in which the members are laminated by being directly in contact with each other are able to include a method in which the members are laminated by coating the surface of one member with the other member.

In addition, the adhesive layer (the adhesive layer) may be arranged between these members. The adhesive layer used for laminating the optical anisotropic layer and the polarizing plate, for example, indicates a substance having a ratio (tan δ=G"/G') of a modulus of loss elasticity G" to a modulus of storage elasticity G' measured by a dynamic viscoelasticity measurement device of 0.001 to 1.5, and includes a so-called adhesive agent, a substance which is easy to creep, or the like. Examples of the adhesive agent which is able to be used in the present invention include an acrylic adhesive agent and a polyvinyl alcohol-based adhesive agent, but are not limited thereto.

In addition, examples of the adhesive agent include an aqueous solution of boron compound, a curable adhesive agent of an epoxy compound as disclosed in JP2004-245925A which does not have an aromatic ring in the molecules, an active energy ray curable type adhesive agent disclosed in JP2008-174667A which includes a photopolymerization initiator having a molar absorption coefficient at a wavelength of 360 nm to 450 nm of greater than or equal to 400 and an ultraviolet ray curable compound as an essential component, an active energy ray curable type adhesive agent disclosed in JP2008-174667A which contains (a) a (meth)acrylic compound having two or more (meth)acryloyl groups in the molecules, (b) a (meth)acrylic compound having a hydroxyl group and only one polymerizable double bond in the molecules, and (c) phenol ethylene oxide-modified acrylate or nonyl phenol ethylene oxide-modified acrylate in the total amount of 100 parts by mass of a (meth)acrylic compound, and the like.

In the optical sheet member of the present invention described below, a difference in refractive indices between the reflection polarizer and a layer adjacent to the reflection polarizer on the polarizing plate side is preferably less than or equal to 0.15, is more preferably less than or equal to 0.10, and is particularly preferably less than or equal to 0.05. Examples of the layer adjacent to the reflection polarizer on the polarizing plate side described above are able to include the adhesive layer described above.

An adjustment method of the refractive index of the adhesive layer is not particularly limited, and for example, a method disclosed in JP1999-223712A (JP-H11-223712A)

is able to be used. In the method disclosed in JP1999-223712A (JP-H11-223712A), the following aspect is particularly preferable.

Examples of the adhesive agent used in the adhesive layer described above are able to include resins such as a polyester-based resin, an epoxy-based resin, a polyurethane-based resin, a silicone-based resin, and an acrylic resin. The resins may be independently used or two or more types thereof may be used by being mixed. In particular, the acrylic resin is preferable from a viewpoint of excellent reliability with respect to water resistance, heat resistance, light resistance, and the like, an excellent adhesion force and excellent transparency, and ease of adjusting the refractive index to be suitable for a liquid crystal display. Examples of the acrylic adhesive agent are able to include a homopolymer or a copolymer of an acrylic monomer such as an acrylic acid and ester thereof, a methacrylic acid and ester thereof, acrylamide, and acrylonitrile, and a copolymer of at least one type of acrylic monomer described above and an aromatic vinyl monomer of vinyl acetate, maleic anhydride, styrene, and the like. In particular, a copolymer formed of main monomers such as ethylene acrylate, butyl acrylate, and 2-ethylhexyl acrylate which express adhesiveness, a monomer such as vinyl acetate, acrylonitrile, acrylamide, styrene, methacrylate, and methyl acrylate which become an aggregation force component, and functional group-containing monomers such as a methacrylic acid, an acrylic acid, an itaconic acid, hydroxy ethyl methacrylate, hydroxy propyl methacrylate, dimethyl amino ethyl methacrylate, acrylamide, methylol acrylamide, glycidyl methacrylate, and maleic anhydride which enhance an adhesion force or apply a cross-linking starting point, in which a glass transition point (Tg) is in a range of −60° C. to −15° C., and a weight average molecular weight is in a range of 200000 to 1000000 is preferable.

In the present invention, a sheet-like photocurable type adhesive agent (disclosed in TREND 11 of Research Annual Review, Vol. 14, 2011, published by Toagosei Company, Limited) is able to be used in the adhesive layer. As with the adhesive agent, the sheet-like photocurable type adhesive agent easily bond optical films, is cross-linked and cured by an ultraviolet ray (UV), and has an enhanced storage modulus of elasticity, an enhanced adhesion force, and enhanced heat resistance, and an adhesion method thereof is suitable for the present invention.

[Optical Sheet Member]

The optical sheet member of the present invention includes the luminance-enhancing film of the present invention, and the polarizing plate including the polarizer, the angle between the slow axis of the λ/4 plate and the absorption axis of the polarizer is 30° to 60°, the polarizing plate, the λ/4 plate, and the reflection polarizer are sequentially laminated by being directly in contact with each other or are laminated through the adhesive layer.

Figure 3:
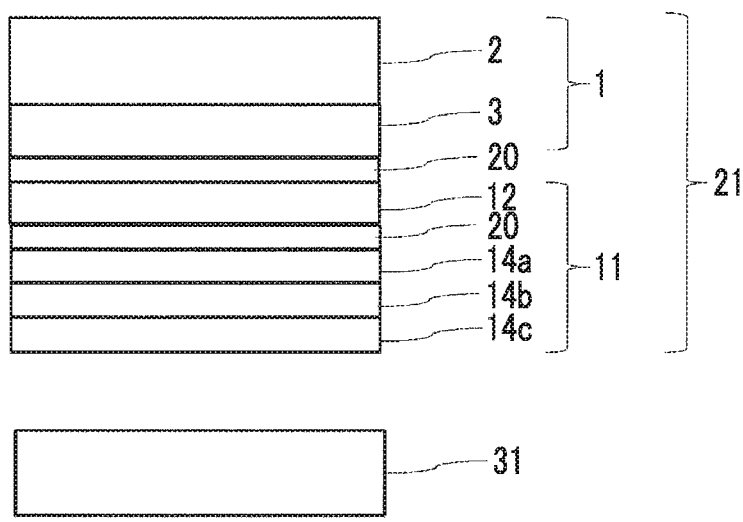
FIG. 3 is a schematic view illustrating a sectional surface of an example of an optical sheet member of the present invention along with a positional relationship with respect to backlight.
Figure 4:
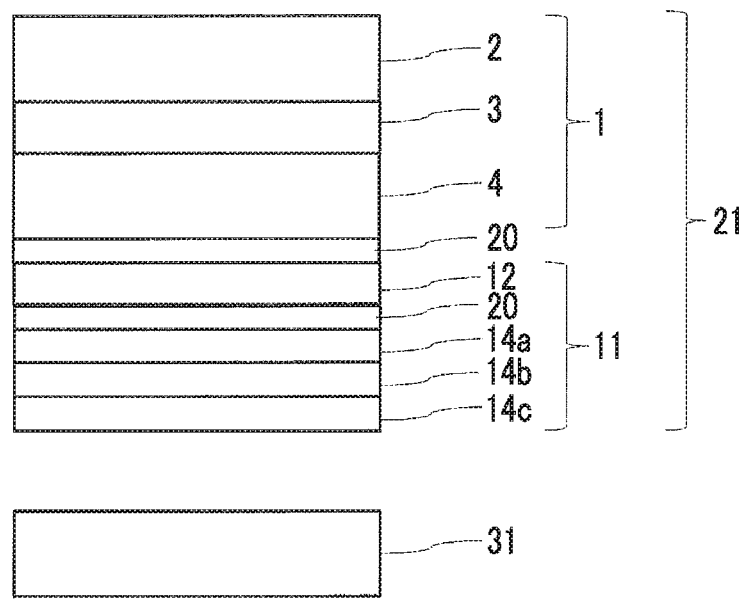
FIG. 4 is a schematic view illustrating a sectional surface of another example of the optical sheet member of the present invention along with the positional relationship with respect to the backlight.
Figure 5:
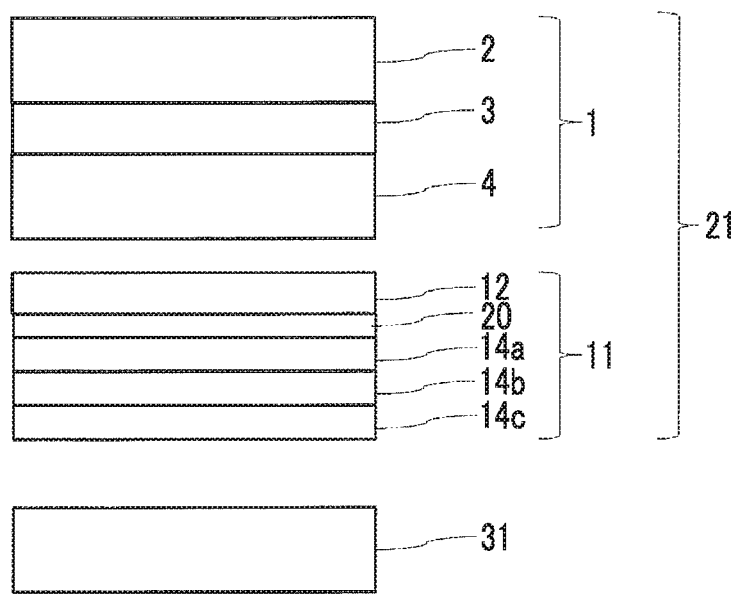
FIG. 5 is a schematic view illustrating a sectional surface of still another example of the optical sheet member of the present invention along with the positional relationship with respect to the backlight.

In FIG. 3 to FIG. 5, a schematic view of the optical sheet member of the present invention is illustrated along with a backlight unit 31. An optical sheet member 21 of the present invention includes the luminance-enhancing film 11, and a polarizing plate 1 including a polarizer 3. The polarizing plate 1 and the luminance-enhancing film 11 may be laminated through the adhesive layer 20 (refer to FIG. 3 and FIG. 4), or may be separately arranged (refer to FIG. 5).

At the time of lamination, it is preferable that the polarizing plate and the luminance-enhancing film are bonded to each other by using the adhesive agent in a roll-to-roll manner. At the time of bonding the polarizing plate and the luminance-enhancing film in the roll-to-roll manner, the luminance-enhancing film may be directly bonded to the polarizer without using the polarizer protective film on backlight unit side of the polarizing plate.

<Polarizing Plate>

Next, the polarizing plate will be described.

In general, it is preferable that the polarizing plate included in the optical sheet member of the present invention is formed of a polarizer and two polarizing plate protective films (hereinafter, also referred to as a protective film) arranged on both sides of the polarizer, as with a polarizing plate used in a liquid crystal display device. In the present invention, among the two protective films, it is preferable that a retardation film is used as a protective film arranged on a liquid crystal cell side.

In FIG. 3 to FIG. 6, the polarizing plate 1 includes the polarizer 3. It is preferable that the polarizing plate 1 includes a polarizing plate protective film 2 which may be a retardation film on the surface of the polarizer 3 on a visible side. The polarizing plate 1 may include a polarizing plate protective film 4 on the surface of the polarizer 3 on the backlight unit 31 side (refer to FIG. 4), or may not include the polarizing plate protective film 4 (refer to FIG. 3).

(Polarizer)

In the optical sheet member of the present invention, the angle between the slow axis of the λ/4 plate and the absorption axis of the polarizer is 30° to 60°. A more preferred aspect or a preferred aspect of a case where the λ/4 plate is the laminated body of the λ/2 plate and the λ/4 plate are described in the description of the λ/4 plate.

It is preferable that a polarizer in which iodine is adsorptively aligned on a polymer film is used as the polarizer described above. The polymer film described above is not particularly limited, but various polymer films are able to be used. For example, a hydrophilic polymer film such as a polyvinyl alcohol-based film, a polyethylene terephthalate-based film, an ethylene-vinyl acetate copolymer-based film, a partially saponified film thereof, and a cellulose-based film, an polyene-based orientation film of a dehydration treatment product of polyvinyl alcohol or a dehydrochlorination treatment product of polyvinyl chloride, and the like. Among them, it is preferable that the polyvinyl alcohol-based film having excellent dyeability of iodine is used as the polarizer.

Polyvinyl alcohol or a derivative thereof is used as the material of the polyvinyl alcohol-based film described above. Examples of the derivative of the polyvinyl alcohol include polyvinyl formal, polyvinyl acetal, and the like, and olefin such as ethylene and propylene, an unsaturated carboxylic acid such as an acrylic acid, a methacrylic acid, and a crotonic acid, and alkyl ester thereof, and an acrylamide-modified derivative.

The degree of polymerization of the polymer which is the material of the polymer film described above is generally 500 to 10,000, is preferably in a range of 1000 to 6000, and is more is preferably in a range of 1400 to 4000. Further, in a case of a saponification film, the degree of saponification, for example, is preferably greater than or equal to 75 mol %, is more preferably greater than or equal to 98 mol %, and is even more preferably in a range of 98.3 mol % to 99.8 mol %, from a viewpoint of solubility with respect to water.

The polymer film (an unstretched film) described above is subjected to at least a monoaxial stretching treatment and an iodine dyeing treatment according to a normal method. Further, a boric acid treatment and a cleaning treatment are able to be performed. In addition, the polymer film (a stretched film) which has been subjected to the treatment described above is subjected to a drying treatment and becomes the polarizer according to a normal method.

The thickness of the polarizer is not particularly limited, but the thickness of the polarizer is generally 5 µm to 80 µm, is preferably 5 µm to 50 µm, and is more preferably 5 µm to 25 µm.

In the optical properties of the polarizer, single body transmittance at the time of being measured by a polarizer single body is preferably greater than or equal to 43%, and is more preferably in a range of 43.3% to 45.0%. In addition, it is preferable that orthogonal transmittance measured by preparing two polarizers described above, and by superposing the two polarizers such that an angle between the absorption axes of the two polarizers is 90° is small, and practically, the orthogonal transmittance is preferably greater than or equal to 0.00% and less than or equal to 0.050%, and is more preferably less than or equal to 0.030%. Practically, the degree of polarization is preferably greater than or equal to 99.90% and less than or equal to 100%, and is particularly preferably greater than or equal to 99.93% and less than or equal to 100%. Even when the optical properties of the polarizing plate are measured, it is preferable that approximately the same optical properties as those described above are able to be obtained.

(Polarizing Plate Protective Film)

The optical sheet member of the present invention may include the polarizing plate protective film on a side of the polarizer opposite to the liquid crystal cell, or may not include the polarizing plate protective film. When the optical sheet member does not include the polarizing plate protective film on the side of the polarizer opposite to the liquid crystal cell, the reflection polarizer described below may be directly disposed on the polarizer or may be disposed on the polarizer through the adhesive agent.

In the protective film described above, a thermoplastic resin having excellent transparency, mechanical strength, thermal stability, moisture blocking properties, and isotropy is used as the protective film arranged on the side opposite to the liquid crystal cell. Specific examples of such a thermoplastic resin include a cellulose resin of triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (a norbornene-based resin), a polyarylate resin, a polystyrene resin, a polyvinyl alcohol resin, and a mixture thereof.

The cellulose resin is ester of cellulose and a fatty acid. Specific example of such a cellulose ester-based resin include triacetyl cellulose, diacetyl cellulose, tripropyl cellulose, dipropyl cellulose, and the like. Among them, the triacetyl cellulose is particularly preferable. Various products are commercially available as the triacetyl cellulose, and are advantageous from a viewpoint of easy obtainability and cost. Examples of a commercially available product of the triacetyl cellulose include "UV-50", "UV-80", "SH-80", "TD-80U", "TD-TAC", and "UZ-TAC" (Product Name), manufactured by Fujifilm Corporation, "KC Series" manufactured by Konica Minolta, Inc., and the like.

Specific examples of the cyclic polyolefin resin preferably include a norbornene-based resin. The cyclic olefin-based resin is a general term of a resin which is polymerized by using cyclic olefin as polymerization unit, and examples of the cyclic olefin-based resin include resins disclosed in JP1989-240517A (JP-H01-240517A), JP1991-14882A (JP-H03-14882A), JP1991-122137A (JP-H03-122137A), and the like. Specific examples of the cyclic olefin-based resin include a ring opening (co)polymer of cyclic olefin, an addition polymer of cyclic olefin, a copolymer of cyclic olefin and α-olefin such as ethylene and propylene (representatively, a random copolymer), and a graft polymer in which the polymers are modified by an unsaturated carboxylic acid or a derivative thereof, a hydride thereof, and the like. Specific examples of the cyclic olefin include a norbornene-based monomer.

Various products are commercially available as the cyclic polyolefin resin. Specific example of the cyclic polyolefin resin include "Zeonex" and "Zeonor" (Product Name) manufactured by Zeon Corporation, "Arton" (Product Name) manufactured by JSR Corporation, "Topas" (Product Name) manufactured by TICONA GmbH, and "APEL" (Product Name) manufactured by Mitsui Chemicals, Inc.

An arbitrary suitable (meth)acrylic resin is able to be adopted as the (meth)acrylic resin within a range not impairing the effects of the present invention. Examples of the (meth)acrylic resin include poly(meth)acrylic acid ester such as polymethyl methacrylate, a methyl methacrylate-(meth)acrylic acid copolymer, a methyl methacrylate-(meth)acrylic acid ester copolymer, a methyl methacrylate-acrylic acid ester-(meth)acrylic acid copolymer, a methyl (meth)acrylate-styrene copolymer (an MS resin and the like), and a polymer having an alicyclic hydrocarbon group (for example, a methyl methacrylate-cyclohexyl methacrylate copolymer, a methyl methacrylate-norbornyl (meth)acrylate copolymer, and the like). Preferably, examples of the (meth)acrylic resin include poly(meth)acrylic acid alkyl having 1 to 6 carbon atoms such as polymethyl (meth)acrylate. More preferably, examples of the (meth)acrylic resin include a methyl methacrylate-based resin having methyl methacrylate as a main component (50 mass % to 100 mass %, and preferably 70 mass % to 100 mass %).

Specific examples of the (meth)acrylic resin include ACRYPET VH or ACRYPET VRL20A manufactured by Mitsubishi Rayon Co., Ltd, a (meth)acrylic resin disclosed in JP2004-70296A which has a ring structure in the molecules, and a (meth)acrylic resin having high Tg which is obtained by cross-linking in the molecules or a cyclization reaction in the molecules.

A (meth)acrylic resin having a lactone ring structure is able to be used as the (meth)acrylic resin. This is because the (meth)acrylic resin having a lactone ring structure has high heat resistance, high transparency, and high mechanical strength which is obtained by biaxial stretching.

The thickness of the protective film is able to be suitably set, and is generally approximately 1 µm to 80 µm from a viewpoint of workability such as strength or handling, thin layer properties, and the like. In particular, the thickness of the protective film is preferably 1 µm to 60 µm, and is more preferably 5 µm to 40 µm. It is particularly preferable that the thickness of the protective film is 5 µm to 25 µm.

[Liquid Crystal Display Device]

It is preferable that the liquid crystal display device of the present invention includes the luminance-enhancing film of the present invention or the optical sheet member of the present invention, and the backlight unit in this order; the backlight unit described above includes a light source which emits blue light having an emission center wavelength in a wavelength range of 430 nm to 480 nm, green light having an emission center wavelength in a wavelength range of 500 nm to 600 nm, and red light having at least a part of an emission intensity peak in a wavelength range of 600 nm to 700 nm; and the backlight unit described above includes a reflection member performing conversion of a polarization state of light which is emitted from the light source described above and is reflected on the luminance-enhancing film described above or the optical sheet member described above and reflection of the light in rear of the light source described above.

In addition, it is preferable that in the liquid crystal display device of the present invention, all half band widths of the blue light described above and the green light described above are less than or equal to 100 nm. It is preferable that in the liquid crystal display device of the present invention, the red light described above has an emission center wavelength in a wavelength range of 600 nm to 700 nm, and the half band width of the red light described above is less than or equal to 100 nm. In such an aspect which is a part of the liquid crystal display device of the present invention, it is possible to realize sufficient luminance enhancement performance by the luminance-enhancing film or the optical sheet member of the present invention having a simple configuration such as three light reflection layers formed by fixing the cholesteric liquid crystalline phase which are RGB light reflection layers and the λ/4 layer while enhancing color reproducibility by a combination of the backlight and RGB narrowband backlight.

As a result of research of the present inventors, a difference (Reflection Center Wavelength-Emission Center Wavelength) between the emission center wavelength (a wavelength applying an emission intensity peak) of the blue light, the green light, and the red light of the backlight unit and a reflection center wavelength (a wavelength applying a reflectivity peak) of each color of the luminance-enhancing film is preferably less than or equal to ±50 nm, and is more preferably less than or equal to ±25 nm, with respect to the blue light and the green light.

On the other hand, the difference is preferably 0 nm to 75 nm, is more preferably 0 nm to 50 nm, and is even more preferably 10 nm to 30 nm, with respect to the red light, from a viewpoint of suppressing the oblique color change. It is even more preferable that the emission center wavelength of the red light of the backlight unit and the reflection center wavelength of the red light reflection layer satisfy Expression (A) described below.

10 nm<Absolute Value of (Emission Center Wavelength of Red Light of Backlight Unit–Reflection Center Wavelength of Red Light Reflection Layer)<50 nm     Expression (A):

In the liquid crystal display device, it is preferable that the layer changing the polarization state of the light is arranged between the third light reflection layer of the luminance-enhancing film and the backlight unit. The layer changing the polarization state of the light functions as a layer changing a polarization state of light reflected from the light reflection layer, and is able to enhance luminance. Examples of the layer changing the polarization state of the light include a polymer layer having a refractive index higher than that of an air layer, and examples of the polymer layer having a refractive index higher than that of the air layer include various low reflection layers such as a hard coat (HC) treatment layer, an anti-glare (AG) treatment layer, and a low reflection (AR) treatment layer, a triacetyl cellulose (TAC) film, an acrylic resin film, a cycloolefin polymer (COP) resin film, a stretched PET film, and the like. The layer changing the polarization state of the light may also function as a support. A relationship of the average refractive index of the layer changing the polarization state of the light reflected from the light reflection layer and the average refractive index of the third light reflection layer, is preferably 0<|Average Refractive Index of Layer Changing Polarization State of Light–Average Refractive Index of Third Light Reflection Layer|<0.8, is more preferably 0<|Average Refractive Index of Layer Changing Polarization State of Light–Average Refractive Index of Third Light Reflection Layer|<0.4, and is even more preferably 0<|Average Refractive Index of Layer Changing Polarization State of Light–Average Refractive Index of Third Light Reflection Layer|<0.2.

The layer changing the polarization state of the light may be integrated with the luminance-enhancing film, or may be disposed separately from the luminance-enhancing film.

<Backlight Unit>

The configuration of the backlight unit may be an edge light mode in which a light guide plate, a reflection plate, or the like is included as a configuration member, or may be a direct backlight mode.

The liquid crystal display device of the present invention includes the reflection member performing conversion of the polarization state of the light which is emitted from the light source described above and is reflected on the luminance-enhancing film described above or the optical sheet member described above and reflection of the light in rear of the light source described above. Such a reflection member is not particularly limited, but known reflection members disclosed in JP3416302B, JP3363565B, JP4091978B, JP3448626B, and the like are able to be used, and the contents of the publications are incorporated in the present invention.

It is preferable that an example of the light source of the backlight unit is any one of a light source including a blue light emitting diode emitting the blue light described above and a fluorescent material emitting the green light described above and the red light described above when the blue light described above of the blue light emitting diode described above is incident thereon, a light source including a UV light emitting diode emitting UV light having an emission center wavelength in a wavelength range of greater than or equal to 300 nm and less than 430 nm and a fluorescent material emitting the blue light, the green light described above, and the red light described above when the UV light described above of the UV light emitting diode described above is incident thereon, a light source (a quasi white LED) including a blue light emitting diode emitting the blue light described above and a fluorescent material (a yellow fluorescent body and the like) emitting light having a wide peak over the green light described above to the red light described above when the blue light described above is incident thereon, a blue light emitting diode emitting the blue light described above, a green light emitting diode emitting the green light described above, and a red light emitting diode emitting the red light described above.

Among them, it is more preferable that the example of the light source of the backlight unit is any one of the light source including the blue light emitting diode emitting the blue light described above and the fluorescent material emitting the green light described above and the red light described above when the blue light described above of the blue light emitting diode described above is incident thereon and the light source (the quasi white LED) including the blue light emitting diode emitting the blue light and the fluorescent material (the yellow fluorescent body and the like) emitting light having a wide peak over the green light described above to the red light described above when the blue light described above is incident thereon from a viewpoint of energy conversion (electric power-light conversion efficiency). In a more preferred aspect of the light source including the blue light emitting diode emitting the blue light described above and the fluorescent material emitting the green light described above and the red light described above when the blue light described above of the blue light emitting diode described above is incident thereon, it is preferable that the backlight unit emits the blue light having an emission center wavelength in a wavelength range of 430 nm to 480 nm, the green light having an emission center wavelength in a wavelength range of 500 nm to 600 nm, and the red light having at least a part of an emission center wavelength in a wavelength range of 600 nm to 700 nm.

Examples of the fluorescent material include a yttrium-aluminum-garnet-based yellow fluorescent body, a terbium-aluminum-garnet-based yellow fluorescent body, and the like. The fluorescent wavelength of the fluorescent material is able to be controlled according to a change in the particle diameter of the fluorescent body.

In the liquid crystal display device of the present invention, it is preferable that the backlight unit includes the blue light emitting diode emitting the blue light described above and the fluorescent material emitting the green light described above and the red light described above when the blue light described above of the blue light emitting diode described above is incident thereon, the fluorescent material is a quantum dot member (for example, a quantum dot sheet or a bar-like quantum dot bar), and the quantum dot member is arranged between the optical sheet member and a blue light source. Such a quantum dot member is not particularly limited, but known quantum dot members disclosed in, for example JP2012-169271A, SID'12 DIGEST p. 895, and the like are able to be used, and the contents of these literatures are incorporated in the present invention. In addition, a Quantum Dot Enhancement Film (QDEF, manufactured by NanoSys Co., Ltd) is able to be used as such a quantum dot sheet.

It is preferable that the emission center wavelength of the blue light emitted from the backlight unit is in a wavelength range of 440 nm to 470 nm.

It is preferable that the emission center wavelength of the green light emitted from the backlight unit is in a wavelength range of 520 nm to 570 nm.

It is preferable that the emission center wavelength of the red light emitted from the backlight unit is in a wavelength range of 600 nm to 640 nm.

It is preferable that all of the half band widths of the blue light described above, the green light described above, and the red light described above are less than or equal to 100 nm.

The half band width of the blue light emitted from the backlight unit preferably has an emission intensity peak of less than or equal to 80 nm, more preferably has an emission intensity peak of less than or equal to 70 nm, and particularly preferably has an emission intensity peak of less than or equal to 30 nm.

The half band width of the green light emitted from the backlight unit preferably has an emission intensity peak of less than or equal to 80 nm, more preferably has an emission intensity peak of less than or equal to 70 nm, and particularly preferably has an emission intensity peak of less than or equal to 60 nm.

The half band width of the red light emitted from the backlight unit preferably has an emission intensity peak of less than or equal to 80 nm, more preferably has an emission intensity peak of less than or equal to 70 nm, and particularly preferably has an emission intensity peak of less than or equal to 60 nm.

It is preferable that the backlight unit further include a known diffusion plate or diffuse sheet, a prism sheet (for example, BEF or the like), and a light guide device. These other members are disclosed in JP3416302B, JP3363565B, JP4091978B, JP3448626B, and the like, and the contents of the publications are incorporated in the present invention.

In order to further enhance front luminance of the liquid crystal display device of the present invention using the luminance-enhancing film and the optical sheet member, it is preferable that two prism sheets are provided in the backlight unit, and the prism directions of the two prism sheets are substantially parallel to each other. The prism directions of the two prism sheets being substantially parallel to each other indicates that an angle between the prisms of the two prism sheets is less than or equal to ±5°. Furthermore, in the prism sheet, a plurality of projections (herein, the projection is also referred to as the prism) extending in one direction in the plane of the prism sheet are arranged in the shape of a row, and the directions in which the plurality of prisms arranged in the shape of a row extend are parallel to each other. The prism direction indicates the extending direction of the plurality of prisms arranged in the shape of a row.

As a result of intensive studies of the present inventors, it has been found that in the luminance-enhancing film of the present invention, as described above, it is possible to increase the front luminance by setting the prism directions of the two prism sheets to be parallel to each other rather than being vertical to each other. Furthermore, it has been found that even when any one of the light sources described above is combined in the prism sheet, the same effects are able to be obtained.

<Display Panel>

An example of a preferred display panel of the liquid crystal display device described above is a transmission mode liquid crystal panel, and includes a pair of polarizers, and a liquid crystal cell between the polarizers. In general, the retardation film for compensating a view angle is arranged between each of the polarizers and the liquid crystal cell. The configuration of the liquid crystal cell is not particularly limited, and a liquid crystal cell having a general configuration is able to be adopted. The liquid crystal cell, for example, includes a pair of substrates which are arranged to face each other, and a liquid crystal layer interposed between the pair of substrates, and as necessary, may include a color filter layer and the like. The driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend (OCB) mode are able to be used.

It is preferable that an embodiment of the liquid crystal display device includes a liquid crystal cell in which a liquid crystal layer is interposed between facing substrates of which at least one includes an electrode, and the liquid crystal cell is configured by being arranged between two polarizing plates. The liquid crystal display device includes the liquid crystal cell in which a liquid crystal is sealed between upper and lower substrates, changes the alignment state of the liquid crystal by applying a voltage, and thus displays an image. Further, as necessary, the liquid crystal display device includes an associated functional layer such as a polarizing plate protective film or an optical compensation member performing optical compensation, and an adhesive layer. In addition, the image display device of the present invention may include other members. For example, a surface layer such as a forward scattering layer, a primer layer, an antistatic layer, and an undercoat layer may be arranged along with (or instead of) a color filter substrate, a thin layer transistor substrate, a lens film, a diffusion sheet, a hard coat layer, an anti-reflection layer, a low reflection layer, an antiglare layer, and the like.

Figure 6:
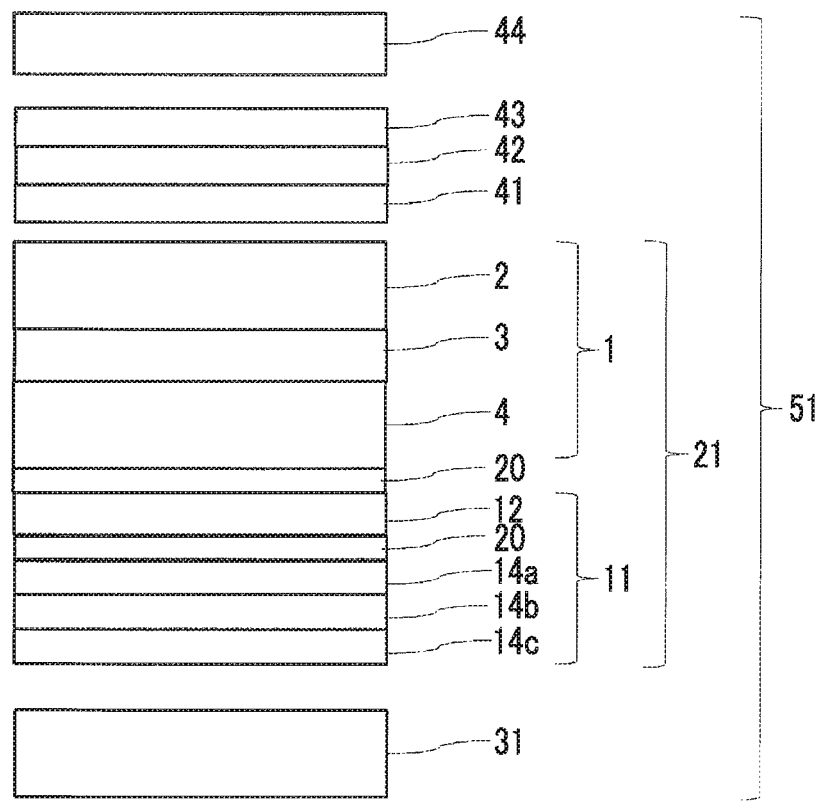
FIG. 6 is a schematic view illustrating a sectional surface of an example of a liquid crystal display device of the present invention.

In FIG. 6, an example of the configuration of the liquid crystal display device of the present invention is illustrated. In FIG. 6, in a liquid crystal display device 51, the backlight unit 31, the optical sheet member 21 of the present invention (a laminated body of a reflection polarizer 11 and the backlight side polarizing plate 1), a thin layer transistor substrate 41, a liquid crystal cell 42, a color filter substrate 43, and a display side polarizing plate 44 are laminated in this order.

Furthermore, the configuration of the optical sheet member 21 of the present invention is illustrated in FIG. 6 by using the configuration illustrated in FIG. 4 as a representative example, but liquid crystal display device of the present invention is not limited to the configuration illustrated in FIG. 4 by such an example.

<Method of Bonding Optical Sheet Member to Liquid Crystal Display Device>

A known method is able to be used as a method of bonding the luminance-enhancing film of the present invention or the optical sheet member of the present invention to the liquid crystal display device. In addition, a roll to panel method is able to be used, and the roll to panel method is preferable from a viewpoint of enhancing productivity and a yield. The roll to panel method is disclosed in JP2011-48381A, JP2009-175653A, JP4628488B, JP4729647B, WO2012/014602A, WO2012/014571A, and the like, but is not limited thereto.

EXAMPLES

Hereinafter, the characteristics of the present invention will be more specifically described with reference to examples and comparative examples. Materials, used amounts, ratios, treatment contents, treatment sequences, and the like of the following examples are able to be suitably changed unless the changes cause deviance from the gist of the present invention. Therefore, the range of the present invention will not be restrictively interpreted by the following specific examples.

Manufacturing Example 1

<Preparation of Polarizing Plate>

A commercially available cellulose acylate-based film "TD80UL" (manufactured by Fujifilm Corporation) was used as a front-side polarizing plate protective film of a backlight side polarizing plate.

A commercially available cellulose acylate-based film "TD80UL" (manufactured by Fujifilm Corporation) was used as a rear-side polarizing plate protective film of the backlight side polarizing plate.

A polarizer was manufactured by the same method as that in "0219" of JP2006-293275A, two polarizing plate protective films described above were bonded to both surfaces of the polarizer, and thus a polarizing plate was manufactured.

Example 1

<Formation of Reflection Polarizer>

A "QL film" manufactured by Fujifilm Corporation was used in a λ/4 plate. Re(550) of the film was 125 nm, and Rth(550) of the film was 1 nm.

A first light reflection layer was formed on the QL film by the following method as a light reflection layer formed by fixing a cholesteric liquid crystalline phase in which a disk-like liquid crystal compound was used as a cholesteric liquid crystal material.

First, as an alignment layer, Poval PVA-103 manufactured by KURARAY CO., LTD was dissolved in pure water, and then was applied onto a PET base with a bar by adjusting the concentration such that the thickness of the dried film was 0.5 μm, and after that, was heated at 100° C. for 5 minutes. Further, the surface thereof was subjected to a rubbing treatment, and thus an alignment layer was formed.

Subsequently, a solute having a composition described below was dissolved in a mixed solvent of $CH_2Cl_2$ and $C_2H_5OH$ at a mass ratio of 98:2 by adjusting the concentration such that the thickness of the dried film of the first light reflection layer was as shown in Table 2 described below, and thus a coating liquid for forming a first light reflection layer including a disk-like liquid crystal compound was prepared. The coating liquid was applied onto the alignment layer described above with a bar, and the solvent was vaporized by being held at 70° C. for 2 minutes, and then was heated and matured at 100° C. for 4 minutes, and thus an even alignment state was obtained.

After that, the coating film was held at 80° C. and was subjected to ultraviolet irradiation by using a high pressure mercury lamp under nitrogen atmosphere, and thus a light reflection layer was formed.

The light reflection layer was bonded onto the QL film described above by using the acrylic adhesive agent described above, the PET base and the alignment layer were peeled off, and thus the first light reflection layer formed by fixing the cholesteric liquid crystalline phase was formed.

<<Solute Composition of Coating Liquid for Forming First Light Reflection Layer Including Disk-Like Liquid Crystal Compound>>

| | |
|---|---|
| Disk-Like Liquid Crystal Compound (Compound 1 Described below) | 35 parts by mass |
| Disk-Like Liquid Crystal Compound (Compound 2 Described below) | 35 parts by mass |
| Chiral Agent (Compound 3 Described below) | 25 parts by mass |
| Alignment Aid (Compound 4 Described below) | 1 part by mass |
| Alignment Aid (Compound 5 Described below) | 1 part by mass |
| Polymerization Initiator (Compound 6 Described below) | 3 parts by mass |

Compound 1

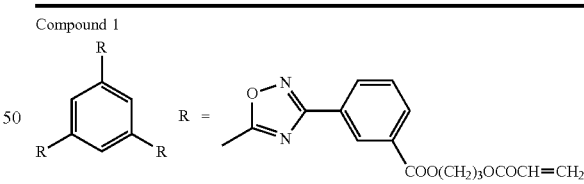

Compound 2

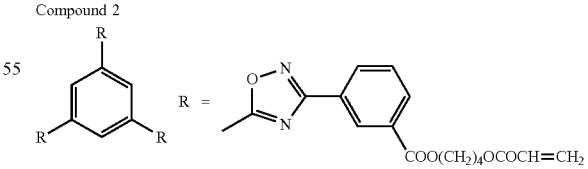

Compound 3

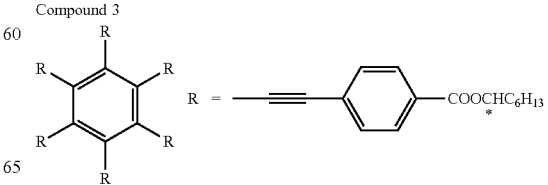

-continued

Compound 4 (In the following structural formula, a mixture of two types of compounds having different substitution positions of a methyl group in a benzene ring substituted with trimethyl. A mixed ratio of two types of compounds of 50:50 (Mass Ratio))

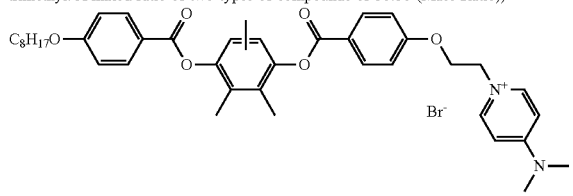

Compound 5

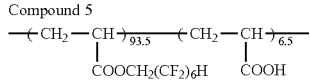

Compound 6

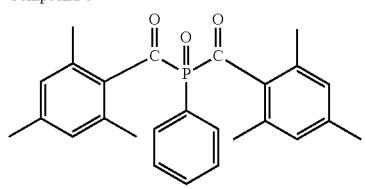

Further, the added amount of a chiral agent used with reference to JP2013-203827A (disclosed in "0016" to "0148") and Fujifilm Research & Research No. 50 (2005) pp. 60 to 63 with respect to a cholesteric liquid crystalline mixture (R1) using a rod-like liquid crystal compound described below was changed, a second light reflection layer and a third light reflection layer which were the light reflection layer formed by fixing the cholesteric liquid crystalline phase using the rod-like liquid crystal compound as the cholesteric liquid crystal material were prepared on a PET film manufactured by Fujifilm Corporation, respectively, the second light reflection layer was bonded onto the first light reflection layer by using the acrylic adhesive agent, and then the PET film was peeled off, and the third light reflection layer was bonded onto the second light reflection layer by using the acrylic adhesive agent, and then the PET film was peeled off, and thus the second light reflection layer and the third light reflection layer formed by fixing the cholesteric liquid crystalline phase were formed.

<Preparation of Cholesteric Liquid Crystalline Mixture (R1) Using Rod-Like Liquid Crystal Compound>

Compounds 11 and 12 described below, a fluorine-based horizontal alignment agent, a chiral agent, a polymerization initiator, and a methyl ethyl ketone solvent were mixed, and thus a coating liquid having a composition described below was prepared. The obtained coating liquid was set to a coating liquid (R1) which was the cholesteric liquid crystalline mixture.

| | |
|---|---|
| Compound 11 Described below | 80 parts by mass |
| Compound 12 Described below | 20 parts by mass |
| Fluorine-Based Horizontal Alignment Agent 1 Described below | 0.1 parts by mass |
| Fluorine-Based Horizontal Alignment Agent 2 Described below | 0.007 parts by mass |
| Right Turning Chiral Agent LC756 (manufactured by BASF SE) Described below Amount at Which Reflection Center Wavelength Shown in Table 2 Described below Was Obtained (Second Light Reflection Layer: approximately 4.1 parts by mass, and Third Light Reflection Layer: approximately 7.0 parts by mass) | |
| Polymerization Initiator IRGACURE819 (manufactured by BASF SE) | 3 parts by mass |
| Solvent (Methyl Ethyl Ketone) Amount at Which Solute Concentration Became | 30 mass % |

Compound 11

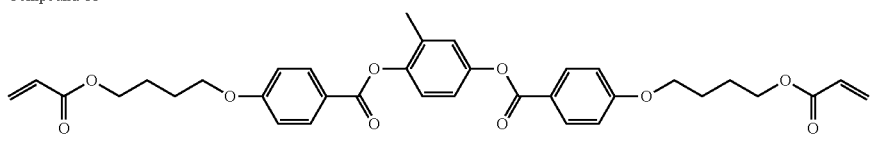

Compound 12

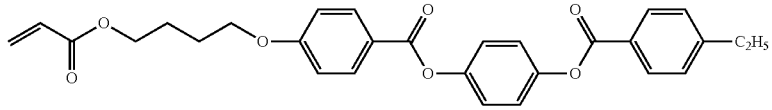 [SMILES: C=CC(=O)OCCCCOc1ccc(C(=O)Oc2ccc(OC(=O)c3ccc(CC)cc3)cc2)cc1]

Fluorine-Based Horizontal Alignment Agent 1

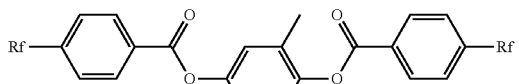

Fluorine-Based Horizontal Alignment Agent 2

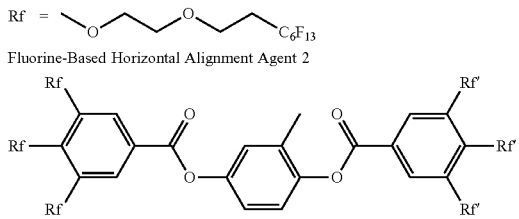

The reflection center wavelength of the maximum reflectivity peak of the obtained first light reflection layer was 540 nm, the half band width was 50 nm, the film thickness was 2.1 μm, ad Rth(550) was −162 nm.

The reflection center wavelength of the maximum reflectivity peak of the obtained second light reflection layer was 630 nm, the half band width was 60 nm, the film thickness was 2.2 μm, and Rth(550) was 174 nm.

The reflection center wavelength of the maximum reflectivity peak of the obtained third light reflection layer was 460 nm, the half band width was 40 nm, the film thickness was 1.8 μm, and Rth(550) was 138 nm.

Furthermore, the average refractive index of the first light reflection layer was 1.5, and the average refractive index of the second light reflection layer and the third light reflection layer was 1.6.

In addition, the total thickness of the obtained luminance-enhancing film including a broadband λ/4 plate and a reflection polarizer was 7.8 μm. The luminance-enhancing film obtained as described above was set to a luminance-enhancing film of Example 1.

A laminated body in which the polarizing plate and the luminance-enhancing film obtained as described above were bonded to each other by the acrylic adhesive agent was set to an optical sheet member of Example 1.

Furthermore, all directions of spiral structures of the respective light reflection layers formed by fixing the cholesteric liquid crystalline phases were right spirals, the direction was adjusted by selecting absolute arrangement of the chiral agent added for forming the spiral structure.

<Manufacturing of Liquid Crystal Display Device>

A commercially available liquid crystal display device (manufactured by Panasonic Corporation, a product name of TH-L42D2) was disassembled, a backlight side polarizing plate was changed to the optical sheet member of Example 1, a backlight unit was changed to a quantum dot (RGB narrowband) backlight unit described below, and thus a liquid crystal display device of Example 1 was manufactured.

The used quantum dot backlight unit includes a blue light emitting diode (manufactured by NICHIA CORPORATION B-LED, a main wavelength of 465 nm, and a half band width of 20 nm) as a light source. In addition, a quantum dot member emitting fluorescent light of green light having a center wavelength of 535 nm and a half band width of 40 nm and red light having a center wavelength of 630 nm and a half band width of 40 nm when the blue light of the blue light emitting diode was incident thereon is provided in a front portion of the light source. In addition, a reflection member performing conversion of a polarization state of light which was emitted from the light source and was reflected on the luminance-enhancing film described above or the optical sheet member described above and reflection of the light was provided in rear of the light source.

Examples 2 to 7 and Comparative Examples 1 to 3

Luminance-enhancing films, optical sheet members, and liquid crystal display devices of Examples 2 to 7 and Comparative Examples 1 to 3 were manufactured by the same method as that in Example 1 except that a reflection wavelength peak and a coating thickness were changed by adjusting the type of cholesteric liquid crystal material of the first light reflection layer, the second light reflection layer, and the third light reflection layer, and a mixed ratio of the chiral agent as shown in Table 2 described below in Example 1. Furthermore, Rth of the first light reflection layer, the second light reflection layer, and the third light reflection layer was adjusted by changing the type of cholesteric liquid crystal material and the coating thickness.

In addition, in Comparative Example 3, only the polarizing plate prepared in Manufacturing Example 1 was used as the backlight side polarizing plate without using the luminance enhancement film, and thus a liquid crystal display device was manufactured.

Examples 9 and 10

In Example 2, luminance-enhancing films, optical sheet members, and liquid crystal display devices of Examples 9 and 10 were manufactured by the same method as that in Example 2 except that only Rth of the QL film was changed, and the total thickness of the luminance-enhancing film was changed as shown in Table 2 described below. Rth was changed by forming the optical anisotropic layer by vertically aligning LC242 manufactured by BASF SE as a rod-like liquid crystal (RLC) on the QL film using a method disclosed in an example of JP 2012-517024A.

Example 8 and Comparative Example 4

A commercially available liquid crystal display device (manufactured by Panasonic Corporation, a product name of TH-L42D2) was disassembled, the optical sheet member of Example 3 was used instead of the backlight side polarizing plate, a backlight unit was not changed, and thus a liquid crystal display device of Example 8 was manufactured.

In addition, in Comparative Example 4, only the polarizing plate prepared in Manufacturing Example 1 was used as the backlight side polarizing plate without using the luminance enhancement film, and thus a liquid crystal display device was manufactured.

In a backlight light source of the liquid crystal display device, the light emitting peak wavelength of blue light was 450 nm There was one light emitting peak in a green to red region, the peak wavelength was 550 nm, and the half band width was 100 nm.

[Evaluation]

The liquid crystal display device of each of the examples and the comparative examples using the luminance-enhancing film and the optical sheet member of each of the examples and the comparative examples was evaluated on the basis of the following criteria. The obtained results are shown in Table 2 described below.

(1) Front Luminance

Front luminance of the liquid crystal display device was measured by a method disclosed in "0180" of the publication of JP2009-93166A. That is, the measured front luminance at the time of performing white display was measured by using a measurement machine (EZ-Contrast 160D, manufactured by ELDIM Corporation). The results were collectively evaluated on the basis of the following criteria. Furthermore, in order to match the light sources to be evaluated, Examples 1 to 7, 9 and 10, and Comparative Examples 1 and 2 were based on Comparative Example 3, and Example 8 was based on Comparative Example 4.

5: Greater than the front luminance of the liquid crystal display device of Comparative Example 3 or 4 by greater than or equal to 30%, which is excellent.

4: Greater than the front luminance of the liquid crystal display device of Comparative Example 3 or 4 by greater than or equal to 20% and less than 30%, which is excellent.

3: Greater than the front luminance of the liquid crystal display device of Comparative Example 3 or 4 by greater than or equal to 10% and less than 20%, which is excellent.

2: Less than or equal to the front luminance of the liquid crystal display device of Comparative Example 3 or 4.

(2) Oblique Change in Shade

An oblique color change $\Delta u'v'$ of the liquid crystal display device was evaluated by the following method. A shade color difference $\Delta u'v'$ obtained by a difference between the values of shade coordinates u' and v' in a front surface (a polar angle of 0 degrees) and a direction at a polar angle of 60 degrees was measured in a direction of an azimuth angle of 0 degrees to 360 degrees, and the average value thereof was set to an evaluation index of the oblique color change $\Delta u'v'$. The shade coordinates u'v' were measured by using a measurement machine (EZ-Contrast 160D, manufactured by ELDIM Corporation). The results were collectively evaluated on the basis of the following criteria.

7: Less than the oblique color change of the liquid crystal display device of Comparative Example 1 by greater than or equal to 40%, which is excellent.

6: Less than the oblique color change of the liquid crystal display device of Comparative Example 1 by greater than or equal to 35% and less than 40%, which is excellent.

5: Less than the oblique color change of the liquid crystal display device of Comparative Example 1 by greater than or equal to 30% and less than 35%, which is excellent.

4: Less than the oblique color change of the liquid crystal display device of Comparative Example 1 by greater than or equal to 20% and less than 30%, which is excellent.

3: Less than the oblique color change of the liquid crystal display device of Comparative Example 1 by greater than or equal to 10% and less than 20%, which is excellent.

2: Less than or equal to the oblique color change of the liquid crystal display device of Comparative Example 1.

(3) Color Reproduction Range

A color reproduction range of the liquid crystal display device was measured by Bm5 manufactured by TOPCON CORPORATION as disclosed in "0066" of JP2012-3073A. The results were collectively evaluation by the following criteria.

4: Greater than an NTSC ratio of the liquid crystal display device of Comparative Example 4 by greater than or equal to 20%, which is excellent.

3: Greater than the NTSC ratio of the liquid crystal display device of Comparative Example 4 by greater than or equal to 5% and less than 20%, which is excellent.

2: Greater than or equal to the NTSC ratio of the liquid crystal display device of Comparative Example 4 by less than 5%. Enhancement in the color reproduction range is able to be confirmed.

1: Less than or equal to the NTSC ratio of the liquid crystal display device of Comparative Example 4. The color reproduction range deteriorates.

TABLE 2

| | | Comparative Example 1 | Comparative Example 2 | Example 1 | Example 2 | Example 3 | Example 4 | Example 5 | Example 6 | Example 7 | Example 8 | Example 9 | Example 10 | Comparative Example 3 | Comparative Example 4 |
|---|---|---|---|---|---|---|---|---|---|---|---|---|---|---|---|
| Luminance-Enhancing Film | λ/4 Plate (Including Support) Re(550) [nm] | 125 | 125 | 125 | 125 | 125 | 125 | 125 | 125 | 125 | 125 | 125 | 125 | No Luminance-Enhancing Film | No Luminance-Enhancing Film |
| | Rth(550) [nm] | 0 | 0 | 0 | 0 | 0 | 0 | 0 | 0 | 0 | 0 | -60 | -120 | | |
| | Direction of Slow Axis (Angle with respect to Absorption Axis of Polarizing Plate) | 45° | 45° | 45° | 45° | 45° | 45° | 45° | 45° | 45° | 45° | 45° | 45° | | |
| Reflection Polarizer | First Light Reflection Layer Cholesteric Liquid Crystal Material | Rod-Like | Disk-Like | Disk-Like | Rod-Like | Disk-Like | Disk-Like | Rod-Like | Disk-Like | Disk-Like | Disk-Like | Rod-Like | Rod-Like | | |
| | Reflection Range | G | G | G | G | G | R | B | G | G | G | G | G | | |
| | Peak Wavelength | 540 | 540 | 540 | 540 | 540 | 635 | 460 | 540 | 540 | 540 | 540 | 540 | | |
| | Film Thickness d [μm] | 2.1 | 2.1 | 2.1 | 2.1 | 2.1 | 2.4 | 1.8 | 1.4 | 1.0 | 2.1 | 2.1 | 2.1 | | |
| | Rth(550) [nm] | 162 | -162 | -162 | 162 | -162 | -190 | 138 | -108 | -81 | -162 | 162 | 162 | | |
| | Second Light Reflection Layer Cholesteric Liquid Crystal Material | Rod-Like | Disk-Like | Rod-Like | Disk-Like | Rod-Like | Rod-Like | Disk-Like | Rod-Like | Rod-Like | Rod-Like | Disk-Like | Disk-Like | | |
| | Reflection Range | R | R | R | R | R | G | G | R | R | R | R | R | | |
| | Peak wavelength | 635 | 635 | 635 | 635 | 635 | 540 | 540 | 635 | 635 | 635 | 635 | 635 | | |
| | Film Thickness d [μm] | 2.2 | 2.2 | 2.2 | 2.2 | 2.4 | 2.1 | 2.1 | 1.5 | 1.1 | 2.4 | 2.2 | 2.2 | | |
| | Rth(550) [nm] | 174 | -174 | -174 | 162 | 190 | 162 | -162 | 117 | 86 | 190 | -174 | -174 | | |
| | Third Light Reflection Layer Cholesteric Liquid Crystal Material | Rod-Like | Disk-Like | Rod-Like | Disk-Like | Disk-Like | Rod-Like | Disk-Like | Rod-Like | Rod-Like | Disk-Like | Rod-Like | Rod-Like | | |
| | Reflection Range | B | B | B | B | B | B | R | B | B | B | B | B | | |
| | Peak Wavelength | 460 | 460 | 460 | 460 | 460 | 460 | 635 | 460 | 460 | 460 | 460 | 460 | | |
| | Film Thickness d [μm] | 1.8 | 1.8 | 1.8 | 1.8 | 1.8 | 1.8 | 2.4 | 0.9 | 0.9 | 1.8 | 1.8 | 1.8 | | |

TABLE 2-continued

| | | Comparative Example 1 | Comparative Example 2 | Example 1 | Example 2 | Example 3 | Example 4 | Example 5 | Example 6 | Example 7 | Example 8 | Example 9 | Example 10 | Comparative Example 3 | Comparative Example 4 |
|---|---|---|---|---|---|---|---|---|---|---|---|---|---|---|---|
| Backlight | Rth(550) [nm] | 138 | −138 | 138 | 138 | −138 | 138 | 190 | 69 | 69 | −138 | 138 | 138 | 138 | |
| | Type | Quantum Dot | Quantum Dot | Quantum Dot | Quantum Dot | Quantum Dot | Quantum Dot | Quantum Dot | Quantum Dot | Quantum Dot | White LED | Quantum Dot | Quantum Dot | Quantum Dot | White LED |
| | Main Wavelength (Blue) [nm] | 465 | 465 | 465 | 465 | 465 | 465 | 465 | 465 | 465 | 450 | 465 | 465 | 465 | 450 |
| | Center Wavelength (Green) [nm] | 535 | 535 | 535 | 535 | 535 | 535 | 535 | 535 | 535 | 550 | 535 | 535 | 535 | 550 |
| | Center Wavelength (Red) [nm] | 630 | 630 | 630 | 630 | 630 | 630 | 630 | 630 | 630 | | 630 | 630 | 630 | |
| Performance | Front Luminance | 5 | 5 | 5 | 5 | 5 | 5 | 5 | 4 | 3 | 4 | 5 | 5 | 2 | 2 |
| | Oblique Change in Shade | 2 | 2 | 5 | 6 | 5 | 5 | 4 | 5 | 5 | 3 | 6 | 4 | 5 | 5 |
| | Color Reproduction Range | 4 | 4 | 4 | 4 | 4 | 4 | 4 | 4 | 4 | 3 | 4 | 4 | 4 | 2 |

From Table 2 described above, it was found that in the liquid crystal display device in which the luminance-enhancing film of the present invention was incorporated in the liquid crystal display device on the backlight side from the liquid crystal cell, the front luminance was high, and the oblique color change was suppressed.

In contrast, from Comparative Example 1 and Comparative Example 2, it was found that the signs of Rth(550) of the first light reflection layer and Rth(550) of the second light reflection layer were identical to each other, and when the luminance-enhancing film was incorporated in the liquid crystal display device, the oblique color change deteriorated.

From Comparative Examples 3 and 4, it was found that in all of the liquid crystal display devices in which the luminance-enhancing film was not used, the front luminance deteriorated.

Furthermore, from Table 2 described above, it was found that in the liquid crystal display devices of Examples 1 to 7, 9, and 10 which were preferred aspects of the present invention, color reproducibility was also high.

In addition, in each of the examples and Comparative Examples 1 and 2, circular polarization exiting (transmitted and reflected) from the reflection polarizer was confirmed by the method described herein.

Examples 11 to 18 and Comparative Example 5

<Formation of Supports for Luminance-Enhancing Film of Examples 11 and 12 and Comparative Example 5>
(Preparation of Core Layer Cellulose Acylate Dope)
Compositions described below were put into a mixing tank and were stirred, and each component was dissolved, and thus a cellulose acetate solution was prepared.
Composition of Core Layer Cellulose Acylate Dope:

| | |
|---|---|
| Cellulose Acetate Having Degree of Acetyl Substitution of 2.88 | 100 parts by mass |
| Plasticizer 2 (structure described below) | 15 parts by mass |
| Methylene Chloride (First Solvent) | 426 parts by mass |
| Methanol (Second Solvent) | 64 parts by mass |

(Plasticizer 2)

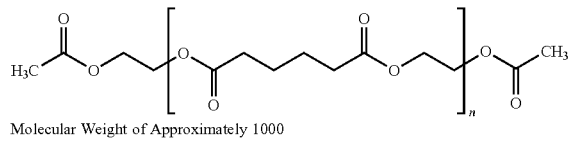

Molecular Weight of Approximately 1000

(Preparation of Outer Layer Cellulose Acylate Dope)
10 parts by mass of a matting agent solution described below was added to 90 parts by mass of the core layer cellulose acylate dope described above, and thus an outer layer cellulose acetate solution was prepared.
Composition of Matting Agent Solution:

| | |
|---|---|
| Silica Particles Having Average Particle Size of 20 nm (AEROSIL R972, manufactured by NIPPON AEROSIL CO., LTD.) | 2 parts by mass |
| Methylene Chloride (First Solvent) | 76 parts by mass |
| Methanol (Second Solvent) | 11 parts by mass |
| Core Layer Cellulose Acylate Dope | 1 part by mass |

(Preparation of Cellulose Acylate Film)
Three layers of the core layer cellulose acylate dope described above, and the outer layer cellulose acylate dopes on both sides of the core layer cellulose acylate dope were simultaneously casted from a casting port onto a drum at 20° C. Peeling off was performed in a state where a solvent content ratio was approximately 20 mass %, both ends of the film in a width direction were fixed by a tenter clip, and the film was dried while being stretched in a horizontal direction at a stretching ratio of 1.1 times in a state where a residual solvent was in the amount of 3% to 15%. After that, a cellulose acylate film having a thickness of 40 μm was prepared by being transported between rolls of a heat treatment device, and thus cellulose acylate 1 was obtained. Re and Rth of the film at 550 nm were 0.9 nm and −4 nm, respectively.

<Preparation of Supports for Luminance-Enhancing Film of Examples 13 to 18>
(Preparation of Core Layer Cellulose Acylate Dope)
Compositions described below were put into a mixing tank and were stirred, each component was dissolved, and thus a cellulose acetate solution was prepared.
Composition of Core Layer Cellulose Acylate Dope:

| | |
|---|---|
| Cellulose Acetate Having Degree of Acetyl Substitution of 2.88 | 100 parts by mass |
| Ester Oligomer (Plasticizer 1 described below) | 10 parts by mass |
| Polarizer Durability Improver (Compound 2-10 described below) | 4 parts by mass |
| Ultraviolet Absorber (UV Agent A described below) | 4 parts by mass |
| Methylene Chloride (First Solvent) | 438 parts by mass |
| Methanol (Second Solvent) | 65 parts by mass |

(Plasticizer 1)

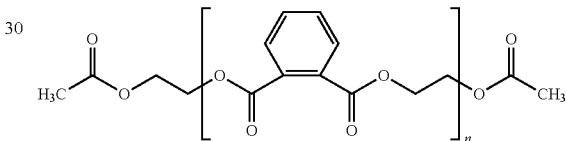

Molecular Weight: Approximately 1000
(Compound 2-10)

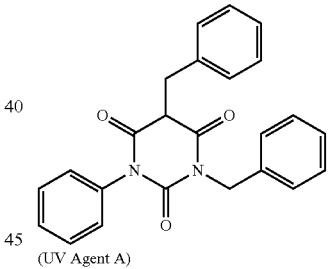

(UV Agent A)

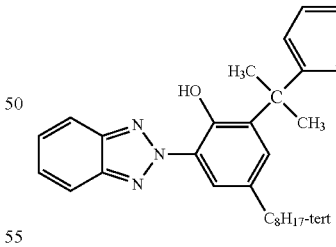

(Preparation of Outer Layer Cellulose Acylate Dope)
90 parts by mass of the core layer cellulose acylate dope described above was added to 10 parts by mass of a matting agent solution described below, and thus an outer layer cellulose acetate solution was prepared.
(Composition of Matting Agent Solution)

| | |
|---|---|
| Silica Particles Having Average Particle Size of 20 nm (AEROSIL R972, manufactured by NIPPON AEROSIL CO., LTD.) | 2 parts by mass |

| | |
|---|---|
| Methylene Chloride (First Solvent) | 76 parts by mass |
| Methanol (Second Solvent) | 11 parts by mass |
| Core Layer Cellulose Acylate Dope | 1 part by mass |

(Preparation of Cellulose Acylate Film)

Three layers of the core layer cellulose acylate dope described above, and the outer layer cellulose acylate dope on both sides of the core layer cellulose acylate dope were concurrently casted from a casting port onto a drum at 20° C. Peeling off was performed in a state where a solvent content ratio of approximately 20 mass %, both ends of the film in a width direction were fixed by a tenter clip, and the film was dried while being stretched in a horizontal direction at a stretching ratio of 1.1 times in a state where a residual solvent was in the amount of 3% to 15%. After that, a cellulose acylate film having a thickness of 25 μm was prepared by being transported between rolls of a heat treatment device, and thus cellulose acylate 2 was obtained. Re and Rth of the film at 550 nm were 0.6 nm and 41 nm, respectively.

<Formation of λ/4 Plate for Luminance-Enhancing Film of Examples 11 to 18 and Comparative Example 5>

As an alignment layer, in Examples 11 to 16 and Comparative Example 5, Poval PVA-103 manufactured by KURARAY CO., LTD was dissolved in pure water, and then a solution of which the concentration was adjusted was applied onto the cellulose acylate 1 prepared as described above with a bar such that the thickness of the dried film was 0.5 μm, and in Examples 17 and 18, the solution was applied onto the cellulose acylate 2 prepared as described above with a bar, and after that, and the solution was heated at 100° C. for 5 minutes. Further, the surface thereof was subjected to a rubbing treatment, and thus an alignment layer was formed.

Subsequently, a solute having a composition described below was dissolved in MEK by adjusting the concentration such that the thickness of the dried film was 1 μm, and thus a coating liquid was prepared. The coating liquid was applied onto the alignment layer described above with a bar, and the solvent was vaporized by being held at 85° C. for 2 minutes, and then was heated and matured at 100° C. for 4 minutes, and thus an even alignment state was obtained. Furthermore, a disk-like compound was vertically aligned with respect to the plane of the support.

After that, the coating film was held at 80° C. and was subjected to ultraviolet irradiation by using a high pressure mercury lamp under nitrogen atmosphere, and thus a λ/4 plate was formed.

(Solute Composition of Coating Liquid for Forming λ/4 Plate)

| | |
|---|---|
| Disk-Like Liquid Crystal Compound (Compound 101 Described below) | 35 parts by mass |
| Disk-Like Liquid Crystal Compound (Compound 102 Described below) | 35 parts by mass |
| Alignment Aid (Compound 4 Described in Coating Liquid for Forming First Light Reflection Layer Including Disk-Like Liquid Crystal Compound Used in Example 1) | 1 part by mass |
| Alignment Aid (Compound 5 Described in Coating Liquid for Forming First Light Reflection Layer Including Disk-Like Liquid Crystal Compound Used in Example 1) | 1 part by mass |
| Polymerization Initiator (Compound 6 Described in Coating Liquid for Forming First Light Reflection Layer Including Disk-Like Liquid Crystal Compound Used in Example 1) | 3 parts by mass |

Compound 101

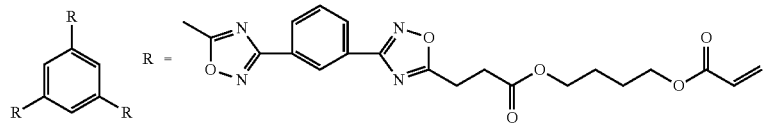

Compound 102

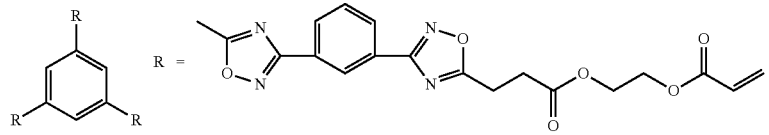

<Formation of Reflection Polarizer for Luminance-Enhancing Film of Example 11> on the λ/4 plate prepared by the method described above, a first light reflection layer was formed by the following method as the light reflection layer formed by fixing the cholesteric liquid crystalline phase using the disk-like liquid crystal compound as the cholesteric liquid crystal material.

First, as a alignment layer, Sunever SE-130 (manufactured by NISSAN CHEMICAL INDUSTRIES LTD.) was dissolved in N-methyl pyrrolidone, was applied onto a glass plate with a bar by adjusting the concentration such that the thickness of the dried film was 0.5 μm, and then was heated at 100° C. for 5 minutes, and was heated at 250° C. for 1 hour. Further, the surface thereof was subjected to a rubbing treatment, and thus an alignment layer was formed.

Subsequently, a solute having a composition described below was dissolved in MEK by adjusting the concentration such that the thickness of the dried film was the thickness of the dried film of the first light reflection layer shown in Table 2 described below, and thus a coating liquid for forming a first light reflection layer was prepared. The coating liquid was applied onto the alignment layer described above with a bar, and the solvent was vaporized by being held at 70° C. for 2 minutes, and then was heated and matured at 100° C. for 4 minutes, and thus an even alignment state was obtained.

After that, the coating film was held at 45° C. and was subjected to ultraviolet irradiation by using a high pressure mercury lamp under nitrogen atmosphere, and thus a light reflection layer was formed.

The light reflection layer was bonded onto the λ/4 plate described above by using the acrylic adhesive agent described above, the glass plate was peeled off, and thus a first light reflection layer formed by fixing a cholesteric liquid crystalline phase was formed.

<<Solute Composition of Coating Liquid for Forming First Light Reflection Layer Including Disk-Like Liquid Crystal Compound>>

| | |
|---|---|
| Disk-Like Liquid Crystal Compound (Compound 101 described in Coating Liquid for Forming λ/4 Plate Used in Example 11) | 56 parts by mass |
| Disk-Like Liquid Crystal Compound (Compound 102 described in Coating Liquid for Forming λ/4 Plate Used in Example 11) | 14 parts by mass |
| Alignment Aid (Compound 4 Described in Coating Liquid for Forming First Light Reflection Layer Including Disk-Like Liquid Crystal Compound Used in Example 1) | 1 part by mass |
| Alignment Aid (Compound 5 Described in Coating Liquid for Forming First Light Reflection Layer Including Disk-Like Liquid Crystal Compound Used in Example 1) | 1 part by mass |
| Polymerization Initiator (Compound 6 Described in Coating Liquid for Forming First Light Reflection Layer Including Disk-Like Liquid Crystal Compound Used in Example 1) | 3 parts by mass |
| Chiral Agent (Compound 103 Described below) | 2.5 parts by mass |

Compound 103

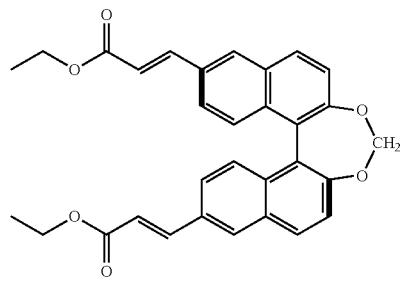

Further, the added amount of a chiral agent used with reference to JP2013-203827A (disclosed in "0016" to "0148") and Fujifilm Research & Research No. 50 (2005) pp. 60 to 63 with respect to a cholesteric liquid crystalline mixture (R1) using the rod-like liquid crystal compound used in Example 1 was changed, a second light reflection layer and a third light reflection layer which were the light reflection layer formed by fixing the cholesteric liquid crystalline phase using the rod-like liquid crystal compound as the cholesteric liquid crystal material were prepared on a PET film manufactured by Fujifilm Corporation, respectively, the second light reflection layer was bonded onto the first light reflection layer by using the acrylic adhesive agent, and then the PET film was peeled off, and the third light reflection layer was bonded onto the second light reflection layer by using the acrylic adhesive agent, and then the PET film was peeled off, and thus the second light reflection layer and the third light reflection layer formed by fixing the cholesteric liquid crystalline phase were formed.

The luminance-enhancing film obtained as described above was set to a luminance-enhancing film of Example 11.

In addition, a laminated body of the polarizing plate and the luminance-enhancing film obtained as described above was set to an optical sheet member of Example 11.

In Example 1, a liquid crystal display device of Example 11 was prepared by the same method as that in Example 1 except that the optical sheet member of Example 11 was used as the optical sheet member, and thus a liquid crystal display device of Example 11 was prepared.

<Luminance-Enhancing Films of Examples 12 to 18 and Comparative Example 5>

In Example 11, luminance-enhancing films, optical sheet members, and liquid crystal display devices of Examples 12 to 18 and Comparative Example 5 were manufactured by the same method as that in Example 11 except that the lamination sequence of the first light reflection layer, the second light reflection layer, and the third light reflection layer was as shown in Table 3 described below.

[Evaluation]

The liquid crystal display device of Examples 11 to 18 and Comparative Example 5 using the luminance-enhancing film and the optical sheet member of Examples 11 to 18 and Comparative Example 5 was evaluated on the basis of the same criteria as those in Example 1.

Specifically, in Example 11 to Example 18 and Comparative Example 5, the front luminance was evaluated on the basis of Comparative Example 3.

In Example 11 to Example 18 and Comparative Example 5, the oblique color change was evaluated on the basis of Comparative Example 1.

In Example 11 to Example 18 and Comparative Example 5, the color reproduction range was evaluated on the basis of Comparative Example 4.

The obtained results were shown in Table 3 described below.

TABLE 3

| | | | Example 11 | Example 12 | Example 13 | Example 14 | Example 15 | Example 16 | Example 17 | Example 18 | Comparative Example 5 |
|---|---|---|---|---|---|---|---|---|---|---|---|
| Luminance-Enhancing Film | λ/4 Plate (Including Support) | Re(550) [nm] | 128 | 124 | 133 | 131 | 129 | 126 | 130 | 130 | 130 |
| | | Rth(550) [nm] | −63 | −68 | −8 | 12 | −17 | 18 | 3 | 3 | −61 |
| | | Direction of Slow Axis (Angle with respect to Absorption Axis of Polarizing Plate) | 45° | 45° | 45° | 45° | 45° | 45° | 45° | 45° | 45° |
| | Reflection Polarizer | First Light Reflection Layer | Cholesteric Liquid Crystal Material | Disk-Like | Rod-Like | Rod-Like | Rod-Like | Rod-Like | Rod-Like | Disk-Like | Disk-Like | Rod-Like |
| | | | Reflection Range | R | G | G | B | G | G | R | R | G |
| | | | Peak Wavelength | 648 | 542 | 530 | 455 | 539 | 533 | 655 | 684 | 530 |
| | | | Film Thickness d [μm] | 2.6 | 2.9 | 2.7 | 2.3 | 2.9 | 2.7 | 2.6 | 2.7 | 2.7 |
| | | | Rth(550) [nm] | −257 | 224 | 212 | 177 | 226 | 213 | −260 | −271 | 212 |
| | | Second Light Reflection Layer | Cholesteric Liquid Crystal Material | Rod-Like | Disk-Like | Disk-Like | Disk-Like | Disk-Like | Disk-Like | Rod-Like | Rod-Like | Rod-Like |
| | | | Reflection Range | B | R | R | R | B | B | B | B | R |
| | | | Peak Wavelength | 455 | 645 | 648 | 641 | 460 | 451 | 455 | 455 | 649 |
| | | | Film Thickness d [μm] | 1.7 | 3.3 | 3.3 | 3.3 | 2.4 | 2.3 | 1.7 | 1.7 | 3.3 |
| | | | Rth(550) [nm] | 136 | −330 | −332 | −328 | −235 | −231 | 136 | 136 | 259 |
| | | Third Light Reflection Layer | Cholesteric Liquid Crystal Material | Rod-Like | Rod-Like | Disk-Like | Rod-Like | Rod-Like | Disk-Like | Rod-Like | Rod-Like | Rod-Like |
| | | | Reflection Range | G | B | B | G | R | R | G | G | B |
| | | | Peak Wavelength | 541 | 452 | 460 | 540 | 646 | 650 | 535 | 535 | 460 |
| | | | Film Thickness d [μm] | 2.8 | 2.3 | 2.4 | 2.8 | 3.3 | 3.3 | 2.7 | 2.7 | 2.4 |
| | | | Rth(550) [nm] | 216 | 180 | −235 | 216 | 258 | −333 | 214 | 214 | 184 |
| Backlight | | Type | Quantum Dot | Quantum Dot | Quantum Dot | Quantum Dot | Quantum Dot | Quantum Dot | Quantum Dot | Quantum Dot | Quantum Dot |
| | | Main Wavelength (Blue) [nm] | 465 | 465 | 465 | 465 | 465 | 465 | 465 | 465 | 465 |
| | | Center Wavelength (Green) [nm] | 535 | 535 | 535 | 535 | 535 | 535 | 535 | 535 | 535 |
| | | Center Wavelength (Red) [nm] | 630 | 630 | 630 | 630 | 630 | 630 | 630 | 630 | 630 |
| Performance | | Front Luminance | 5 | 5 | 5 | 5 | 5 | 5 | 5 | 5 | 5 |
| | | Oblique Change in Shade | 7 | 7 | 6 | 6 | 6 | 6 | 7 | 6 | 2 |
| | | Color Reproduction Range | 4 | 4 | 4 | 4 | 4 | 4 | 4 | 4 | 4 |

From Table 3 described above, it was found that in a liquid crystal display device in which the luminance-enhancing film of the present invention was incorporated in the liquid crystal display device on the backlight side from the liquid crystal cell, the front luminance was high, and the oblique color change was suppressed.

In contrast, from Comparative Example 5, it was found that the signs of Rth(550) of the first light reflection layer and Rth(550) of the second light reflection layer were identical to each other, and when the luminance-enhancing film was incorporated in the liquid crystal display device, the oblique color change deteriorated.

In addition, in each of the examples and Comparative Example 5, circular polarization exiting (transmitted and reflected) from the reflection polarizer was confirmed by the method described herein.

Example 19

An example of a manufacturing process of the luminance-enhancing film of the present invention will be described. First, a film is prepared in which the alignment layer is disposed on the support and is subjected to a rubbing treatment, and then the λ/4 plate is directly laminated thereon, and the first light reflection layer is further directly laminated thereon. Next, a film in which a temporary support is subjected to a rubbing treatment, and then the third light reflection layer is directly laminated thereon, and the second light reflection layer is further directly laminated thereon. Finally, the first light reflection layer of the former film adheres to the second light reflection layer of the latter film by using an adhesive layer, and thus a luminance-enhancing film is obtained.

<Preparation of Support for Luminance-Enhancing Film>
(Preparation of Cellulose Ester Solution A-1)
Compositions described below were put into a mixing tank and were stirred while being heated, each component was dissolved, and thus a cellulose ester solution A-1 was prepared.

Composition of Cellulose Ester Solution A-1

| | |
|---|---|
| Cellulose Acetate (Degree Of Acetylation of 2.86) | 100 parts by mass |
| Methylene Chloride (First Solvent) | 320 parts by mass |
| Methanol (Second Solvent) | 83 parts by mass |
| 1-Butanol (Third Solvent) | 3 parts by mass |
| Triphenyl Phosphate | 7.6 parts by mass |
| Biphenyl Diphenyl Phosphate | 3.8 parts by mass |

(Preparation of Matting Agent Dispersion B-1)
Composition described below were put into a dispersion machine and were stirred, each component was dissolved, and thus a matting agent dispersion B-1 was prepared.

Composition of Matting Agent Dispersion B-1

| | |
|---|---|
| Silica Particle Dispersion (Average Particle Diameter of 16 nm) "AEROSIL R972", manufactured by NIPPON AEROSIL CO., LTD. | 10.0 parts by mass |
| Methylene Chloride | 72.8 parts by mass |
| Methanol | 3.9 parts by mass |
| Butanol | 0.5 parts by mass |
| Cellulose Ester Solution A-1 | 10.3 parts by mass |

(Preparation of Ultraviolet Absorber Solution C-1)
Compositions described below were put into a separate mixing tank and were stirred while being heated, each component was dissolved, and an ultraviolet absorber solution C-1 was prepared.

Composition of Ultraviolet Absorber Solution C-1

| | |
|---|---|
| Ultraviolet Absorber (UV-1 described below) | 10.0 parts by mass |
| Ultraviolet Absorber (UV-2 described below) | 10.0 parts by mass |
| Methylene Chloride | 55.7 parts by mass |
| Methanol | 10 parts by mass |
| Butanol | 1.3 parts by mass |
| Cellulose Ester Solution A-1 | 12.9 parts by mass |

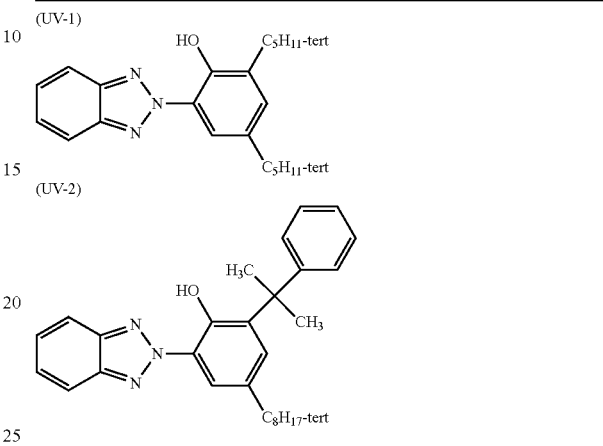

(Preparation of Cellulose Ester Film)
The ultraviolet absorber solution C-1 was added to a mixture including 94.6 parts by mass of the cellulose acylate solution A-1 and 1.3 parts by mass of the matting agent dispersion B-1 such that the amount of each of the ultraviolet absorber (UV-1) and the ultraviolet absorber (UV-2) was 1.0 part by mass with respect to 100 parts by mass of cellulose acylate and was sufficiently stirred while being heated, each component was dissolved, and thus a dope was prepared. The obtained dope was heated to 30° C., and was casted onto a mirror stainless support which was a drum having a diameter of 3 m through a casting die. The surface temperature of the support was set to −5° C., and the coating width was set to 1470 mm. The doped film which was casted was dried on the drum by drying air at a temperature of 34° C. and a rate of 150 m³/minutes, and was peeled off from the drum in a state where a residual solvent was 150%. When the doped film was peeled off, stretching of 15% was performed in a transport direction (a longitudinal direction). After that, the film was transported while gripping both ends of the film in a width direction (a direction orthogonal to a casting direction) with a pin tenter (a pin tenter illustrated in FIG. 3 of JP1992-1009A (JP-H04-1009A)), and a stretching treatment was performed in the width direction. Further, the film was further dried by being transported between rolls of a heat treatment device, and thus a cellulose acylate film (T1) was manufactured. The amount of residual solvent of the prepared long cellulose acylate film (T1) was 0.2%, the thickness was 60 μm, and Re and Rth at 550 nm were 0.8 nm and 40 nm, respectively.

<Formation of Alignment Layer>
(Alkali Saponification Treatment)
The cellulose acylate film (T1) described above passed through dielectric heating rolls at a temperature of 60° C., and thus the film surface temperature was heated to 40° C., and then an alkali solution having a composition described below was applied onto the band surface of the film by using a bar coater at a coating amount of 14 ml/m² and transported under a steam type far infrared heater manufactured by Noritake Co., Ltd. which was heated to 110° C. for 10 seconds. Subsequently, pure water was applied thereon by using the same bar coater at a coating amount of 3 ml/m². Next, water washing of a fountain coater and water draining of an air knife were repeated three times, and then the film was dried by being transported to a drying zone at 70° C. for 10 seconds, and thus a cellulose acylate film which had been subjected to an alkali saponification treatment was prepared.

Alkali Solution Composition

| Potassium Hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene Glycol | 14.8 parts by mass |

Subsequently, an alignment layer coating liquid (A) having a composition described below was continuously applied onto the surface of the cellulose acylate film (T1) to which the alkali saponification treatment had been performed by using a wire bar of #14. The alignment layer coating liquid (A) was dried by hot air at 60° C. for 60 seconds, and further dried by hot air at 100° C. for 120 seconds. The degree of saponification of the used modified polyvinyl alcohol was 96.8%.

Composition of Alignment Layer Coating Liquid (A)

| Modified Polyvinyl Alcohol Described below | 10 parts by mass |
| Water | 308 parts by mass |
| Methanol | 70 parts by mass |
| Isopropanol | 29 parts by mass |
| Photopolymerization Initiator (Irgacure 2959, manufactured by BASF SE) | 0.8 parts by mass |

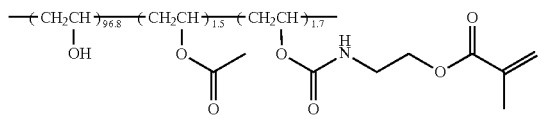

Modified Polyvinyl Alcohol
A composition ratio of the modified polyvinyl alcohol is a molar fraction.

The alignment layer prepared as described above was continuously subjected to a rubbing treatment. At this time, the longitudinal direction and the transport direction of the long film were parallel to each other, and an angle between the longitudinal direction of the film and a rotational axis of a rubbing roller was approximately 45°.

<Formation of λ/4 Plate>

A solute having a composition described below was dissolved in MEK by adjusting the concentration such that the thickness of the dried film became 1.0 µm, and thus a coating liquid was prepared. The coating liquid was applied onto the alignment layer described above with a bar, and was heated and matured at 80° C. for 1 minute, and thus an even alignment state was obtained. After that, the coating film was held at 75° C. and was subjected to ultraviolet irradiation at 300 mJ/cm² by using a metal halide lamp, and thus a λ/4 plate was formed.

When retardation Re of the obtained λ/4 plate in an in-plane direction was measured, and the retardation Re was 130 nm.

<<Solute Composition of λ/4 Plate Coating Liquid>>

| Disk-Like Liquid Crystal Compound (Compound 101 Described in Coating Liquid for Forming λ/4 Plate Used in Example 11) | 80 parts by mass |
| Disk-Like Liquid Crystal Compound (Compound 102 Described in Coating Liquid for Forming λ/4 Plate Used in Example 11) | 20 parts by mass |
| Alignment Aid (Compound 4 Described in Coating Liquid for Forming First Light Reflection Layer Including Disk-Like Liquid Crystal Compound Used in Example 1) | 0.9 parts by mass |
| Alignment Aid 2 (Compound Described below) | 0.08 parts by mass |
| Surfactant 1 (Compound Described below) | 0.075 parts by mass |

| | |
|---|---|
| Polymerization Initiator (Compound Described below) | 3 parts by mass |
| Polymerizable Monomer (Compound Described below) | 10 parts by mass |

Alignment Aid 2

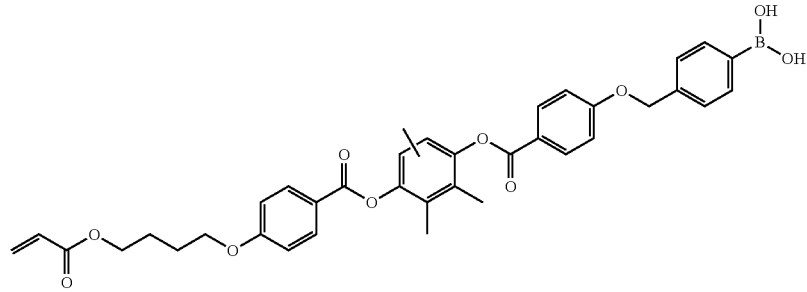

Surfactant 1

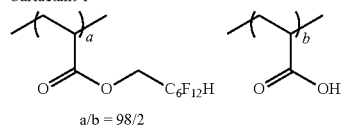

a/b = 98/2

In a/b = 98/2 of the structural formula of Surfactant 1, a indicates 98 mass %, and b indicates 2 mass %.

Polymerization Initiator 1

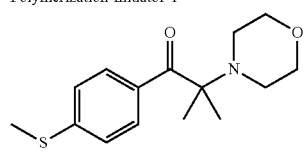

Polymerizable Monomer

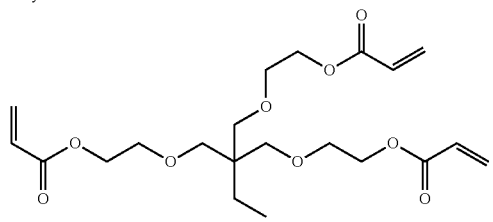

<Formation of Reflection Polarizer>
(Formation of First Light Reflection Layer)

A first light reflection layer was formed on the λ/4 plate described above by the following as the light reflection layer formed by fixing the cholesteric liquid crystalline phase using the disk-like liquid crystal compound as the cholesteric liquid crystal material.

A solute having a composition described below was dissolved in MEK by adjusting the concentration such that the thickness of the dried film was identical to that in Example 17, and thus a coating liquid for forming a first light reflection layer including the disk-like liquid crystal compound was prepared. The coating liquid was applied onto the λ/4 plate described above with a bar, and was heated and matured at 110° C. for 1 minute, and thus an even alignment state was obtained. After that, the coating film was held at 45° C. and was subjected to ultraviolet irradiation at 300 mJ/cm² by using a metal halide lamp, and thus a light reflection layer was formed.

<<Solute Composition of First Light Reflection Layer Coating Liquid>>

| | |
|---|---|
| Disk-Like Liquid Crystal Compound | 80 parts by mass |
| (Compound 101 Described in Coating Liquid for Forming λ/4 Plate Used in Example 11) | |
| Disk-Like Liquid Crystal Compound | 20 parts by mass |
| (Compound 102 Described in Coating Liquid for Forming λ/4 Plate Used in Example 11) | |
| Surfactant 1 Described above | 0.45 parts by mass |

| | |
|---|---|
| Polymerization Initiator 1 Described above | 3 parts by mass |
| Chiral Agent 1 Described below Amount at Which Reflection Center Wavelength Described in Example 17 Was Obtained | (Approximately 3.5 parts by mass) |

Chiral Agent 1

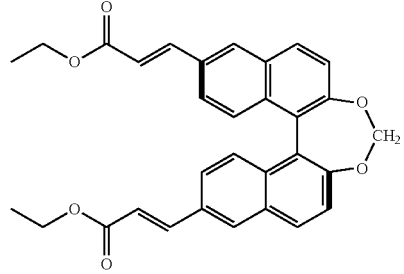

(Formation of Third Light Reflection Layer)

A PET film (a thickness of 75 μm) manufactured by Fujifilm Corporation was prepared as a temporary support, and was continuously subjected to a rubbing treatment. The direction of the rubbing treatment was parallel to the longitudinal direction of the film. Furthermore, it was confirmed that a general PET film (for example, Cosmoshine A4100 (manufactured by TOYOBO CO., LTD.)) was able to be used as the temporary support in addition to the PET film described above.

A solute having a composition described below was dissolved in MEK by adjusting the concentration such that the thickness of the dried film was identical to that in Example 17, and thus a coating liquid for forming a third light reflection layer including the rod-like liquid crystal compound was prepared. The coating liquid was applied onto the temporary support which had been subjected to rubbing described above with a bar, and was heated and matured at 85° C. for 1 minute, and thus an even alignment state was obtained. After that, the coating film was held at 45° C. and was subjected to ultraviolet irradiation at 300 mJ/cm² by using a metal halide lamp, and thus a third light reflection layer was formed.

<<Solute Composition of Third Light Reflection Layer Coating Liquid>>

(Formation of Second Light Reflection Layer)

A solute having a composition described below was dissolved in MEK by adjusting the concentration such that the thickness of the dried film was identical to that in Example 17, and thus a coating liquid for forming a second light reflection layer including the rod-like liquid crystal compound was prepared. The coating liquid was applied onto the third light reflection layer prepared as described above with a bar, and was heated and matured at 85° C. for 1 minute, and thus an even alignment state was obtained. After that, the coating film was held at 45° C. and was subjected to ultraviolet irradiation at 300 mJ/cm² by using a metal halide lamp, and thus a second light reflection layer was formed.

<<Solute Composition of Second Light Reflection Layer Coating Liquid>>

| | |
|---|---|
| Compound 11 Described in Example 1 | 83 parts by mass |
| Rod-Like Compound 18-1 Described above | 15 parts by mass |

| | |
|---|---|
| Compound 11 Described in Example 1 | 83 parts by mass |
| Rod-Like Compound 18-1 Described below | 15 parts by mass |
| Rod-Like Compound 18-2 Described below | 2 parts by mass |
| Fluorine-Based Horizontal Alignment Agent 1 Described in Example 1 | 0.05 parts by mass |
| Fluorine-Based Horizontal Alignment Agent 2 Described in Example 1 | 0.01 parts by mass |
| Right Turning Chiral Agent LC756 (manufactured by BASF SE) Described in Example 1 Amount at Which Reflection Center Wavelength Described in Example 17 Was Obtained | (Approximately 5.6 parts by mass) |
| Multifunctional Monomer A-TMMT (manufactured by SHIN-NAKAMURA CHEMICAL CO., LTD.) | 1 part by mass |
| Polymerization Initiator IRGACURE 819 (manufactured by BASF SE) | 3 parts by mass |

Rod-Like Compound 18-1

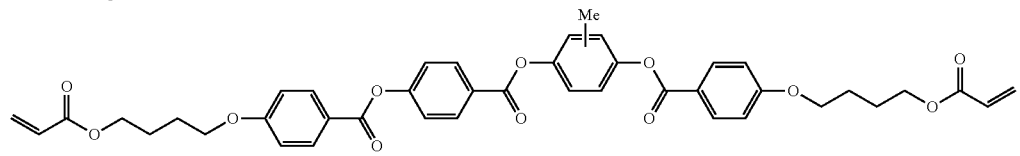

Rod-Like Compound 18-2

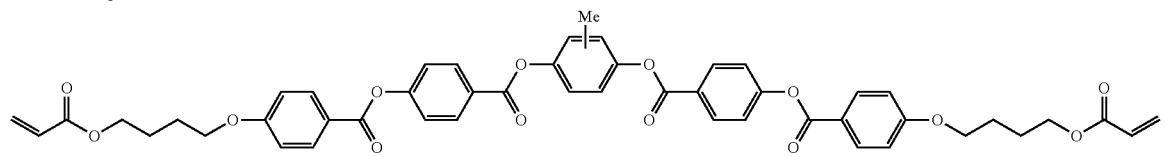

| | |
|---|---|
| Rod-Like Compound 18-2 Described above | 2 parts by mass |
| Fluorine-Based Horizontal Alignment Agent 1 Described in Example 1 | 0.05 parts by mass |
| Fluorine-Based Horizontal Alignment Agent 2 Described in Example 1 | 0.01 parts by mass |
| Right Turning Chiral Agent LC756 (manufactured by BASF SE) Described in Example 1 Amount at Which Reflection Center Wavelength Described in Example 17 Was Obtained | (Approximately 6.9 parts by mass) |
| Multifunctional Monomer A-TMMT (manufactured by SHIN-NAKAMURA CHEMICAL CO., LTD.) | 1 part by mass |
| Polymerization Initiator IRGACURE 819 (manufactured by BASF SE) | 3 parts by mass |

<Formation of Luminance-Enhancing Film>

Figure 9:
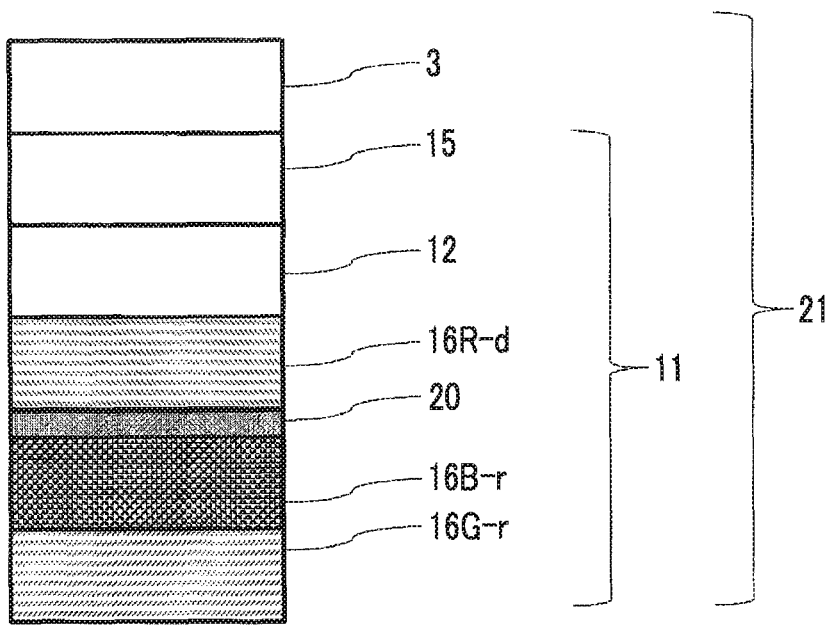
FIG. 9 is a schematic view illustrating a sectional surface of an optical sheet member of Example 19.

A film 1 in which the alignment layer, the λ/4 plate, and the first light reflection layer were laminated on the support prepared as described above adhered to a film 2 in which the third light reflection layer and the second reflection layer were laminated on the temporary support prepared as described above. The adhesion surface was the surface of the first light reflection layer and the surface of the second reflection layer. The adhesion was performed by disposing a commercially available acrylic adhesive agent (UV-3300, manufactured by TOAGOSEI CO., LTD.) using coating, by irradiating the adhesive agent with an ultraviolet ray having irradiation dose of 100 mJ/cm$^2$ from the temporary support side using a metal halide lamp, and by curing the adhesive agent. Finally, the temporary support was peeled off, and thus a luminance-enhancing film of Example 19 was obtained (FIG. 9).

The performance of the obtained luminance-enhancing film of Example 19 was identical to that of the luminance-enhancing film described in Example 17.

A manufacturing process of the luminance-enhancing film having the same properties as those in Example 17 is able to refer to various methods other than the method in Example 19. Examples of the method are able to include the following methods.

1) A method in which a second light reflection layer prepared on a temporary support adheres to a film where a λ/4 plate and a first light reflection layer are directly laminated on a support or are laminated on a support through an alignment layer, and then the temporary support is peeled off, and a film including a third light reflection layer prepared on a temporary support adheres to the second reflection layer.

2) A method in which a film where only a λ/4 plate is laminated on a support adheres to a film where a third light reflection layer, a second light reflection layer, and a first light reflection layer are directly laminated on a temporary support or are laminated on a temporary support through an alignment layer or an adhesive layer.

3) A method in which a film where an alignment layer, a λ/4 plate, a first light reflection layer, and a second light reflection layer are directly laminated on a support or are laminated on a support through an alignment layer adheres to a film including a third light reflection layer prepared on a temporary support.

4) A method in which an alignment layer, a λ/4 plate, a first light reflection layer, a second light reflection layer, and a third light reflection layer are directly laminated on a support or are laminated on a support through an alignment layer.

Example 20

A film was prepared in which an alignment layer was disposed on a support and was subjected to a rubbing treatment, and then a λ/4 plate was directly laminated on the alignment layer, and the first light reflection layer used in Example 17 was directly laminated on the λ/4 plate. Next, a film was prepared in which a PET support which was a temporary support was subjected to a rubbing treatment, and then the third light reflection layer of Example 17 was directly laminated on the PET support, and the second light reflection layer of Example 17 was directly laminated on the third light reflection layer. Finally, the first light reflection layer of the former film adhered to the second light reflection layer of the latter film by disposing a commercially available acrylic adhesive agent (UV-3300, manufactured by TOAGOSEI CO., LTD.) using coating, by irradiating the adhesive agent with an ultraviolet ray having irradiation dose of 100 mJ/cm$^2$ using a metal halide lamp, and by curing the adhesive agent, and then the temporary support was peeled off, and thus a luminance-enhancing film of Example 20 was obtained.

Next, a commercially available liquid crystal display device (manufactured by Panasonic Corporation, a product name of TH-L42D2) was disassembled as with Example 8 and Comparative Example 4, a backlight unit was not changed, and a plate in which the luminance-enhancing film of Example 20 was bonded to the polarizing plate prepared in Manufacturing Example 1 described above by using an adhesive agent including a polyvinyl alcohol-based resin having an acetoacetyl group which had high durability was used as a backlight side polarizing plate, and thus a liquid crystal display device of Example 20 was manufactured.

The adhesive agent containing the polyvinyl alcohol-based resin described above is not particularly limited, but an adhesive agent containing the polyvinyl alcohol-based resin which has an average degree of polymerization of approximately 100 to 3000 and an average degree of saponification of approximately 85 mol % to 100 mol % is preferably from a viewpoint of adhesiveness. In addition, the concentration of an aqueous solution of the adhesive agent is not particularly limited, but the concentration is preferably 0.1 mass % to 15 mass %, and is more preferably 0.5 mass % to 10 mass %. The thickness of the adhesive layer after being dried is preferably approximately 30 nm to 1000 nm, and is more preferably 50 nm to 300 nm. When the thickness is excessively thin, an adhesion force becomes insufficient, and when the thickness is excessively thick, a problem is more likely to occur in the appearance. An adhesive agent is able to be prepared by using a thermosetting resin or an ultraviolet curable resin such as a (meth)acrylic resin, a urethane-based resin, an acrylic urethane-based resin, an epoxy-based resin, and a silicone-based resin as other adhesive agents.

In a backlight light source of the liquid crystal display device, the light emitting peak wavelength of blue light was 450 nm There was one light emitting peak in a green to red region, the peak wavelength was 550 nm, and the half band width was 100 nm. The light source described above indicates a light source referred to as a general white LED light source in which a blue LED and a yellow fluorescent body (a YAG fluorescent body) are combined.

Example 21

As with Example 20, a film was prepared in which an alignment layer was disposed on a support and was subjected to a rubbing treatment, and then a λ/4 plate was directly laminated on the alignment layer, and a first light reflection layer was directly laminated on the λ/4 plate. Next, a film was prepared in which a temporary support was subjected to a rubbing treatment, and then a third light reflection layer was directly laminated on the temporary support, and a second light reflection layer was directly laminated on the third light reflection layer. Finally, the first light reflection layer of the former film adhered to the second light reflection layer of the latter film by using an adhesive layer, and then the temporary support was peeled off, and thus a luminance-enhancing film of Example 21 was obtained. After that, in Example 20, a liquid crystal display device of Example 21 was manufactured by the same method as that in Example 20 except that the luminance-enhancing film of Example 21 was used instead of the luminance-enhancing film of Example 20. A difference from Example 20 is that a reflection range of a third light reflection layer (G) expands to 160 nm in a half band width by the following method using a high Δn liquid crystal material disclosed in paragraphs "0153" to "0171" of JP2011-510915A, and thus luminance is enhanced.

The third light reflection layer was prepared with reference to a method disclosed in "0172" to "0177" in JP2011-510915A.

In the formulation in "0172" of JP2011-510915A, a coating liquid to which a chiral agent (D1) disclosed in "0174" of JP2011-510915A was not added was prepared. Next, a third light reflection layer coating liquid was prepared by adding the chiral agent (D1) described above. The coating liquid was applied onto a temporary support and was subjected to UV curing by the same method as that in Example 17 of the present invention, and thus a third light reflection layer was prepared. A reflection range of the third light reflection layer was approximately 160 nm. Furthermore, the chiral agent was added such that the center wavelength of a reflection peak of the third light reflection layer became 575 nm by being measured using a spectrometer UV3150 (manufactured by Shimadzu Corporation).

In addition, even when the compound 103 of the present invention is used in the chiral agent, the same cholesteric liquid crystal is able to be realized by adjusting the added amount of the compound.

The reflection range of the third light reflection layer of Example 21 was shown in Table 4 described below as "G Broadband 1".

Naturally, enhancement in the luminance is able to be realized by expanding at least one of a G reflection range, a B reflection range, and a R reflection range, but it is necessary to apply a Rth optical compensation principle of the present invention to the design of an oblique color change.

Example 22

As with Example 20, a film was prepared in which an alignment layer was disposed on a support and was subjected to a rubbing treatment, and then a λ/4 plate was directly laminated on the alignment layer, and a first light reflection layer was directly laminated on the λ/4 plate. Next, a film was prepared in which a temporary support was subjected to a rubbing treatment, and then a third light reflection layer was directly laminated on the temporary support, and a second light reflection layer was directly laminated on the third light reflection layer. Finally, the first light reflection layer of the former film adhered to the second light reflection layer of the latter film by using an adhesive layer, and then the temporary support was peeled off, and thus a luminance-enhancing film of Example 22 was obtained. After that, in Example 20, a liquid crystal display device of Example 22 was manufactured by the same method as that in Example 20 except that the luminance-enhancing film of Example 22 was used instead of the luminance-enhancing film of Example 20. A difference from Example 21 is that a reflection range of a third light reflection layer (G) expands to 200 nm in a half band width by the following method, and thus luminance is enhanced.

The third light reflection layer was prepared by using a pitch gradient method with reference to a method disclosed in "0052" to "0053" of JP1994-281814A (JP-H06-281814A).

In a formulation disclosed in "0052" of JP1994-281814A (JP-H06-281814A), a third light reflection layer coating liquid was adjusted by changing a ratio of chiral and monomer component A. The added amount of the chiral and monomer component A was adjusted such that the center wavelength of a reflection peak became 598 nm by using a spectrometer UV3150 (manufactured by Shimadzu Corporation). The third light reflection layer was disposed by the same method as that in "0052" of JP1994-281814A (JP-H06-281814A) described above except that a PET film which was a temporary support was subjected to a rubbing treatment, and then a direct layer was disposed on the temporary support by using the adjusted coating liquid. A reflection range of the third light reflection layer was approximately 200 nm.

The reflection range of the third light reflection layer of Example 22 was shown in Table 4 described below as "G Broadband 2".

[Evaluation]

The liquid crystal display device of Examples 20 to 22 using the luminance-enhancing film of Examples 20 to 22 was evaluated on the basis of the same criteria as those in Example 1.

Specifically, in Examples 20 to 22, the front luminance was evaluated on the basis of Comparative Example 4.

In Examples 20 to 22, the oblique color change was evaluated on the basis of Comparative Example 4.

In Examples 20 to 22, the color reproduction range was evaluated on the basis of Comparative Example 4.

The evaluation results are shown in Table 4 described below.

TABLE 4

|  |  |  | Example 20 | Example 21 | Example 22 |
|---|---|---|---|---|---|
| Luminance-<br>Enhancing | λ/4 Plate<br>(Including Support) | Re(550) [nm]<br>Rth(550) [nm] | 130<br>3 | 130<br>3 | 130<br>3 |

TABLE 4-continued

| | | | Example 20 | Example 21 | Example 22 |
|---|---|---|---|---|---|
| Film | | Direction of Slow Axis (Angle with respect to Absorption Axis of Polarizing Plate) | 45° | 45° | 45° |
| | Reflection Polarizer | First Light Reflection Layer | | | |
| | | Cholesteric Liquid Crystal Material | Disk-Like | Disk-Like | Disk-Like |
| | | Reflection Range | R | R | R |
| | | Peak Wavelength | 655 | 690 | 740 |
| | | Film Thickness d [μm] | 2.6 | 2.7 | 2.9 |
| | | Rth(550) [nm] | −260 | −274 | −293 |
| | | Second Light Reflection Layer | | | |
| | | Cholesteric Liquid Crystal Material | Rod-Like | Rod-Like | Rod-Like |
| | | Reflection Range | B | B | B |
| | | Peak Wavelength | 455 | 455 | 455 |
| | | Film Thickness d [μm] | 1.7 | 1.7 | 1.7 |
| | | Rth(550) [nm] | 136 | 136 | 136 |
| | | Third Light Reflection Layer | | | |
| | | Cholesteric Liquid Crystal Material | Rod-Like | Rod-Like | Rod-Like |
| | | Reflection Range | G | G Broadband 1 | G Broadband 2 |
| | | Peak Wavelength | 550 | 575 | 598 |
| | | Film Thickness d [μm] | 2.8 | 2.6 | 2.3 |
| | | Rth(550) [nm] | 220 | 579 | 516 |
| Backlight | | Type | White LED | White LED | White LED |
| | | Main Wavelength (Blue) [nm] | 450 | 450 | 450 |
| | | Center Wavelength (Green) [nm] | 550 | 550 | 550 |
| | | Center Wavelength (Red) [nm] | | | |
| Performance | | Front Luminance | 4 | 5 | 5 |
| | | Oblique Change in Shade | 6 | 6 | 6 |
| | | Color Reproduction Range | 3 | 2 | 2 |

As described above, it is found that even when a white LED light source is used, the liquid crystal display device in which the luminance-enhancing film of the present invention is incorporated in the liquid crystal display device on the backlight side from the liquid crystal cell is excellent from a viewpoint of the front luminance, the oblique color change, and the color reproduction range.

Example 23

As with Example 20, a film was prepared in which an alignment layer was disposed on a support and was subjected to a rubbing treatment, and then a λ/4 plate was directly laminated on the alignment layer, and a first light reflection layer was directly laminated on the λ/4 plate. The center wavelength of a reflection peak of the first light reflection layer and the film thickness were adjusted to have the values shown in Table 5. Next, a film was prepared in which a temporary support was subjected to a rubbing treatment, and then a third light reflection layer was directly laminated on the temporary support, and then a second light reflection layer was directly laminated on the third light reflection layer. Finally, the first light reflection layer of the former film adhered to the second light reflection layer of the latter film by using an adhesive layer, and then the temporary support was peeled off, and thus a luminance-enhancing film of Example 23 was obtained. A difference from Example 20 is that a reflection range of a second light reflection layer (B) and a reflection range of a third light reflection layer (G) respectively expand to 140 nm and 160 nm in a half band width by the following method using a high Δn liquid crystal material disclosed in paragraphs "0153" to "0171" of JP2011-510915A, as with Example 21, and thus luminance is enhanced.

The second light reflection layer and the third light reflection layer were prepared by using the same method as that in the preparation of the third light reflection layer of Example 21 except that the added amount of the chiral agent to the coating liquid was changed, and the center wavelength of the reflection peak and the film thickness were adjusted to have the values shown in Table 5.

As described in "0219" to "0220" of JP2006-293275A, a polarizer was manufactured, the luminance-enhancing film described above and a polarizing plate protective film (TD80UL (manufactured by Fujifilm Corporation)) were respectively bonded to both surfaces of the polarizer by using the same adhesive agent as that in Example 20 which included the polyvinyl alcohol-based resin having an acetoacetyl group with high durability in a roll-to-roll manner, and thus an optical sheet member of Example 23 was manufactured. Furthermore, the luminance-enhancing film on the support side was bonded to the polarizer.

Next, as with Example 20, a commercially available liquid crystal display device (manufactured by Panasonic Corporation, a product name of TH-L42D2) was disassembled, a backlight unit was not changed, and the optical sheet member of Example 23 was used as a backlight side polarizing plate, and thus a liquid crystal display device of Example 23 was manufactured.

85

Example 24

As with Example 20, a film was prepared in which an alignment layer was disposed on a support and was subjected to a rubbing treatment, and then a λ/4 plate was directly laminated on the alignment layer, and a first light reflection layer was directly laminated on the λ/4 plate. The first light reflection layer was a blue light reflection layer, and the center wavelength of a reflection peak and the film thickness were adjusted to have the values shown in Table 5. Next, a film was prepared in which a temporary support was subjected to a rubbing treatment, and then a third light reflection layer was directly laminated on the temporary support, and a second light reflection layer was directly laminated on the third light reflection layer. Finally, the first light reflection layer of the former film adhered to the second light reflection layer of the latter film by using an adhesive layer, and then the temporary support was peeled off, and thus a luminance-enhancing film of Example 24 was obtained. A difference from Example 20 is that the second light reflection layer is a green light reflection layer, the third light reflection layer is a red light reflection layer, and a reflection range of the second light reflection layer and a reflection range of the third light reflection layer respectively expand to 160 nm and 170 nm in a half band width by the following method using a high Δn liquid crystal material disclosed in paragraphs "0153" to "0171" of JP2011-510915A, as with Example 21, and thus luminance is enhanced.

The second light reflection layer and the third light reflection layer were prepared by using the same method as that in the preparation of the third light reflection layer of Example 21 except that the added amount of the chiral agent to the coating liquid was changed, and the center wavelength of the reflection peak and the film thickness were adjusted to have the values shown in Table 5.

As described in "0219" to "0220" of JP2006-293275A, a polarizer was manufactured, the luminance-enhancing film described above and a polarizing plate protective film (TD80UL (manufactured by Fujifilm Corporation)) were respectively bonded to both surfaces of the polarizer by using the same adhesive agent as that in Example 20 which included the polyvinyl alcohol-based resin having an acetoacetyl group with high durability in a roll-to-roll manner, and thus an optical sheet member of Example 24 was manufactured. Furthermore, the luminance-enhancing film on the support side was bonded to the polarizer.

Next, as with Example 20, a commercially available liquid crystal display device (manufactured by Panasonic Corporation, a product name of TH-L42D2) was disassembled, a backlight unit was not changed, and the optical sheet member of Example 24 was used as a backlight side polarizing plate, and thus a liquid crystal display device of Example 24 was manufactured.

Example 25

<Preparation of λ/4 Plate>

A monomer composition formed of 97.8 mass % of methyl methacrylate and 2.2 mass % of acrylic acid methyl was subjected to polymerization by a bulk polymerization method, and thus a resin pellet was obtained.

Rubber particles were manufactured on the basis of Example 3 of JP1980-27576B (JP-S55-27576B). The rubber particles have a spherical three layered structure, in which a core inner layer is a cross-linking polymer containing methyl methacrylate and a small amount of ally methacrylate, an inner layer is a soft elastic copolymer where butyl acrylate, styrene, and a small amount of allyl acrylate are subjected to cross-linking copolymerization as a main component, and an outer layer is a hard polymer of methyl methacrylate and a small amount of allyl acrylate. In addition, the average particle diameter of the inner layer was 0.19 μm, and the particle diameter including the outer layer was 0.22 μm.

70 parts by mass of the resin pellet described above and 30 parts by mass of the rubber particles described above were mixed, and were melted and kneaded by a biaxial extruder, and thus a methacrylic acid ester polymer composition (glass transition temperature of 105° C.) was obtained.

The methacrylic acid ester polymer composition described above (a b layer) and a styrene maleic anhydride copolymer (glass transition temperature of 130° C.) (an a layer) were subjected to coextrusion molding at a temperature of 280° C., and thus a multilayer film having a three layered structure of b Layer/a Layer/b Layer was obtained in which each layer had an average thickness of 45/70/45 (μm). The laminated film was subjected to oblique stretching at a stretching temperature of 134° C. and a stretching ratio of 1.8 times by a tenter stretching machine such that the slow axis was in a direction inclined with respect to an MD direction (Machine Direction (MD) direction indicating a flowing direction of the film) by 45°, and thus two types of three layered ¼ wavelength plates were obtained. The two types of three layered ¼ wavelength plates had optical properties of Re of 140 nm and Rth of −85 nm at a wavelength of 550 nm.

<Preparation of Light Reflection Layer>

A first light reflection layer was prepared as a λ/4 plate by the same method as that in Example 11 except that the two types of three layered ¼ wavelength plates described above were used. At this time, the amount of chiral agent was adjusted such that the center wavelength of a reflection range became the value shown in Table 5. Next, a film was prepared by the same method as that in Example 23, in which a temporary support was subjected to a rubbing treatment, and then a third light reflection layer was directly laminated on the temporary support, and a second light reflection layer was directly laminated on the third light reflection layer. Finally, the first light reflection layer of the former film adhered to the second light reflection layer of the latter film by using an adhesive layer, and then the temporary support was peeled off, and thus a luminance-enhancing film of Example 25 was obtained.

As described in "0219" to "0220" of JP2006-293275A, a polarizer was manufactured, the luminance-enhancing film described above and a polarizing plate protective film (TD80UL (manufactured by Fujifilm Corporation)) were respectively bonded to both surfaces of the polarizer by using the same adhesive agent as that in Example 20 which included the polyvinyl alcohol-based resin having an acetoacetyl group with high durability in a roll-to-roll manner, and thus an optical sheet member of Example 25 was manufactured. Furthermore, the luminance-enhancing film on the λ/4 plate side was bonded to the polarizer.

Next, as with Example 20, a commercially available liquid crystal display device (manufactured by Panasonic Corporation, a product name of TH-L42D2) was disassembled, a backlight unit was not changed, and the optical sheet member of Example 25 was used as a backlight side polarizing plate, and thus a liquid crystal display device of Example 25 was manufactured.

[Evaluation]

The liquid crystal display device of Examples 23 to 25 using the luminance-enhancing film of Examples 23 to 25 was evaluated on the basis of the same criteria as those in Example 1.

Specifically, in Examples 23 to 25, the front luminance was evaluated on the basis of Comparative Example 4.

In Examples 23 to 25, the oblique color change was evaluated on the basis of Comparative Example 4.

In Examples 23 to 25, the color reproduction range was evaluated on the basis of Comparative Example 4.

The evaluation results are shown in Table 5 described below.

TABLE 5

|  |  |  |  | Example 23 | Example 24 | Example 25 |
|---|---|---|---|---|---|---|
| Luminance-Enhancing Film | λ/4 Plate (Including Support) |  | Re(550) [nm] | 130 | 130 | 140 |
|  |  |  | Rth(550) [nm] | 3 | 3 | −85 |
|  |  |  | Direction of Slow Axis (Angle with respect to Absorption Axis of Polarizing Plate) | 45° | 45° | 45° |
|  | Reflection Polarizer | First Light Reflection Layer | Cholesteric Liquid Crystal Material | Disk-Like | Disk-Like | Disk-Like |
|  |  |  | Reflection Range | R | B | R |
|  |  |  | Peak Wavelength | 705 | 440 | 705 |
|  |  |  | Film Thickness d [μm] | 2.7 | 1.7 | 2.7 |
|  |  |  | Rth(550) [nm] | −271 | −174 | −271 |
|  |  | Second Light Reflection Layer | Cholesteric Liquid Crystal Material | Rod-Like | Rod-Like | Rod-Like |
|  |  |  | Reflection Range | B Broadband 1 | G Broadband 3 | B Broadband 1 |
|  |  |  | Peak Wavelength | 460 | 560 | 460 |
|  |  |  | Film Thickness d [μm] | 1.6 | 2.0 | 1.6 |
|  |  |  | Rth(550) [nm] | 242 | 295 | 242 |
|  |  | Third Light Reflection Layer | Cholesteric Liquid Crystal Material | Rod-Like | Rod-Like | Rod-Like |
|  |  |  | Reflection Range | G Broadband 3 | R Broadband 1 | G Broadband 3 |
|  |  |  | Peak Wavelength | 595 | 720 | 595 |
|  |  |  | Film Thickness d [μm] | 2.1 | 2.5 | 2.1 |
|  |  |  | Rth(550)[nm] | 313 | 379 | 313 |
| Backlight |  |  | Type | White LED | White LED | White LED |
|  |  |  | Main Wavelength (Blue) [nm] | 450 | 450 | 450 |
|  |  |  | Center Wavelength (Green) [nm] | 550 | 550 | 550 |
|  |  |  | Center Wavelength (Red) [nm] |  |  |  |
| Performance |  |  | Front Luminance | 5 | 5 | 5 |
|  |  |  | Oblique Change in Shade | 6 | 6 | 5 |
|  |  |  | Color Reproduction Range | 2 | 2 | 2 |

Example 26

<Preparation of Support>

First, a cellulose ester support for the λ/4 plate used in Example 3 was prepared.

(Preparation of Cellulose Acylate Film)

The composition described below was put into a mixing tank and was stirred, and each component was dissolved, and thus a cellulose acetate solution was prepared.

Composition of Core Layer Cellulose Acylate Dope:

| Cellulose Acetate having Degree of Acetyl Substitution of 2.88 | 100 parts by mass |
|---|---|
| Plasticizer 2 (Structure Described above) | 15 parts by mass |
| Methylene Chloride | 426 parts by mass |
| Methanol | 64 parts by mass |

10 parts by mass of a matting agent solution described below was added to 90 parts by mass of the core layer cellulose acylate dope described above, and thus an outer layer cellulose acetate solution was prepared.

Composition of Matting Agent Solution:

| Silica Particles Having Average Particle Size of 20 nm (AEROSIL R972, manufactured by NIPPON AEROSIL CO., LTD.) | 2 parts by mass |
|---|---|
| Methylene Chloride | 76 parts by mass |
| Methanol | 11 parts by mass |
| Core Layer Cellulose Acylate Dope | 1 part by mass |

Three layers of the core layer cellulose acylate dope described above, and the outer layer cellulose acylate dopes on both sides of the core layer cellulose acylate dope were simultaneously casted from a casting port onto a drum at 20° C. Peeling off was performed in a state where a solvent content ratio was approximately 20 mass %, both ends of the film in a width direction were fixed by a tenter clip, and the film was dried while being stretched in a horizontal direction at a stretching ratio of 1.1 times in a state where a residual solvent was in the amount of 3% to 15%. After that, a cellulose acylate film having a thickness of 60 μm and Rth of 0 nm was prepared by being transported between rolls of a heat treatment device, and thus a cellulose acylate film T2 was obtained.

(Alkali Saponification Treatment)

The cellulose acylate film T2 described above passed through dielectric heating rolls at a temperature of 60° C., and thus the film surface temperature was heated to 40° C., and then an alkali solution having a composition described below was applied onto the band surface of the film by using a bar coater at a coating amount of 14 ml/m$^2$ and transported under a steam type far infrared heater manufactured by Noritake Co., Ltd. which was heated to 110° C. for 10 seconds. Subsequently, pure water was applied thereon by using the same bar coater at a coating amount of 3 ml/m². Next, water washing of a fountain coater and water draining of an air knife were repeated three times, and then the film was dried by being transported to a drying zone at 70° C. for 10 seconds, and thus a cellulose acylate film which had been subjected to an alkali saponification treatment was prepared.

Alkali Solution Composition

| | |
|---|---|
| Potassium Hydroxide | 4.7 parts by mass |
| Water | 15.8 parts by mass |
| Isopropanol | 63.7 parts by mass |

<Formation of λ/4 Plate>

Subsequently, a solute having a composition described below was dissolved in MEK by adjusting the concentration such that the thickness of the dried film thickness became 1.2 μm, and thus a coating liquid was prepared. The coating liquid was applied onto the alignment layer described above with a bar, and was heated and matured at 80° C. for 1 minute, and thus an even alignment state was obtained. After that, the coating film was held at 75° C. and was subjected to ultraviolet irradiation under nitrogen atmosphere by using a high pressure mercury lamp, and thus a λ/4 plate was formed on a support. When the retardation of the obtained film at 550 nm was measured, Re was 130 nm.

Solute Composition of Coating Liquid for λ/4 Plate:

| | |
|---|---|
| Disk-Like Liquid Crystal Compound (Compound 101 Described above) | 80 parts by mass |
| Disk-Like Liquid Crystal Compound (Compound 102 Described above) | 20 parts by mass |
| Alignment Aid 1 Having Structure Described below | 0.9 parts by mass |
| Alignment Aid 2 Having Structure Described above | 0.08 parts by mass |
| Surfactant 1 Described above | 0.075 parts by mass |
| Polymerization Initiator 1 Having Structure Described above | 3 parts by mass |
| Polymerizable Monomer Having Structure Described above | 10 parts by mass |

Alignment Aid 1

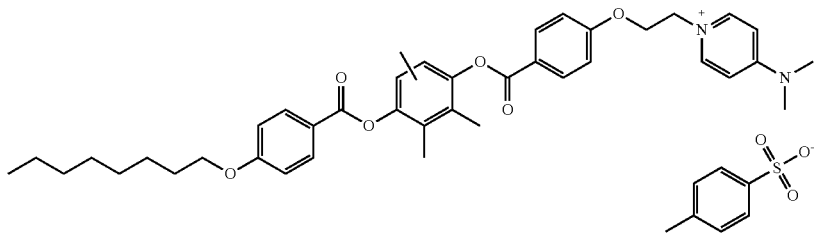

-continued

| | |
|---|---|
| Surfactant SF-1: $C_{14}H_{29}O(CH_2CH_2O)_{20}H$ | 1.0 parts by mass |
| Propylene Glycol | 14.8 parts by mass |

<Formation of Alignment Film>

An alignment film coating liquid (A) having a composition described below of which the concentration was adjusted such that the thickness of the dried film became 0.5 μm was continuously applied onto the surface of the cellulose acylate film T2 to which the alkali saponification treatment had been performed by using a wire bar of #14. The alignment layer coating liquid (A) was dried by hot air at 60° C. for 60 seconds, and further dried by hot air at 100° C. for 120 seconds. The degree of saponification of the used modified polyvinyl alcohol was 96.8%.

Composition of Alignment Film Coating Liquid:

| | |
|---|---|
| Modified Polyvinyl Alcohol Described above | 10 parts by mass |
| Water | 308 parts by mass |
| Methanol | 70 parts by mass |
| Isopropanol | 29 parts by mass |
| Photopolymerization Initiator (Irgacure 2959, manufactured by BASF SE) | 0.8 parts by mass |

The alignment film prepared as described above was continuously subjected to a rubbing treatment. At this time, a longitudinal direction of a long film was parallel to a transport direction, and an angle between the longitudinal direction of the film and a rotational axis of a rubbing roller was approximately 45°.

<Formation of Reflection Polarizer>

(Formation of First Light Reflection Layer)

A light reflection layer formed by fixing a cholesteric liquid crystalline phase of a disk-like liquid crystal compound was formed on the λ/4 plate prepared by the method described above as a light reflection layer formed by fixing a cholesteric liquid crystalline phase using a disk-like liquid crystal compound as a cholesteric liquid crystal material in the following method.

A solute having a composition described below was dissolved in MEK by adjusting the concentration such that the thickness of the dried film became 2.6 μm, and thus a coating liquid for forming a first light reflection layer including the disk-like liquid crystal compound was prepared. The coating liquid was applied onto the λ/4 plate described above with a bar, and was heated and matured at 110° C. for 1 minute, and thus an even alignment state was obtained. After that, the coating film was held at 45° C. and was subjected to ultraviolet irradiation by using a high pressure mercury lamp under nitrogen atmosphere, and thus a light reflection layer which was a lower layer including the disk-like liquid crystal compound of the light reflection layer was formed. The obtained light reflection layer formed by fixing the cholesteric liquid crystalline phase of the disk-like liquid crystal compound was a light reflection layer of single layer in which a reflection center wavelength of a reflection peak of a reflection spectrum was 655 nm and red light (R) was reflected.

Light Reflection Composition 1:

| | |
|---|---|
| Disk-Like Liquid Crystal Compound Described above (Compound 1 Described above) | 80 parts by mass |

-continued

| | |
|---|---|
| Disk-Like Liquid Crystal Compound Described above (Compound 2 Described above) | 20 parts by mass |
| Surfactant 1 | 0.45 parts by mass |
| Polymerization Initiator 1 Described above | 3 parts by mass |
| Chiral Agent (Compound 103 Described above) Amount at Which Reflection Center Wavelength Described above Was Obtained | (Approximately 3.5 parts by mass) |

(Formation of Second Light Reflection Layer)

A second light reflection layer formed by fixing a cholesteric liquid crystalline phase using a rod-like liquid crystal compound as a cholesteric liquid crystal material was formed on the first light reflection layer formed by fixing the cholesteric liquid crystalline phase of the disk-like liquid crystal compound described above by the following method as a lower layer including the disk-like liquid crystal compound.

A solute having a composition described below was dissolved in MEK by adjusting the concentration such that the thickness of the dried film became 1.7 μm, and thus a coating liquid for forming a light reflection layer including the rod-like liquid crystal compound was prepared. The coating liquid was applied onto the λ/4 plate described above with a bar, and was heated and matured at 110° C. for 1 minute, and thus an even alignment state was obtained. After that, the coating film was held at 45° C. and was subjected to ultraviolet irradiation by using a high pressure mercury lamp under nitrogen atmosphere, and thus a light reflection layer was formed.

Solute Composition of Coating Liquid for Light Reflection Layer Formed by Fixing Cholesteric Liquid Crystalline Phase of Rod-Like Liquid Crystal Compound:

| | |
|---|---|
| Compound 11 Described above | 83 parts by mass |
| Rod-Like Compound 18-1 Described above | 15 parts by mass |
| Rod-Like Compound 18-2 Described above | 2 parts by mass |
| Compound 9 Described below | 0.3 parts by mass |
| Right Turning Chiral Agent LC756 (manufactured by BASF SE) Amount at Which Reflection Center Wavelength Described above Was Obtained | (Approximately 6.3 parts by mass) |
| Multifunctional Monomer A-TMMT (manufactured by SHIN-NAKAMURA CHEMICAL CO., LTD.) | 1 part by mass |
| Polymerization Initiator IRGACURE 819 (manufactured by BASF SE) | 3 parts by mass |

Compound 9

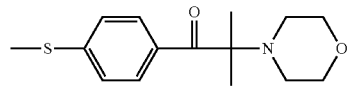

The obtained light reflection layer formed by fixing the cholesteric liquid crystalline phase of the rod-like liquid crystal compound is a light reflection layer of a single layer in which a reflection center wavelength of a reflection peak of a reflection spectrum was 455 nm and blue light (B) was reflected.

(Formation of Third Light Reflection Layer)

A third light reflection layer was formed on the obtained second light reflection layer formed by fixing the cholesteric liquid crystalline phase of the rod-like liquid crystal compound by the following method.

The third light reflection layer was formed by the same method as that of the second light reflection layer except that the added amount of right turning chiral agent LC756 was changed to approximately 5.6 parts by mass in the formation of the second light reflection layer described above. The obtained third light reflection layer formed by fixing the cholesteric liquid crystalline phase of the rod-like liquid crystal compound was a light reflection layer of a single layer in which a reflection center wavelength of a reflection peak of a reflection spectrum was 550 nm and green light (G) was reflected.

A luminance-enhancing film obtained as described above was set to a luminance-enhancing film of Example 26.

As described in "0219" to "0220" of JP2006-293275A, a polarizer was manufactured, the luminance-enhancing film described above and a polarizing plate protective film (TD80UL (manufactured by Fujifilm Corporation)) were respectively bonded to both surfaces of the polarizer by using the same adhesive agent as that in Example 20 which included the polyvinyl alcohol-based resin having an acetoacetyl group with high durability in a roll-to-roll manner, and thus an optical sheet member of Example 26 was manufactured. Furthermore, the luminance-enhancing film on the support side was bonded to the polarizer.

Next, as with Example 20, a commercially available liquid crystal display device (manufactured by Panasonic Corporation, a product name of TH-L42D2) was disassembled, a backlight unit was not changed, and the optical sheet member of Example 26 was used as a backlight side polarizing plate, and thus a liquid crystal display device of Example 26 was manufactured. The performance of the liquid crystal display device of Example 26 was identical to the performance of the liquid crystal display device of Example 20.

Example 27

Two commercially available liquid crystal display devices (manufactured by Sony Corporation, a product name of KDL46W900A) were disassembled, total four prism sheets, that is, two prism sheets were taken out from each of the two liquid crystal display devices. In both of the two liquid crystal display devices, prism directions of the two prism sheets which were taken out were vertical to each other. A commercially available liquid crystal display device (manufactured by Panasonic Corporation, a product name of TH-L42D2) was disassembled, a backlight sheet disposed on the backlight unit was taken out, and the two prism sheets taken out as described above were disposed. A combination of two prism sheets including a prism sheet having a prism direction in a horizontal direction of two prism sheets taken out from one liquid crystal display device and a prism sheet having a prism direction in a horizontal direction of two prism sheets taken out from the other liquid crystal display device was used as the disposed prism sheet. At this time, the directions of the two prism sheets was not changed, and the two prism sheets were disposed such that the prism directions of the two prism sheets were parallel to each other. Further, the optical member sheet of Example 23 was used as a backlight side polarizing plate, and thus a liquid crystal display device of Example 27 was manufactured.

Example 28

A commercially available liquid crystal display device (manufactured by Sony Corporation, a product name of KDL46W900A) was disassembled, and two prism sheets were taken out. The prism directions of the two prism sheets were vertical to each other. A commercially available liquid crystal display device (manufactured by Panasonic Corporation, a product name of TH-L42D2) was disassembled, a backlight sheet disposed on a backlight unit was replaced with the two prism sheets taken out as described above, and the optical member sheet of Example 23 was used as a backlight side polarizing plate, and thus a liquid crystal display device of Example 27 was manufactured. At this time, the prism directions of the two prism sheets were not changed, and the two prism sheets were disposed such that the prism directions of the two prism sheets were vertical to each other.

Comparative Example 6

Two commercially available liquid crystal display devices (manufactured by Sony Corporation, a product name of KDL46W900A) were disassembled, total four prism sheets, that is, two prism sheets were taken out from each of the two liquid crystal display devices. In both of the two liquid crystal display devices, prism directions of the two prism sheets which were taken out were vertical to each other. A commercially available liquid crystal display device (manufactured by Panasonic Corporation, a product name of TH-L42D2) was disassembled, a backlight sheet disposed on the backlight unit was taken out, and the two prism sheets taken out as described above were disposed. A combination of two prism sheets including a prism sheet having a prism direction in a horizontal direction of two prism sheets taken out from one liquid crystal display device and a prism sheet having a prism direction in a horizontal direction of two prism sheets taken out from the other liquid crystal display device was used as the disposed prism sheet. At this time, the directions of the two prism sheets was not changed, and the two prism sheets were disposed such that the prism directions of the two prism sheets were parallel to each other. Further, only the polarizing plate prepared in Manufacturing Example 1 was used as a backlight side polarizing plate without using an luminance-enhancing film, and thus a liquid crystal display device of Comparative Example 6 was manufactured.

Comparative Example 7

A commercially available liquid crystal display device (manufactured by Sony Corporation, a product name of KDL46W900A) was disassembled, and two prism sheets were taken out. The prism directions of the two prism sheets were vertical to each other. A commercially available liquid crystal display device (manufactured by Panasonic Corporation, a product name of TH-L42D2) was disassembled, a backlight sheet disposed on a backlight unit was replaced with the two prism sheets taken out as described above, and only the polarizing plate prepared in Manufacturing Example 1 was used as a backlight side polarizing plate without using a luminance-enhancing film, and thus a liquid crystal display device of Comparative Example 7 was manufactured. At this time, the prism directions of the two prism sheets were not changed, and the two prism sheets were disposed such that the prism directions of the two prism sheets were vertical to each other.

[Evaluation]

The front luminance of the liquid crystal display device of Examples 27 and 28 and Comparative Examples 6 and 7 using the luminance-enhancing film of Examples 27 and 28 and Comparative Examples 6 and 7 was evaluated by the same method as that in Example 1. The front luminance of the liquid crystal display device of Example 27 was 45% more excellent than that of the liquid crystal display device of Comparative Example 6. On the other hand, the front luminance of the liquid crystal display device of Example 28 was 34% more excellent that that of the liquid crystal display device of Comparative Example 7. A difference between the front luminance of Comparative Example 6 and the front luminance of Comparative Example 7 was less than or equal to 2%.

All of the directions of the spiral structures of the light reflection layers formed of the cholesteric liquid crystal layer which were used in the luminance-enhancing films of the respective examples described above were a right spiral direction, and the slow axis direction of the $\lambda/4$ plate of the optical sheet member in this example was in a direction rotated in a clockwise direction from the absorption axis direction of the polarizer by 45 degrees when seen from the backlight side.

Example 29

A film was prepared by the same method as that at the time of forming the first light reflection layer of Example 17 in which an alignment layer was disposed on a support and was subjected to a rubbing treatment, and then a $\lambda/4$ plate was directly laminated on the alignment layer, and the first light reflection layer used in Example 17 was directly laminated on the $\lambda/4$ plate. Next, a film was prepared in which a PET support was subjected to a rubbing treatment, and then the third light reflection layer of Example 17 was directly laminated on the PET support, and the second light reflection layer of Example 17 was directly laminated on the third light reflection layer. Finally, the first light reflection layer of the former film adhered to the second light reflection layer of the latter film by disposing a commercially available acrylic adhesive agent (UV-3300, manufactured by TOAGOSEI CO., LTD.) using coating, by irradiating the adhesive agent with an ultraviolet ray having irradiation dose of 100 mJ/cm$^2$ using a metal halide lamp, and by curing the adhesive agent, and then a luminance-enhancing film of Example 29 was obtained without peeling off the PET support (a refractive index of 1.63) described above. The absolute value of a difference between the refractive indices with respect to the third light reflection layer (the average refractive index of 1.56) was 0.07. (Furthermore, when the PET support described above was peeled off, a difference between the refractive indices of an air layer and the third light reflection layer was 0.56.)

Next, as with Example 8 and Comparative Example 4, a commercially available liquid crystal display device (manufactured by Panasonic Corporation, a product name of TH-L42D2) was disassembled, a backlight unit was not changed, and a plate in which the luminance-enhancing film of Example 29 was bonded to the polarizing plate prepared in Manufacturing Example 1 described above by using an adhesive agent including a polyvinyl alcohol-based resin having an acetoacetyl group which had high durability was used as a backlight side polarizing plate, and thus a liquid crystal display device of Example 29 was manufactured.

In a backlight light source of the liquid crystal display device, the light emitting peak wavelength of blue light was 450 nm There was one light emitting peak in a green to red region, the peak wavelength was 550 nm, and the half band width was 100 nm. The light source described above indicates a light source referred to as a general white LED light source in which a blue LED and a yellow fluorescent body (a YAG fluorescent body) are combined.

Example 30

A film was prepared by the same method as that at the time of forming the first light reflection layer of Example 17 in which an alignment layer was disposed on a support and was subjected to a rubbing treatment, and then a λ/4 plate was directly laminated on the alignment layer, and the first light reflection layer used in Example 17 was directly laminated on the λ/4 plate. Next, a film was prepared in which a TAC support was subjected to a rubbing treatment, and then the third light reflection layer of Example 17 was directly laminated on the TAC support, and the second light reflection layer of Example 17 was directly laminated on the third light reflection layer. Finally, the first light reflection layer of the former film adhered to the second light reflection layer of the latter film by disposing a commercially available acrylic adhesive agent (UV-3300, manufactured by TOAGOSEI CO., LTD.) using coating, by irradiating the adhesive agent with an ultraviolet ray having irradiation dose of 100 mJ/cm$^2$ using a metal halide lamp, and by curing the adhesive agent, and then a luminance-enhancing film of Example 30 was obtained without peeling off the TAC support (a refractive index of 1.48) described above. The absolute value of a difference between the refractive indices with respect to the third light reflection layer (the average refractive index of 1.56) was 0.08.

Next, as with Example 8 and Comparative Example 4, a commercially available liquid crystal display device (manufactured by Panasonic Corporation, a product name of TH-L42D2) was disassembled, a backlight unit was not changed, and a plate in which the luminance-enhancing film of Example 30 was bonded to the polarizing plate prepared in Manufacturing Example 1 described above by using an adhesive agent including a polyvinyl alcohol-based resin having an acetoacetyl group which had high durability was used as a backlight side polarizing plate, and thus a liquid crystal display device of Example 30 was manufactured.

Example 31

A film was prepared by the same method as that at the time of forming the first light reflection layer of Example 17 in which an alignment layer was disposed on a support and was subjected to a rubbing treatment, and then a λ/4 plate was directly laminated on the alignment layer, and the first light reflection layer used in Example 17 was directly laminated on the λ/4 plate. Next, a film was prepared in which a TAC surface of a surface scattering layer imparting TAC support was subjected to a rubbing treatment, and then the third light reflection layer of Example 17 was directly laminated on the TAC support, and the second light reflection layer of Example 17 was directly laminated on the third light reflection layer. Finally, the first light reflection layer of the former film adhered to the second light reflection layer of the latter film by disposing a commercially available acrylic adhesive agent (UV-3300, manufactured by TOAGOSEI CO., LTD.) using coating, by irradiating the adhesive agent with an ultraviolet ray having irradiation dose of 100 mJ/cm$^2$ using a metal halide lamp, and by curing the adhesive agent, and then the surface scattering layer imparting TAC support described above (a refractive index of 1.48) remained, and thus a luminance-enhancing film of Example 31 was obtained. The absolute value of a difference between the refractive indices with respect to the third light reflection layer (the average refractive index of 1.56) was 0.08.

Next, as with Example 8 and Comparative Example 4, a commercially available liquid crystal display device (manufactured by Panasonic Corporation, a product name of TH-L42D2) was disassembled, a backlight unit was not changed, and a plate in which the luminance-enhancing film of Example 31 was bonded to the polarizing plate prepared in Manufacturing Example 1 described above by using an adhesive agent including a polyvinyl alcohol-based resin having an acetoacetyl group which had high durability was used as a backlight side polarizing plate, and thus a liquid crystal display device of Example 31 was manufactured.

[Evaluation]

The liquid crystal display device of Examples 29 to 31 using the luminance-enhancing film of Examples 29 to 31 was evaluated by on the same criteria as those in Example 1.

Specifically, in Examples 29 to 31, the front luminance was evaluated on the basis of Comparative Example 4.

As a result thereof, the front luminance of the liquid crystal display device of Example 29 was 40% which was excellent compared to the liquid crystal display device of Comparative Example 4. In addition, the front luminance of the liquid crystal display device of Example 30 was 43% which was excellent compared to the liquid crystal display device of Comparative Example 4. On the other hand, the front luminance of the liquid crystal display device of Example 31 was 47% which was excellent compared to the liquid crystal display device of Comparative Example 4. On the other hand, the front luminance of the liquid crystal display device of Example 20 using the luminance-enhancing film of Example 20 to which the layer changing the polarization state of the light reflected from the light reflection layer was not imparted was 28%.

As described above, according to the studies of the present inventors, it has been found that it was possible to enhance the luminance by imparting the layer changing the polarization state of the light reflected from the light reflection layer onto the third light reflection layer on the light source side.

EXPLANATION OF REFERENCES

1: backlight side polarizing plate
2: retardation film
3: polarizer
4: polarizing plate protective film
11: luminance-enhancing film
12: λ/4 plate
13: reflection polarizer
14a: first light reflection layer
14b: second light reflection layer
14c: third light reflection layer 15: support
16G-r: green light reflection layer in which cholesteric liquid crystal material is rod-like liquid crystal compound
16R-r: red light reflection layer in which cholesteric liquid crystal material is rod-like liquid crystal compound
16R-d: red light reflection layer in which cholesteric liquid crystal material is disk-like liquid crystal compound
16B-r: blue light reflection layer in which cholesteric liquid crystal material is rod-like liquid crystal compound
20: adhesive layer (adhesive agent)
21: optical sheet member
31: backlight unit
41: thin layer transistor substrate
42: liquid crystal cell
43: color filter substrate
44: display side polarizing plate
51: liquid crystal display device

What is claimed is:

1. A luminance-enhancing film, comprising:
a λ/4 plate; and
a reflection polarizer,
wherein the reflection polarizer sequentially includes a first light reflection layer, a second light reflection layer, and a third light reflection layer from the λ/4 plate side,
all of the first light reflection layer, the second light reflection layer, and the third light reflection layer are light reflection layers formed by fixing a cholesteric liquid crystalline phase,
any one of the first light reflection layer, the second light reflection layer, and the third light reflection layer is a blue light reflection layer which has a reflection center wavelength of 380 nm to 499 nm and a reflectivity peak having a half band width of less than or equal to 100 nm, any one of the first light reflection layer, the second light reflection layer, and the third light reflection layer is a green light reflection layer which has a reflection center wavelength of 500 nm to 599 nm and a reflectivity peak having a half band width of less than or equal to 200 nm, and any one of the first light reflection layer, the second light reflection layer, and the third light reflection layer is a red light reflection layer which has a reflection center wavelength of 600 nm to 750 nm and a reflectivity peak having a half band width of less than or equal to 150 nm, and
Rth(550) of the first light reflection layer and Rth(550) of the second light reflection layer have opposite signs to each other in which Rth(550) represents retardation of each of the layers in a film thickness direction at a wavelength of 550 nm in the unit of nm.

2. The luminance-enhancing film according to claim 1, wherein the green light reflection layer has a reflection center wavelength of 500 nm to 599 nm and a reflectivity peak having a half band width of less than or equal to 125 nm.

3. The luminance-enhancing film according to claim 1, wherein a cholesteric liquid crystal material of one of the first light reflection layer and the second light reflection layer is a rod-like liquid crystal compound, and a cholesteric liquid crystal material of the other one is a disk-like liquid crystal compound.

4. The luminance-enhancing film according to claim 2, wherein a cholesteric liquid crystal material of one of the first light reflection layer and the second light reflection layer is a rod-like liquid crystal compound, and a cholesteric liquid crystal material of the other one is a disk-like liquid crystal compound.

5. The luminance-enhancing film according to claim 1, further comprising:
a layer changing a polarization state of light on a side of the reflection polarizer opposite to the λ/4 plate layer side,
wherein the layer changing the polarization state of the light satisfies conditions described below,
an absolute value of a difference between an average refractive index of layer changing polarization state of light with respect to the average refractive index of the third light reflection layer is within the range 0 to 0.8.

6. A luminance-enhancing film, comprising:
a λ/4 plate; and
a reflection polarizer,
wherein the reflection polarizer includes at least two light reflection layers,
both of the at least two light reflection layers are light reflection layers formed by fixing a cholesteric liquid crystalline phase, and
the at least two light reflection layers comprise a combination of a light reflection layer whose cholesteric liquid crystal material is a rod-like liquid crystal compound, and a light reflection layer whose cholesteric liquid crystal material is a disk-like liquid crystal compound.

7. An optical sheet member, comprising:
the luminance-enhancing film according to claim 1; and
a polarizing plate including a polarizer,
wherein an angle between a slow axis of the λ/4 plate and an absorption axis of the polarizer is 30° to 60°, and
the polarizing plate, the λ/4 plate, and the reflection polarizer are sequentially laminated directly in contact with each other or are sequentially laminated through an adhesive layer.

8. An optical sheet member, comprising:
the luminance-enhancing film according to claim 6; and
a polarizing plate including a polarizer,
wherein an angle between a slow axis of the λ/4 plate and an absorption axis of the polarizer is 30° to 60°, and
the polarizing plate, the λ/4 plate, and the reflection polarizer are sequentially laminated directly in contact with each other or are sequentially laminated through an adhesive layer.

9. A liquid crystal display device, sequentially comprising:
a liquid crystal cell;
the luminance-enhancing film according to claim 1; and
a backlight unit,
wherein the backlight unit includes a light source emitting blue light which has an emission center wavelength in a wavelength range of 430 nm to 480 nm, green light which has an emission center wavelength in a wavelength range of 500 nm to 600 nm, and red light which has at least a part of an emission intensity peak in a wavelength range of 600 nm to 700 nm, and
the backlight unit includes a reflection member performing conversion of a polarization state of light which is emitted from the light source and is reflected on the luminance-enhancing film or the optical sheet member and reflection of the light in rear of the light source.

10. A liquid crystal display device, sequentially comprising:
a liquid crystal cell;
the luminance-enhancing film according to claim 6; and
a backlight unit,
wherein the backlight unit includes a light source emitting blue light which has an emission center wavelength in a wavelength range of 430 nm to 480 nm, green light which has an emission center wavelength in a wavelength range of 500 nm to 600 nm, and red light which has at least a part of an emission intensity peak in a wavelength range of 600 nm to 700 nm, and
the backlight unit includes a reflection member performing conversion of a polarization state of light which is emitted from the light source and is reflected on the luminance-enhancing film or the optical sheet member and reflection of the light in rear of the light source.

11. The liquid crystal display device according to claim 9, wherein all of half band widths of the blue light, the green light, and the red light are less than or equal to 100 nm.

12. The liquid crystal display device according to claim 10, wherein all of half band widths of the blue light, the green light, and the red light are less than or equal to 100 nm.

13. The liquid crystal display device according to claim 9, wherein the light source is a light source including a blue light emitting diode which emits the blue light, and a fluorescent material which emits the green light and the red light when the blue light of the blue light emitting diode is incident thereon.

14. The liquid crystal display device according to claim 10, wherein the light source is a light source including a blue light emitting diode which emits the blue light, and a fluorescent material which emits the green light and the red light when the blue light of the blue light emitting diode is incident thereon.

15. The liquid crystal display device according to claim 13, wherein the fluorescent material is a quantum dot member.

16. The liquid crystal display device according to claim 14, wherein the fluorescent material is a quantum dot member.

17. The liquid crystal display device according to claim 9, wherein the emission center wavelength of the red light of the backlight unit and a reflection center wavelength of a red light reflection layer satisfy Expression (A) described below,
Expression (A):
an absolute value of a difference between an emission center wavelength of the red light of the backlight unit with respect to a reflection center wavelength of the red light reflection layer is within the range 10 nm to 50 nm.

18. The liquid crystal display device according to claim 9, wherein the backlight unit includes two prism sheets, and prism directions of the two prism sheets are parallel to each other.

19. The liquid crystal display device according to claim 9, wherein the light source is a white LED.

20. The liquid crystal display device according to claim 10, wherein the light source is a white LED.

21. A luminance-enhancing film, comprising:
a $\lambda/4$ plate; and
a reflection polarizer,
wherein the reflection polarizer sequentially includes a first light reflection layer, a second light reflection layer, and a third light reflection layer from the $\lambda/4$ plate side,
all of the first light reflection layer, the second light reflection layer, and the third light reflection layer are light reflection layers formed by fixing a cholesteric liquid crystalline phase,
any one of the first light reflection layer, the second light reflection layer, and the third light reflection layer is a blue light reflection layer which has a reflection center wavelength of 380 nm to 499 nm and a reflectivity peak having a half band width of less than or equal to 100 nm, any one of the first light reflection layer, the second light reflection layer, and the third light reflection layer is a green light reflection layer which has a reflection center wavelength of 500 nm to 599 nm and a reflectivity peak having a half band width of less than or equal to 200 nm, and any one of the first light reflection layer, the second light reflection layer, and the third light reflection layer is a red light reflection layer which has a reflection center wavelength of 600 nm to 750 nm and a reflectivity peak having a half band width of less than or equal to 150 nm, and
Rth(550) of the first light reflection layer and Rth(550) of the second light reflection layer have opposite signs to each other in which Rth(550) represents retardation of each of the layers in a film thickness direction at a wavelength of 550 nm in the unit of nm; and
the at least two light reflection layers comprise a combination of a light reflection layer whose cholesteric liquid crystal material is a rod-like liquid crystal compound, and a light reflection layer whose cholesteric liquid crystal material is a disk-like liquid crystal compound.

22. The luminance-enhancing film, according to claim 6, wherein a reflection center wavelength of one of said light reflection layers is in a range of 380 nm to 750 nm.

* * * * *